(12) United States Patent
Alley et al.

(10) Patent No.: US 12,491,983 B2
(45) Date of Patent: *Dec. 9, 2025

(54) AERIAL VEHICLE WITH DEPLOYABLE COMPONENTS AND CONFIGURABLE GEARBOX

(71) Applicant: Anduril Industries, Inc., Costa Mesa, CA (US)

(72) Inventors: Nicholas Robert Alley, Marietta, GA (US); Joshua Lemming Steele, Marietta, GA (US); Jesse Owen Williams, Marietta, GA (US); Daniel Kuehme, Marietta, GA (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,831

(22) Filed: Sep. 27, 2023

(65) Prior Publication Data

US 2024/0017815 A1 Jan. 18, 2024

Related U.S. Application Data

(63) Continuation-in-part of application No. 18/149,550, filed on Jan. 3, 2023, now Pat. No. 11,884,388, which
(Continued)

(51) Int. Cl.
*B64C 3/54* (2006.01)
*B64C 1/36* (2006.01)
(Continued)

(52) U.S. Cl.
CPC ............... *B64C 3/40* (2013.01); *B64C 1/36* (2013.01); *B64C 3/54* (2013.01); *B64C 3/546* (2013.01);
(Continued)

(58) Field of Classification Search
CPC ... B64C 3/56; B64C 39/024; B64C 2003/543; B64C 3/546; B64U 30/12
(Continued)

(56) References Cited

U.S. PATENT DOCUMENTS 1,496,723 A 6/1924 Miller
2,017,291 A 10/1935 Pfleger
(Continued)

FOREIGN PATENT DOCUMENTS

AU 2016351357 8/2021
AU 2022211805 8/2022
(Continued)

OTHER PUBLICATIONS

European Examination Report dated Mar. 22, 2024 cited in Application No. 23152519.7, 6 pgs.
(Continued)

*Primary Examiner* — Christopher P Ellis
(74) *Attorney, Agent, or Firm* — Knobbe, Martens, Olson & Bear, LLP

(57) ABSTRACT

An unmanned aerial vehicle with deployable components (UAVDC) is disclosed. The system may include a sweeping gearbox designed to deploy at least one wing from a compact to a deployed arrangement. A controller may be configured to detect launch conditions, monitor for conditions, and trigger the gearbox upon condition fulfillment. Activation of the sweeping gearbox may result in wing deployment, adapted to the detected conditions. The method may involve deploying wings using the sweeping gearbox, launching detection, monitoring for conditions, and activating the gearbox for wing deployment upon condition detection.

30 Claims, 28 Drawing Sheets

Related U.S. Application Data is a continuation of application No. 16/700,436, filed on Dec. 2, 2019, now Pat. No. 11,541,986, which is a continuation of application No. 15/388,433, filed on Dec. 22, 2016, now Pat. No. 10,494,081, which is a continuation of application No. 15/092,237, filed on Apr. 6, 2016, now Pat. No. 9,555,873.

(60) Provisional application No. 62/254,098, filed on Nov. 11, 2015.

(51) Int. Cl.
| | | |
|---|---|---|
| *B64C 3/40* | (2006.01) | |
| *B64C 3/56* | (2006.01) | |
| *B64C 5/02* | (2006.01) | |
| *B64C 5/12* | (2006.01) | |
| *B64C 5/16* | (2006.01) | |
| *B64C 11/28* | (2006.01) | |
| *B64C 13/24* | (2006.01) | |
| *B64C 13/30* | (2006.01) | |
| *B64C 39/02* | (2023.01) | |
| *B64U 30/12* | (2023.01) | |
| *B64U 10/25* | (2023.01) | |
| *B64U 101/00* | (2023.01) | |
| *B64U 101/30* | (2023.01) | |

(52) U.S. Cl.
CPC ............ *B64C 3/56* (2013.01); *B64C 5/02* (2013.01); *B64C 5/12* (2013.01); *B64C 5/16* (2013.01); *B64C 11/28* (2013.01); *B64C 13/24* (2013.01); *B64C 13/30* (2013.01); *B64C 39/024* (2013.01); *B64C 2211/00* (2013.01); *B64U 10/25* (2023.01); *B64U 30/12* (2023.01); *B64U 2101/00* (2023.01); *B64U 2101/30* (2023.01); *Y02T 50/10* (2013.01); *Y02T 50/40* (2013.01)

(58) Field of Classification Search
USPC .......................................................... 244/46
See application file for complete search history.

(56) References Cited

U.S. PATENT DOCUMENTS

| | | | |
|---|---|---|---|
| 2,198,475 | A | 4/1940 | Dorner |
| 2,369,276 | A | 2/1945 | Cameron et al. |
| 2,416,178 | A | 2/1947 | Kearns, Jr. |
| 2,712,421 | A | 7/1955 | Naumann |
| 2,784,573 | A | 3/1957 | Anderson |
| 2,999,657 | A | 9/1961 | Clark |
| 3,069,115 | A | 12/1962 | Strang |
| 3,250,494 | A | 5/1966 | Peterson |
| 3,666,210 | A | 5/1972 | Look et al. |
| 3,709,634 | A | 1/1973 | Lorenz |
| 3,981,613 | A | 9/1976 | Ehrenskjold et al. |
| 4,095,919 | A | 6/1978 | Ehrenskjold et al. |
| 4,376,979 | A | 3/1983 | Fowler et al. |
| 4,466,775 | A | 8/1984 | Martin |
| 4,730,793 | A | 3/1988 | Thurber, Jr. et al. |
| 4,979,876 | A | 12/1990 | Chapman |
| 5,118,052 | A | 6/1992 | Alvarez Calderon F. |
| 5,192,037 | A | 3/1993 | Moorefield |
| 5,645,249 | A | 7/1997 | Hein |
| 5,671,899 | A | 9/1997 | Nicholas et al. |
| 6,056,237 | A | 5/2000 | Woodland |
| 6,065,933 | A | 5/2000 | Secord |
| 6,119,976 | A | 9/2000 | Rogers |
| 6,260,797 | B1 | 7/2001 | Palmer |
| 6,905,093 | B2 | 6/2005 | Dryer et al. |
| 6,923,404 | B1 | 8/2005 | Liu et al. |
| 6,978,970 | B2 | 12/2005 | Purcell, Jr. |
| 7,185,847 | B1 | 3/2007 | Bouchard et al. |
| 7,584,925 | B2 | 9/2009 | Miller et al. |
| 7,642,492 | B2 | 1/2010 | Parine et al. |
| 7,762,500 | B1 | 7/2010 | Dhall |
| 7,770,857 | B2 | 8/2010 | Ruddy |
| 7,789,343 | B2 | 9/2010 | Sarh et al. |
| 7,832,690 | B1 | 11/2010 | Levine et al. |
| 7,841,559 | B1 | 11/2010 | O'Shea |
| 7,866,610 | B2 | 1/2011 | Bousfield |
| 7,886,544 | B2 | 2/2011 | Koenig |
| 8,089,034 | B2 | 1/2012 | Hammerquist |
| 8,113,962 | B2 | 2/2012 | Bentrim |
| 8,256,715 | B2 | 9/2012 | Ballard et al. |
| 8,376,279 | B2 | 2/2013 | Parks et al. |
| 8,492,692 | B2 | 7/2013 | Fisher |
| 8,505,430 | B2 | 8/2013 | Miralles et al. |
| 8,783,604 | B2 | 7/2014 | Sanderson et al. |
| 8,876,039 | B2 | 11/2014 | Lubenow et al. |
| 9,010,693 | B1 | 4/2015 | Barbieri |
| 9,296,270 | B2 | 3/2016 | Parks et al. |
| 9,545,991 | B1 | 1/2017 | Alley et al. |
| 9,555,873 | B1 | 1/2017 | Alley et al. |
| 9,580,165 | B1 | 2/2017 | Alley et al. |
| 9,616,991 | B2 | 4/2017 | Wirasnik |
| 9,701,406 | B2 | 7/2017 | Robertson et al. |
| 9,902,487 | B2 | 2/2018 | Alley et al. |
| 9,902,488 | B2 | 2/2018 | Alley et al. |
| 10,322,794 | B1 | 6/2019 | Copp et al. |
| 10,494,081 | B2 | 12/2019 | Alley et al. |
| 10,913,534 | B1 | 2/2021 | Brum |
| 11,117,649 | B2 | 9/2021 | Alley et al. |
| 11,535,369 | B2 | 12/2022 | Goldstein |
| 11,541,986 | B2 | 1/2023 | Alley et al. |
| 11,541,987 | B2 | 1/2023 | Landry |
| 11,884,388 | B2 | 1/2024 | Alley et al. |
| 11,958,588 | B2 | 4/2024 | Alley et al. |
| 12,365,440 | B2 | 7/2025 | Alley et al. |
| 2003/0094536 | A1 | 5/2003 | LaBiche |
| 2004/0251383 | A1 | 12/2004 | McDonnell |
| 2005/0218260 | A1 | 10/2005 | Corder et al. |
| 2006/0118675 | A1 | 6/2006 | Tidwell |
| 2006/0255205 | A1 | 11/2006 | Gleich et al. |
| 2007/0018033 | A1 | 1/2007 | Fanucci et al. |
| 2009/0026321 | A1 | 1/2009 | Sarh et al. |
| 2009/0072094 | A1 | 3/2009 | Sanderson et al. |
| 2009/0166477 | A1 | 7/2009 | Bousfield |
| 2009/0206193 | A1 | 8/2009 | File |
| 2009/0249906 | A1 | 10/2009 | Chen et al. |
| 2009/0302151 | A1 | 12/2009 | Holmes |
| 2010/0048069 | A1 | 2/2010 | Duncan |
| 2010/0072325 | A1 | 3/2010 | Sambell |
| 2010/0148011 | A1 | 6/2010 | Sanderson |
| 2011/0001016 | A1 | 1/2011 | Skillen et al. |
| 2011/0226174 | A1 | 9/2011 | Parks |
| 2013/0099049 | A1 | 4/2013 | Reany et al. |
| 2013/0146716 | A1 | 6/2013 | Gettinger |
| 2014/0032034 | A1 | 1/2014 | Raptopoulos et al. |
| 2014/0091172 | A1 | 4/2014 | Arlton et al. |
| 2014/0117147 | A1 | 5/2014 | Hanna et al. |
| 2014/0353430 | A1 | 12/2014 | Rix et al. |
| 2015/0225072 | A1 | 8/2015 | Torre |
| 2015/0274290 | A1 | 10/2015 | Fenny et al. |
| 2016/0001879 | A1 | 1/2016 | Johannesson et al. |
| 2016/0025339 | A1 | 1/2016 | Kamath et al. |
| 2016/0152329 | A1 | 6/2016 | Tzeng et al. |
| 2016/0167778 | A1 | 6/2016 | Meringer et al. |
| 2016/0176502 | A1 | 6/2016 | Snook |
| 2016/0264232 | A1 | 9/2016 | Briancourt et al. |
| 2016/0304194 | A1 | 10/2016 | Bevirt et al. |
| 2016/0318600 | A1 | 11/2016 | Wirasnik |
| 2016/0347441 | A1 | 12/2016 | Wainfan et al. |
| 2017/0001724 | A1 | 1/2017 | Yates |
| 2017/0197702 | A1 | 7/2017 | Alley et al. |
| 2017/0203831 | A1 | 7/2017 | Lopez Ferrer et al. |
| 2017/0210469 | A1 | 7/2017 | Piasecki et al. |
| 2017/0283042 | A1 | 10/2017 | Gamble |
| 2017/0283050 | A1 | 10/2017 | Baek et al. |
| 2017/0291685 | A1 | 10/2017 | Alley et al. |
| 2017/0291686 | A1 | 10/2017 | Alley et al. |
| 2017/0297698 | A1 | 10/2017 | Alber et al. |

(56) References Cited

U.S. PATENT DOCUMENTS

| | | |
|---|---|---|
| 2018/0002009 A1 | 1/2018 | McCullough et al. |
| 2018/0057161 A1 | 3/2018 | Groninga et al. |
| 2018/0057162 A1 | 3/2018 | Robertson et al. |
| 2018/0079487 A1 | 3/2018 | Ivans et al. |
| 2018/0086434 A1 | 3/2018 | Cook et al. |
| 2018/0111675 A1 | 4/2018 | Buttolph et al. |
| 2018/0183535 A1 | 6/2018 | Subblefield, II |
| 2019/0023374 A1 | 1/2019 | Kahlon et al. |
| 2019/0055003 A1 | 2/2019 | Luo et al. |
| 2019/0061914 A1 | 2/2019 | Heranger et al. |
| 2020/0079492 A1 | 3/2020 | Noskowicz |
| 2020/0102065 A1 | 4/2020 | Alley et al. |
| 2021/0403143 A1 | 12/2021 | Alley et al. |
| 2022/0340259 A1 | 10/2022 | Yoon et al. |
| 2022/0411047 A1 | 12/2022 | Mihai |
| 2023/0106432 A1 | 4/2023 | Baumgartner et al. |
| 2023/0142917 A1 | 5/2023 | Alley et al. |
| 2023/0234702 A1 | 7/2023 | Watterson, III |
| 2024/0208637 A1 | 6/2024 | Alley et al. |
| 2025/0206438 A1 | 6/2025 | Alley et al. |

FOREIGN PATENT DOCUMENTS

| | | |
|---|---|---|
| AU | 2023200510 | 1/2023 |
| CA | 2793114 A1 | 6/2013 |
| CA | 2828726 A1 | 4/2014 |
| CA | 3005149 A1 | 5/2017 |
| CA | 3219295 | 11/2023 |
| CN | 111169620 A | 5/2020 |
| DE | 2058430 A1 | 5/1972 |
| DE | 3240995 | 5/2016 |
| EP | 2604510 A2 | 6/2013 |
| EP | 3141474 | 3/2017 |
| EP | 3374260 A1 | 9/2018 |
| EP | 23152519.7 | 1/2023 |
| EP | 3536607 | 1/2024 |
| GB | 582802 | 11/1946 |
| GB | 2550916 | 12/2017 |
| HK | 42023082550.7 | 11/2023 |
| IL | 301988 | 4/2023 |
| IL | 309829 | 12/2023 |
| JP | 2018226113 A | 11/2018 |
| JP | 2018226114 A | 11/2018 |
| JP | 2019-059472 | 4/2019 |
| JP | 2019-069762 | 5/2019 |
| JP | 2022-528131 | 6/2022 |
| JP | 2023-061193 | 4/2023 |
| JP | 2023-578755 | 12/2023 |
| KR | 10-2023-7004318 | 2/2023 |
| KR | 10-2023-7038530 | 11/2023 |
| KR | 10-2023-7044130 | 12/2023 |
| NZ | 805863 | 11/2023 |
| SG | 11202309288 T | 12/2023 |
| TW | 112144058 | 11/2023 |
| WO | 2005023642 A2 | 3/2005 |
| WO | WO 2008/010226 | 1/2008 |
| WO | 2016046787 A1 | 3/2016 |
| WO | 2017037698 A1 | 3/2017 |
| WO | 2017082954 A1 | 5/2017 |
| WO | WO 2018/183535 | 10/2018 |
| WO | 2019183402 A1 | 9/2019 |
| WO | PCT/US23/75373 | 9/2023 |
| WO | WO 2025/071609 | 4/2025 |

OTHER PUBLICATIONS

Israeli Notice of Deficiencies mailed Nov. 2, 2023 cited in Application No. 301988, 5 pgs.
Australian Examination Report No. 1 mailed Feb. 7, 2024 cited in Application No. 2022211805, 8 pgs.
U.S. Appl. No. 18/426,110, filed Jan. 29, 2024, Allley et al. (Anduril Industries, Inc.).
International Search Report mailed May 17, 2024 cited in Application No. PCT/US2023/075373, 12 pgs.
Australian Examination Report No. 1 mailed Jun. 6, 2023 cited in Application No. 2023200510, 4 pgs.
Australian Examination Report No. 2 mailed Aug. 23, 2023 cited in Application No. 2023200510, 4 pgs.
Japanese Office Action mailed Jan. 5, 2024 cited in Application No. 2023-061193, 7 pgs.
Related Continuation U.S. Appl. No. 18/426,110, filed Jan. 29, 2024.
Extended European Search Report dated May 9, 2023 cited in Application No. 23152519.7, 11 pgs.
U.S. Non-Final Office Action dated May 25, 2023 cited in Appplication No. U.S. Appl. No. 18/149,550, 19 pgs.
South Korean Office Action dated Jun. 9, 2023 cited in Application No. 10-2023-7004318, 6 pgs. w/ English language xlation.
U.S. Appl. No. 19/253,276, Aerial Vehicle With Deployable Components, filed Jun. 27, 2025.
International Search Report dated Feb. 21, 2017 cited in Application No. PCT/US2016/028649, in 13 pages.
International Preliminary Report on Patentability dated May 2, 2018 cited in Application No. PCT/US2016/028649, in 10 pages.
International Search Report and Written Opinion dated Apr. 26, 2018 cited in Application No. PCT/US2018/24891, in 7 pages.
International Preliminary Report on Patentability dated Oct. 10, 2019 cited in Application No. PCT/US2018/24891, in 6 pages.

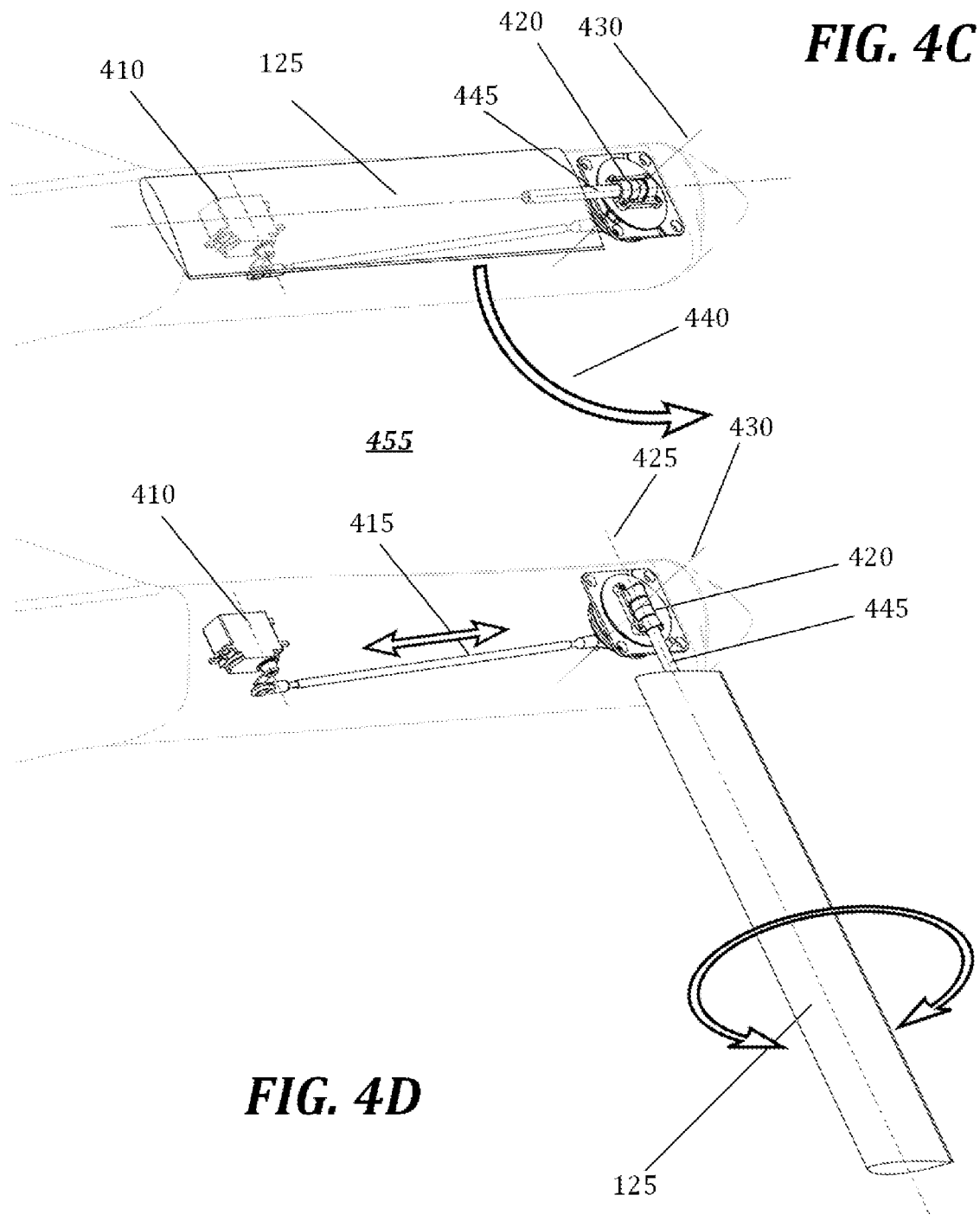

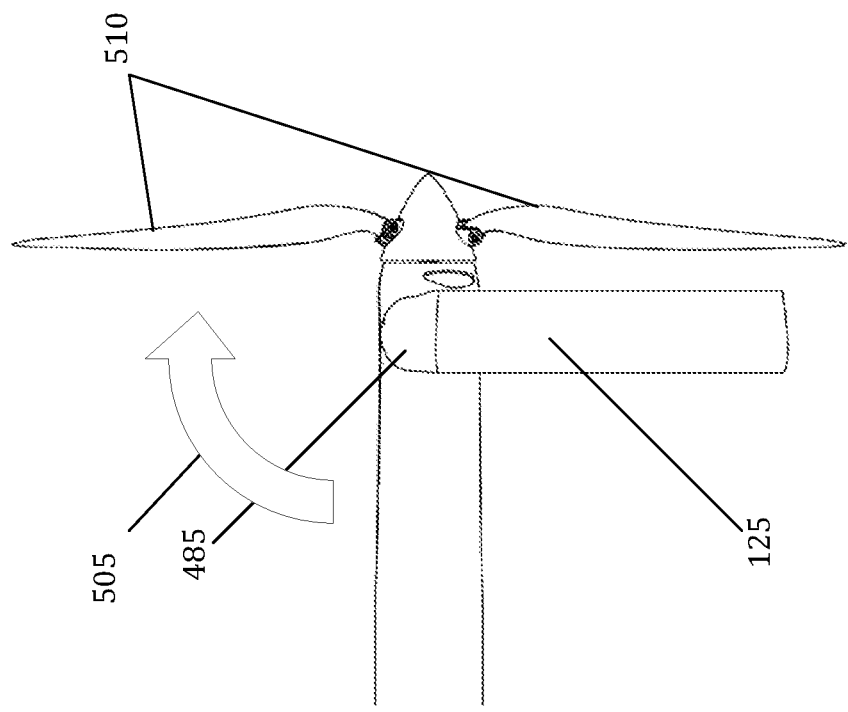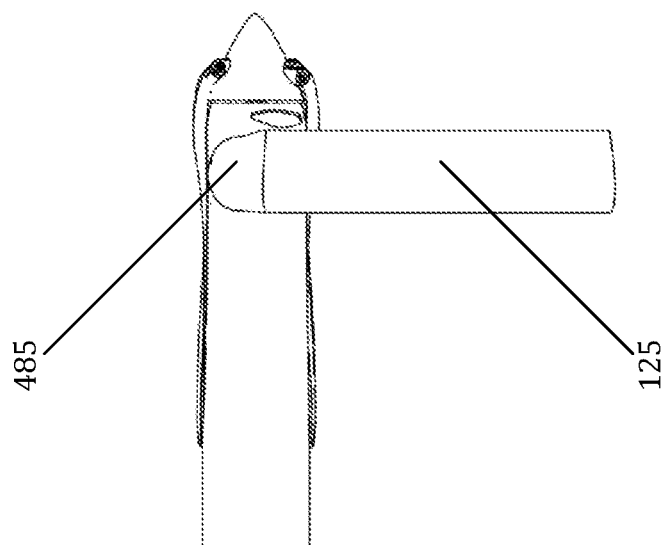
FIG. 5

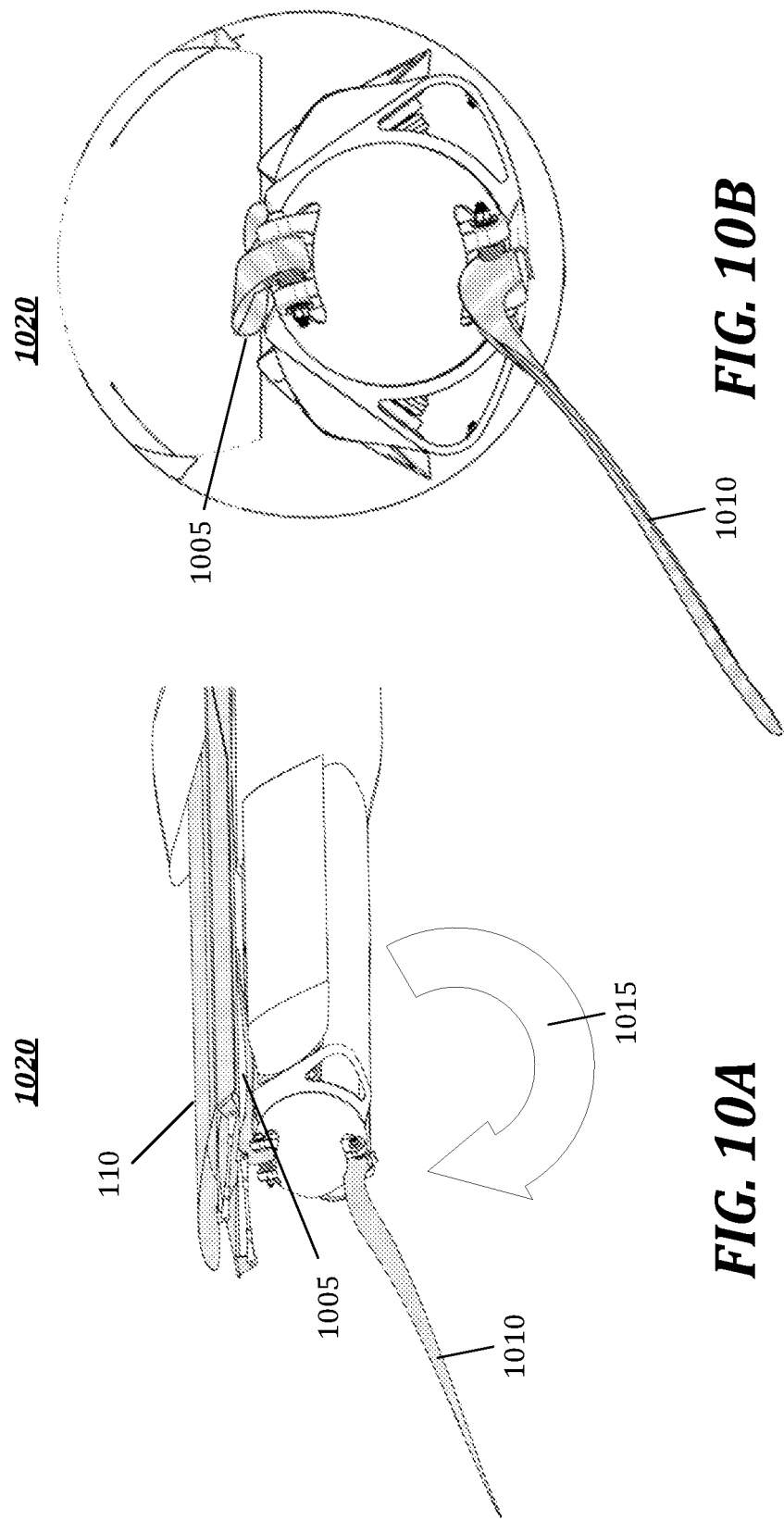

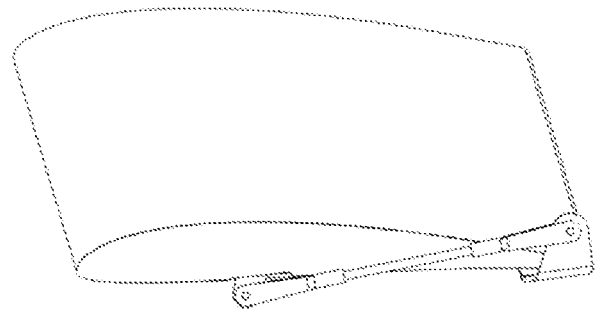
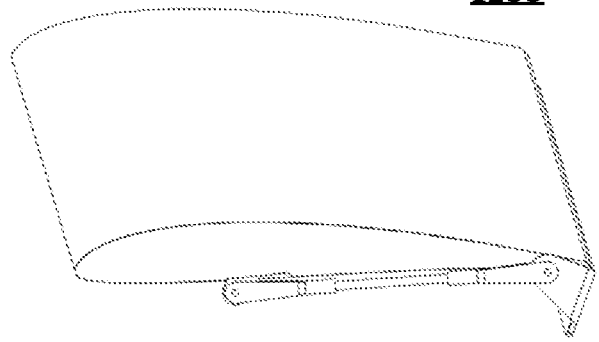
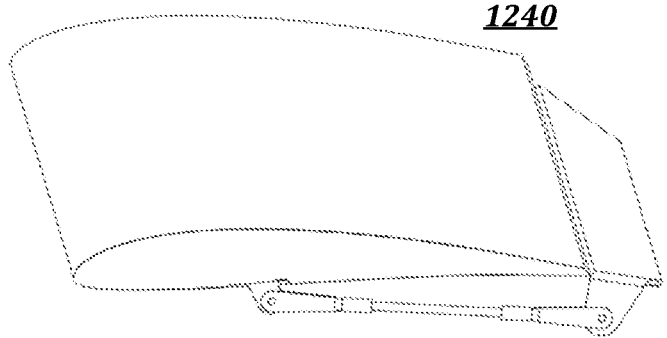
FIG. 12B

AERIAL VEHICLE WITH DEPLOYABLE COMPONENTS AND CONFIGURABLE GEARBOX

RELATED APPLICATIONS

The present application is a Continuation-in-Part of U.S. patent application Ser. No. 18/149,550 filed on Jan. 3, 2023, which is a Continuation of U.S. patent application Ser. No. 16/700,436 filed on Dec. 2, 2019, which issued on Jan. 3, 2023 as U.S. Pat. No. 11,541,986, which is a Continuation of U.S. patent application Ser. No. 15/388,433 filed on Dec. 22, 2016, which issued on Dec. 3, 2019 as U.S. Pat. No. 10,494,081, which is a Continuation of U.S. patent application Ser. No. 15/092,237 filed on Apr. 6, 2016, which issued on Jan. 31, 2017 as U.S. Pat. No. 9,555,873, which claims benefit of U.S. Provisional Application No. 62/254,098 filed on Nov. 11, 2015, each of which are hereby incorporated by reference herein in their entirety.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to unmanned aerial vehicles.

BACKGROUND

Unmanned aerial vehicles may be used for a plurality of applications. Such applications comprise commercial applications including surveillance and filming, and for military applications, reconnaissance and tactical missions. In certain circumstances, compact configurations can be beneficial to enabling particular types of missions. For example, compact configurations reduce space and enable various deployment options. However, current compact configurations are limited in flight range, endurance, and payload capacity.

BRIEF OVERVIEW

Embodiments of the present disclosure provide an improved aerial vehicle with deployable components. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

An unmanned aerial vehicle with deployable components (UAVDC) is disclosed. The UAVDC may comprise a fuselage, at least one wing, and at least one stabilizer. In some embodiments, the UAVDC may further comprise a propulsion means and/or a modular payload. The UAVDC may be configured in a plurality of arrangements. For example, in a compact arrangement, the UAVDC may comprise the at least one wing stowed against the fuselage and the at least one stabilizer stowed against the fuselage. In a deployed arrangement, the UAVDC may comprise the at least one wing deployed from the fuselage and the least one stabilizer deployed from the fuselage. In an expanded arrangement, the UAVDC may comprise the at least one wing telescoped to increase a wingspan of the deployed arrangement.

In various embodiments, a UAVDC with a telescoping wing system may be provided. The telescoping wing system may comprise a first wing section comprising a substantially hollow interior, a second wing section configured to be stowed within the interior of the first wing section. The second wing section may comprise an actuator configured to drive a belt coupled to the internal surface of the first wing section such that, upon actuation, a displacement of the attached segment of the belt causes the first wing section to traverse at least a portion of a length of the second wing section.

In the first configuration, the first wing section and the second wing section may form a first wingspan in a first arrangement, the first arrangement comprising the second wing section stowed within the interior of the first wing section. In a second configuration, the first wing section and the second wing section may form a second wingspan in a second arrangement, the second arrangement comprising the first wing section displaced along at least a portion of the length of the second wing section.

Still consistent with embodiments of the present disclosure, the UAVDC may comprise a fuselage, and at least one stabilizer configured to pivot about a first axis and a second axis. The at least one stabilizer may be configurable in at least the following arrangements: a compact arrangement comprising, wherein the at least one stabilizer is stowed against the fuselage, and a deployed arrangement, wherein the least one stabilizer is deployed from the fuselage by pivoting about the first axis.

The UAVDC may further comprise a pushrod configured to pivot the at least one stabilizer about the second axis. In some embodiments, the UAVDC may comprise a flexible fairing at the base of the stabilizer configured to enable the stabilizer to pivot about second axis while maintaining an aerodynamic efficiency.

In yet further embodiments, the UAVDC may comprise a fuselage comprising a modular payload section; at least one wing configurable in a first arrangement and a second arrangement, wherein the first arrangement comprises the at least one wing stowed against the fuselage, and wherein the second arrangement comprises the wings deployed for flight at a first deployment angle; a fairing positioned relatively at a base of the at least one wing, the fairing being constructed of a flexible material comprising at least one slit and at least one cutout designed to enabling a sweeping of the at least one wing from the first arrangement to the second arrangement, the fairing being configurable in: a first configuration to accommodate the first arrangement, and a second configuration to accommodate the second arrangement; an actuator coupled to a sweeping gearbox configured to actuate the sweeping of the at least one wing from the first arrangement to the second arrangement.

As will be detailed below, it should be understood that a single wing may be comprised of two left and right wing sections (a first section and a second section). The two wing sections may, throughout the present disclosure, be referred to as two wings or two wing segments. Accordingly, in some embodiments, the two wings may stacked against the fuselage in the first arrangement, the stacked configuration comprising a top wing and a bottom wing with the top wing vertically offset from the bottom wing in the first arrangement. In yet further embodiments, at a transition from the first arrangement to the second arrangement, the two wings may be configured to telescope to expand a wing span in the second arrangement.

Embodiments of the present disclosure may further comprise at least one control surface (e.g., a stabilizer) configured to deploy from a first stabilizer configuration stowed against the fuselage to a second stabilizer configuration deployed for flight at a second deployment angle.

In some embodiments, deployment of the at least one stabilizer may employ at least one spring, wherein the at least one spring is configured to force the at least one stabilizer from the first stabilizer configuration to the second stabilizer configuration.

The UAVDC may further comprise a propulsion mechanism. In some embodiments, the propulsion mechanism may comprise a propeller, wherein the propeller comprises at least one blade configured to fold into a first propeller arrangement and expand in a second propeller arrangement. The fuselage may comprise at least one groove configured to receive at least one blade of the propeller in the first propeller arrangement, and the propeller may be configured to unfold to the second propeller arrangement by means of at least one of the following: propeller blade springs, aerodynamic force, or a centripetal force from a rotation of the propeller.

Still consistent with embodiments of the present disclosure, methods and systems for deploying the wings of the UAVDC into a second arrangement are disclosed. For example, after a launch of the UAVDC, the UAVDC may monitor for at least one condition. The at least one precondition may be associated with deploying wings of the UAVDC into the second arrangement. Upon detecting the at least one condition, the wings of the UAVDC may be deployed into a second arrangement. Deploying the wings may comprise activating, in response to detecting the at least one condition associated with the UAVDC, a gearbox configured to transition the wings from the first arrangement to the second arrangement. Roll control may be maintained throughout launch and deployment.

In some embodiments, the at least one condition comprises at least one of the following: velocity, acceleration, and leveling associated with the UAV upon determining that UAV has launched. 5. In some embodiments, deploying the at least one additional flight component further comprises deploying at least one stabilizer. Still, in further embodiments, deploying the wings of the UAV comprises deploying the wings of the UAV when it is determined that the UAV has traveled a certain distance after launching. Consistent with embodiments of the present disclosure, the UAVDC may be configured to maintain roll control of the UAV in the expanded arrangement by actuating the at least one control surface on the wings of the UAV and/or by actuating the at least one stabilizer.

The UAVDC may further comprise a configurable gearbox. The configurable gearbox may be configured to regulate the deployment of the telescoping wing system. The configurable gearbox may be configured to control the rate of deployment of the telescoping wing system. Configuration of the gearbox may be associated with a launch type of the UAVDC that may include ground launch or aerial launch. The configurable gearbox may also be configured without removal from the UAVDC through software.

The UAVDC may comprise a sweeping gearbox and a controller. The sweeping gearbox may be configured to deploy at least one wing from a compact arrangement against the aerial vehicle to a deployed arrangement. The controller may be configured to perform at least one of the following operations: determine that the aerial vehicle is launched, monitor the aerial vehicle for at least one condition, detect an event corresponding to the at least one condition associated with the aerial vehicle, and activate the sweeping gearbox upon detection of the event. An activation of the sweeping gearbox may cause a deployment of the at least one wing of the aerial vehicle upon detection of the at least one condition.

A method for deploying an aerial vehicle may comprise deploying at least one wing from a compact arrangement against the aerial vehicle to a deployed arrangement using a sweeping gearbox. The method can also include determining that the aerial vehicle launched and monitoring the aerial vehicle for an event associated with at least one condition. Additionally, the method may involve activating the sweeping gearbox upon detection of the event associated with a condition. The at least one wing can be deployed in response to the activation of the sweeping gearbox.

A system for deploying an aerial vehicle may comprise a sweeping gearbox configured to deploy at least one wing from a compact arrangement to a deployed arrangement. A controller may be configured to detect a launch of the aerial vehicle, monitor for at least one condition, and detect an event corresponding to at least one condition. Activation of the sweeping gearbox upon the detection of the event may be controlled by the controller, wherein the activation is configured to cause a deployment of the at least one wing upon the detection of the at least one condition.

A method for deploying an aerial vehicle may comprise deploying at least one wing from a compact arrangement against the aerial vehicle to a deployed arrangement using a sweeping gearbox. The method may further include detecting that the aerial vehicle is launched and monitoring the aerial vehicle for a satisfaction of at least one condition. Activation of the sweeping gearbox upon the satisfaction of the condition is included, with the deployment of the at least one wing occurring in response to the activation of the sweeping gearbox.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 4C illustrates another view of the stabilizers in the first configuration;

FIG. 4D illustrates another view of the stabilizers in the second configuration;

FIG. 5 illustrates an example of deployable propeller blades and a direction of deployment;

FIG. 10A illustrates a propeller blade confined by wings;

FIG. 10B illustrates a deployed propeller blade oriented with a free stream;

FIG. 12B illustrates a plurality of configurations for the ailerons;

DETAILED DESCRIPTION

Figure 1A:
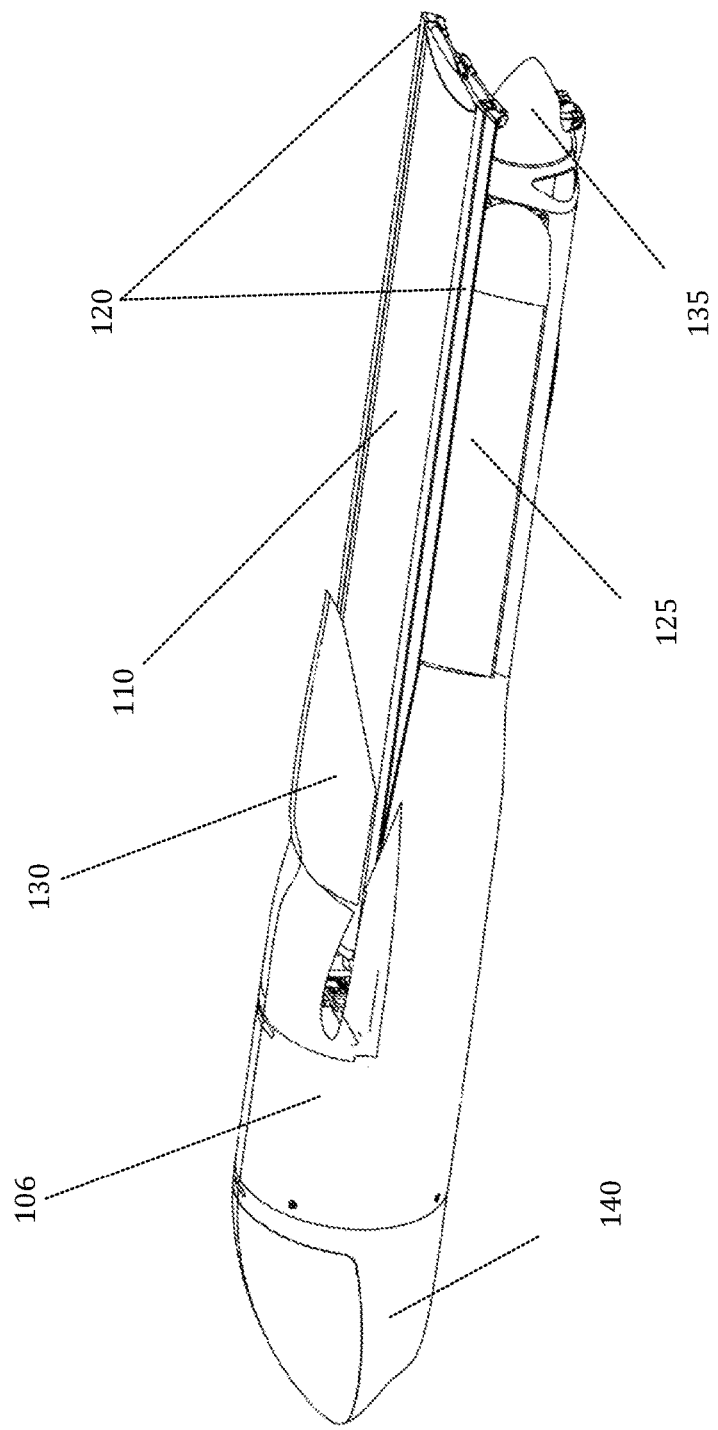
FIG. 1A illustrates an unmanned aerial vehicle with deployable components in a first configuration.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible.

For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of unmanned aerial vehicles, embodiments of the present disclosure are not limited to use only in this context. For example, embodiments of the present disclosure may be employed on manned and unmanned aerial vehicles.

I. OVERVIEW

This overview is provided to introduce a selection of concepts in a simplified form that are further described below. This overview is not intended to identify key features or essential features of the claimed subject matter. Nor is this overview intended to be used to limit the claimed subject matter's scope.

An improved unmanned aerial vehicle with deployable components (UAVDC) is provided in the various embodiments disclosed herein. Various aspects of the UAVDC lead to improvements over conventional unmanned aerial vehicles, including, but not limited to, for example, improved portability, deployment, post-deployment transition to flight control, aerodynamic efficiency and flight endurance, payload capacity, and maximized mission capability over conventional unmanned aerial vehicles. As will be detailed below, the UAVDC of the present disclosure includes a number of features that lead to the aforementioned improvements, including, but not limited to, for example, trailing-edge hinged ailerons, deployable stabilizers, gearbox, fairing, and sweeping and telescoping wing implementations.

The UAVDC may be configured in a plurality of arrangements. A first configuration may be a compact arrangement suitable in, for example, storage and launching embodiments, while a second configuration may be a deployed arrangement suitable in, for example, launch recovery and flight, and a third configuration may be an expanded configuration suitable in, for example, high-endurance flight. As will be detailed below, the UAVDC may be fully functional and operable in intermediary configurations between these three configurations to provide some of the advantages of the improved UAVDC at higher airspeeds.

FIG. 1A illustrates an example of a first configuration (e.g., compact arrangement 102). Compact arrangement 102 may enable convenient storage and transportation of the UAVDC. In addition, compact arrangement 102 may enable certain launch methods, such as a launch from, for example, a tube or a release from, for example, an aircraft's weapons/bomb bay or wing attachment.

Consistent with embodiments of the present disclosure, the UAVDC may be deployed after launch into the deployed arrangement that is suitable to survive the high aerodynamic loads of launch recovery and high-speed flight. During the flight, the UAVDC may be further deployed into the expanded arrangement that is suitable for efficient, long-endurance flight. It should be understood that the term "deploy" and "deployment" may refer to the deployable components moving from one UAVDC configuration to another.

Figure 1B:
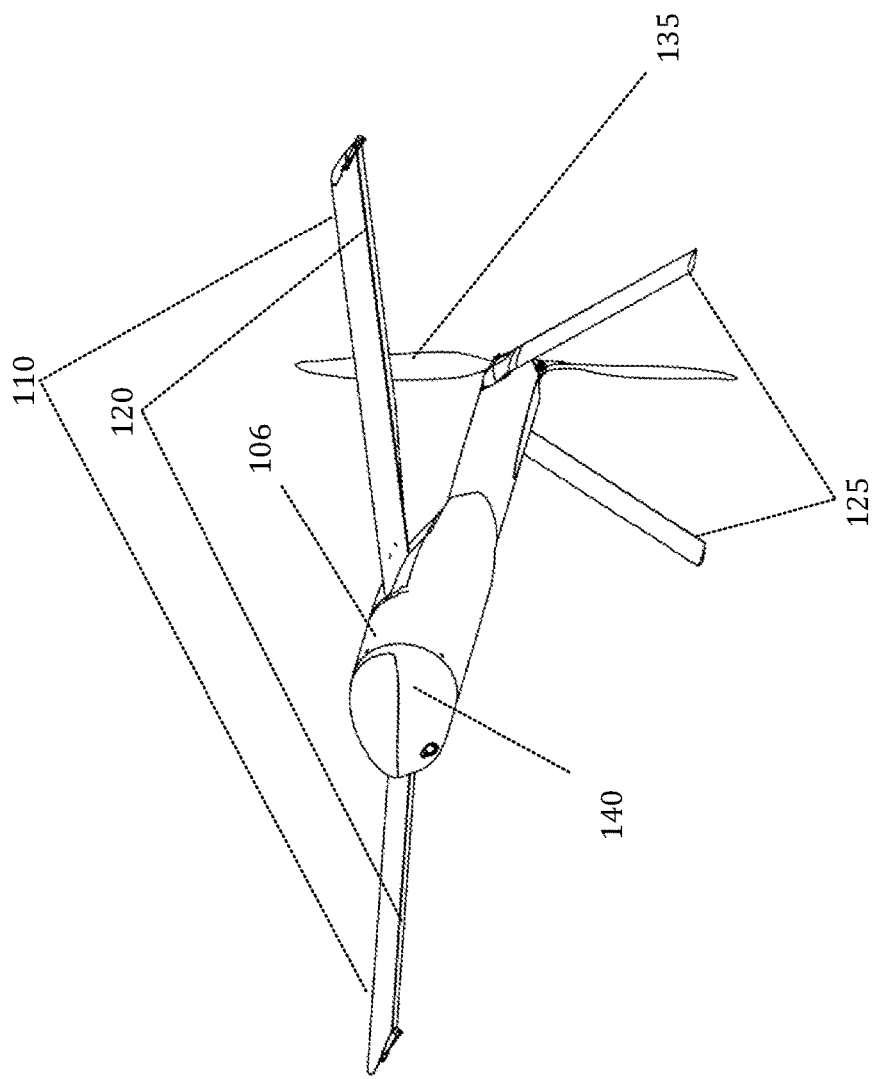
FIG. 1B illustrates the unmanned aerial vehicle with deployable components in a second configuration.

FIG. 1B illustrates an example of a second configuration (e.g., deployed arrangement 104). By using a deployed arrangement 104, embodiments may be able sustain the higher aerodynamics loads associated with flight at a high airspeed or high-g pull-up maneuvers. In this way, at least one of the intermediary configurations (e.g., the deployed arrangement 104) may be used in a launch recovery, wherein the UAVDC has been launched and has not slowed to an airspeed that the third configuration can sustain. Furthermore, the deployed arrangement may be able to sustain high-speed flight more efficiently than the expanded arrangement.

Figure 1C:
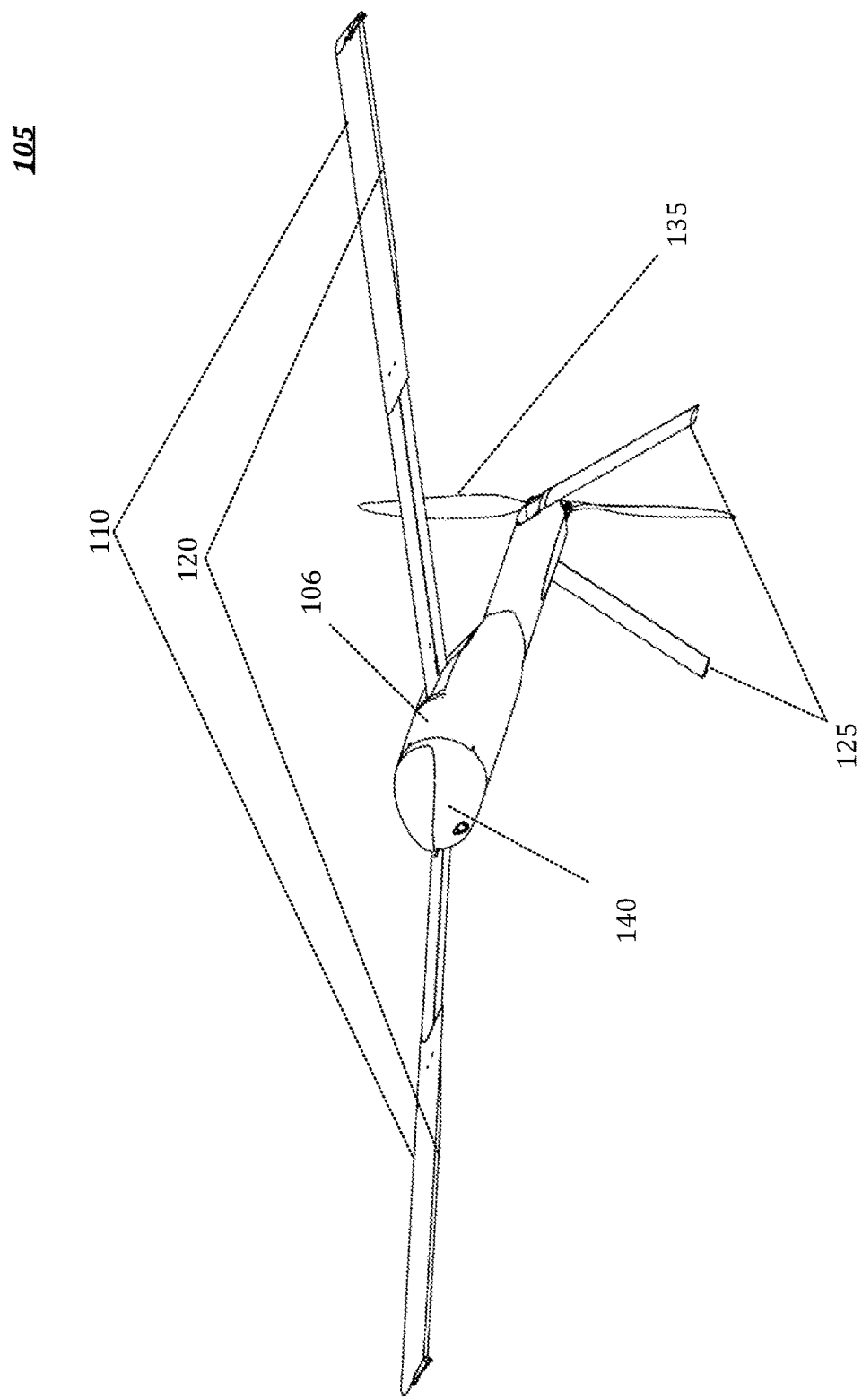
FIG. 1C illustrates the unmanned aerial vehicle with deployable components in a third configuration.

FIG. 1C illustrates an example of a third configuration (e.g., an expanded arrangement 105). By using the expanded arrangement the UAVDC may be able to achieve an increased level of aerodynamic efficiency (i.e., flight endurance) as well as an increased payload weight capacity. In various embodiments, the second configuration (e.g., deployed arrangement 104) and the third configuration (e.g., expanded arrangement 105) may be referred to as a common arrangement, but having wingspans that depend on the extent of the telescoped displacement of the wings.

As will be detailed below, during transformation from compact arrangement 102 to expanded arrangement 105, a UAVDC consistent with embodiments of the present disclosure may implement, but not be limited to, at least one of the following: wings 110 that may be configured to sweep and/or telescope, one or more trailing-edge hinged control surfaces that enable roll control ("ailerons") 120, one or more fold-away actuating stabilizers 125, one or more flexible aerodynamic fairings 130, one or more propulsion mechanisms (e.g., fold-away propeller 135), and a modular payload 140.

In further embodiments, the UAVDC may comprise intermediary configurations between the first configuration and second configuration or the second configuration and the third configuration. In the intermediary configurations, wings 110 may be at various stages of sweep or telescoping. It should be understood that the use of trailing-edge ailerons 120 and externally telescoped outer wing panels 310 may enable the UAVDC to continuously maintain controlled flight during transitions from the first configuration to the third configuration.

Figure 2A:
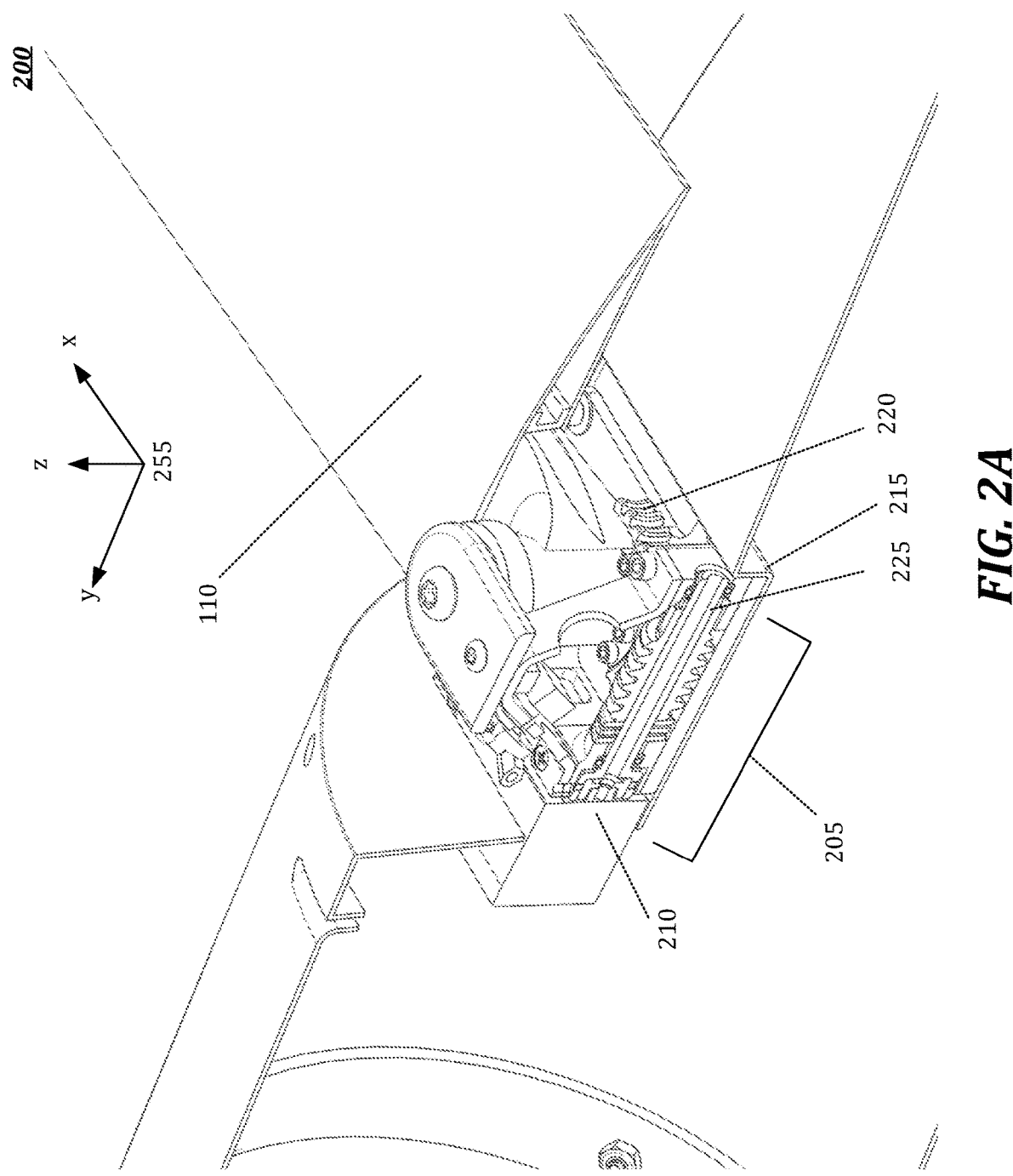
FIG. 2A illustrates a cut-away view of a sweeping gearbox coupled to an actuator.
Figure 2B:
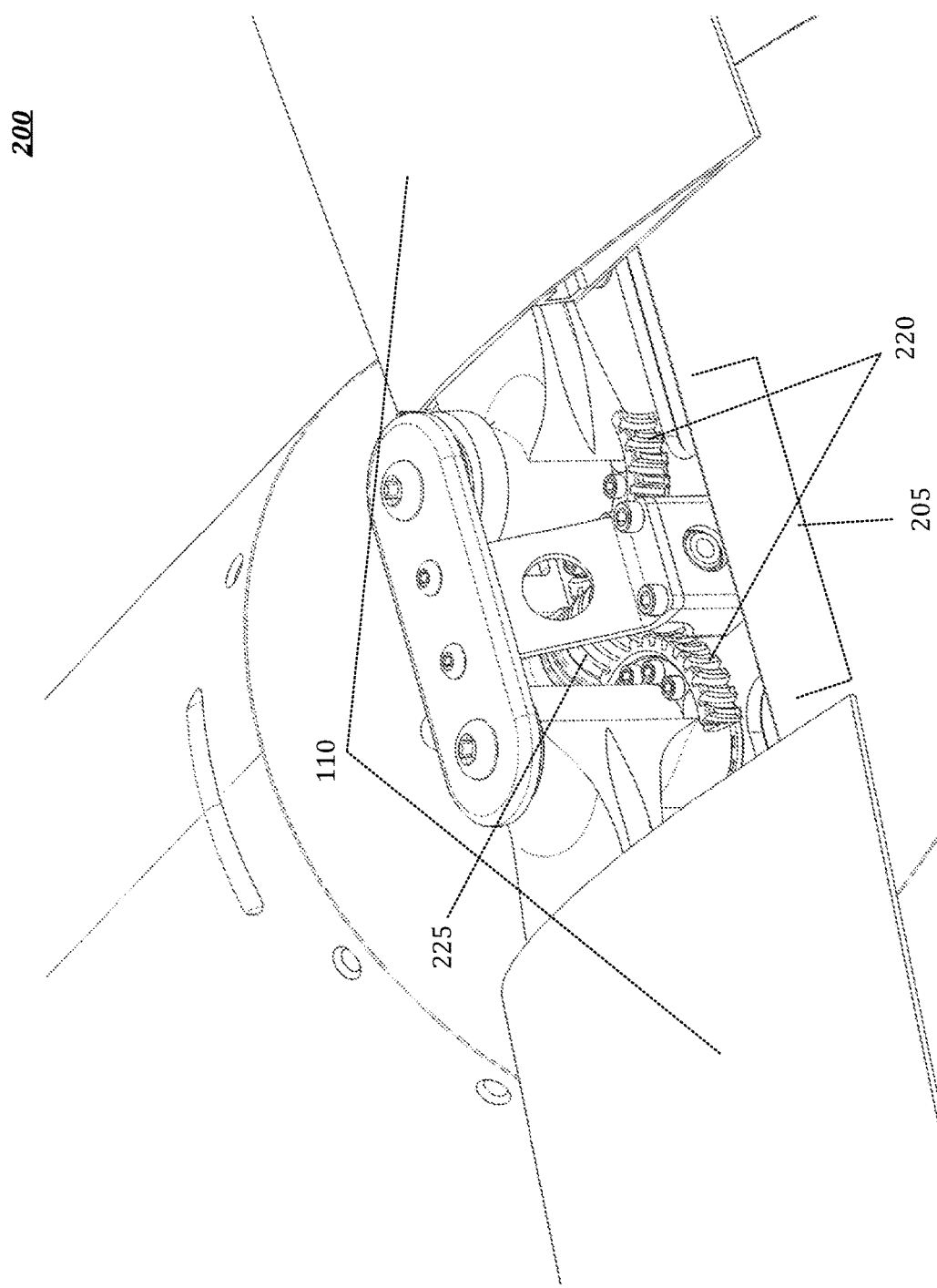
FIG. 2B illustrates a view of the sweeping gearbox.
Figure 2C:
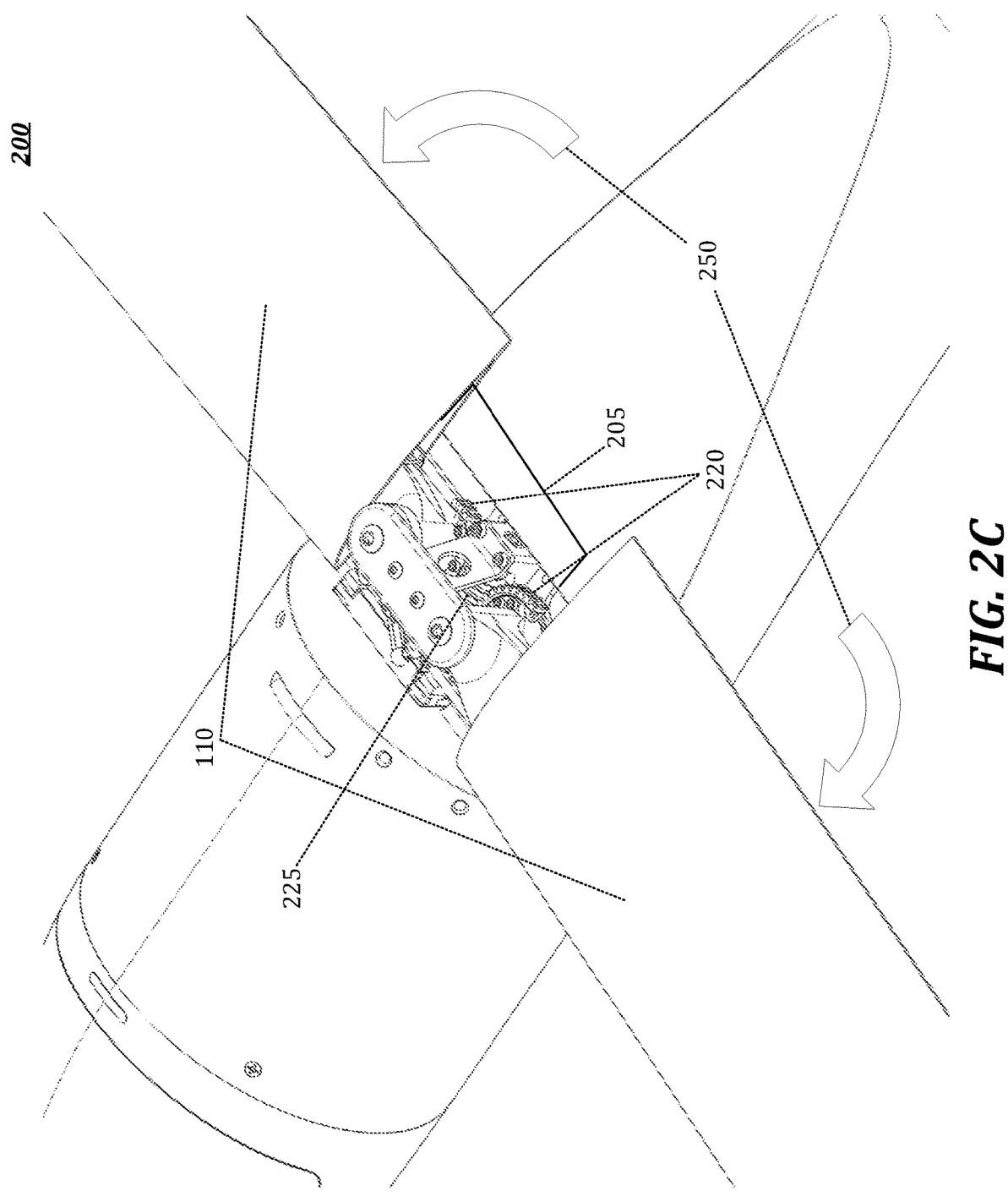
FIG. 2C illustrates another view of the sweeping gearbox and a direction of wing sweeping.
Figure 11A:
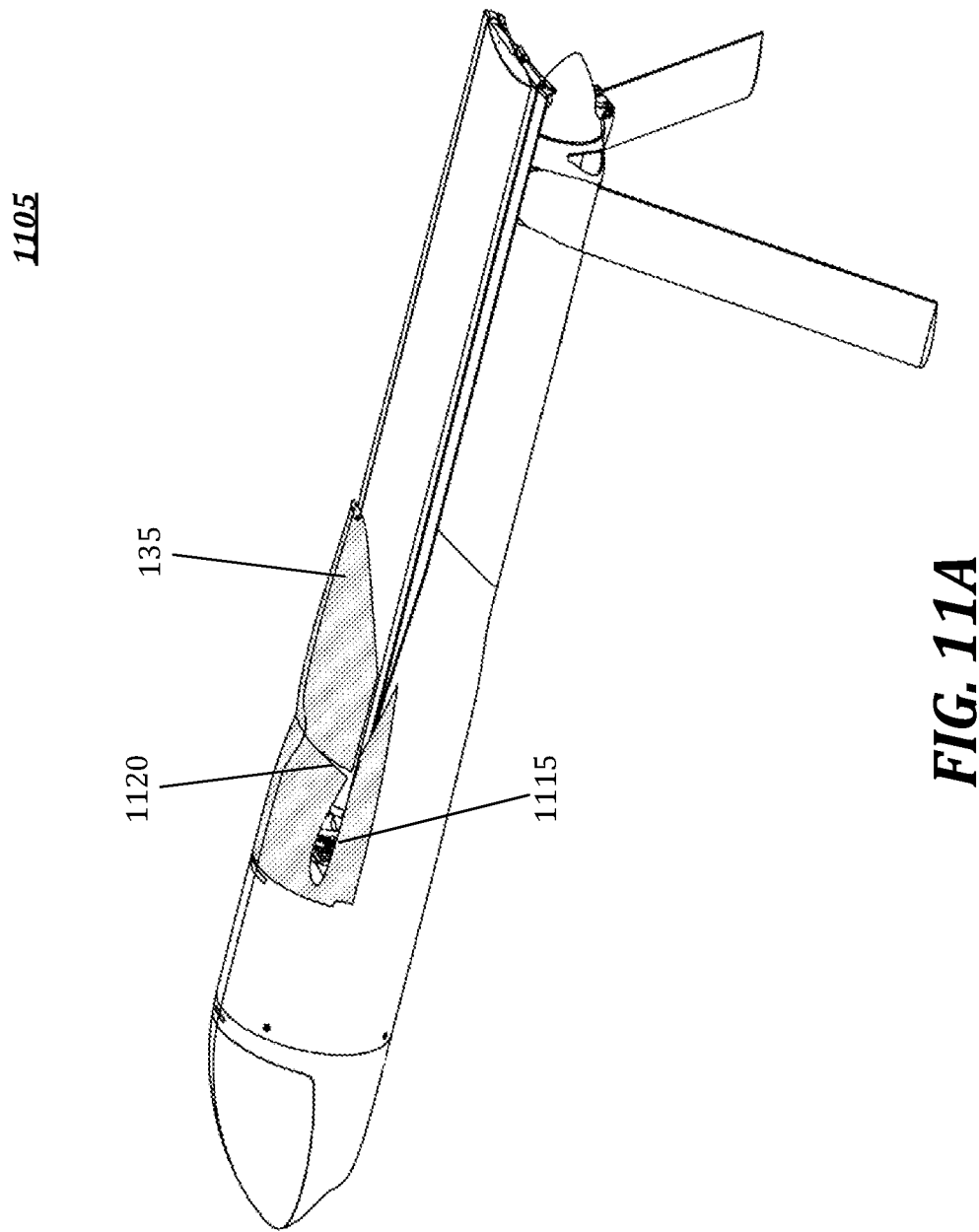
FIG. 11A illustrates a fairing in a first configuration.
Figure 11B:
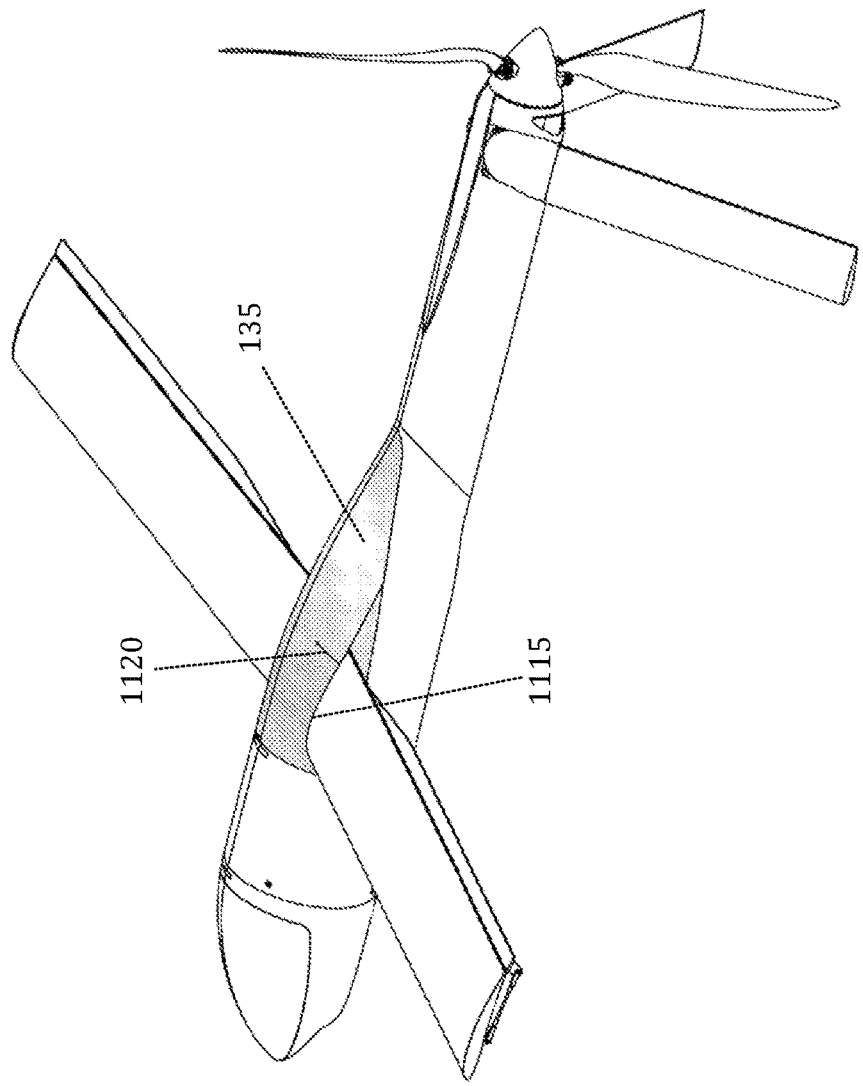
FIG. 11B illustrates the fairing in a second configuration.

In the first configuration, prior to deployment, the aforementioned wings 110, stabilizers 125, and propeller 135 may be stowed against a fuselage 106 of the UAVDC (i.e., folded and out of the way during vehicle launch). Fairing 130 may flex to accommodate wings 110 in their stowed configuration and then be configured to flex in a way so as to accommodate a sweeping motion of wings 110. Once launched, the UAVDC may transform from the first configuration into the second configuration. In the second configuration, wings 110 may be deployed by way of an outward sweeping motion (with fairing 130 flexing in a way to enable the sweeping motion). FIG. 2C illustrates an outward sweeping motion 250. As will be further detailed below, outward sweeping motion 250 may be enabled by, but not limited to, for example, a sweeping gearbox coupled to an actuator. FIGS. 2A-2C illustrate an example of a sweeping gearbox 205 coupled to an actuator 210. Further, sweeping motion 250 of wings 110 may enable configurable wing angles to optimize aerodynamics. Fairing 130 may be designed to accommodate wings 110 in the stored configuration as well as sweeping motion 250. Further, fairing 130 may close around wings 110 in order to maintain the aerodynamic integrity of the UAVDC, as shown in FIG. 11B.

By implementing a gearbox 205 configured to sweep wings 110 as well as orient wings 110 with optimal dihedral angles 265 and angles of incidence 275, embodiments of the present disclosure may provide improvements over conventional systems. For example, in conventional systems, aircrafts that implement sweeping wings and wing angle adjustments require use of secondary mechanics to orient the wing angles. Such secondary mechanics add to weight and cost, as well as provide additional modes of failure.

Figure 3:
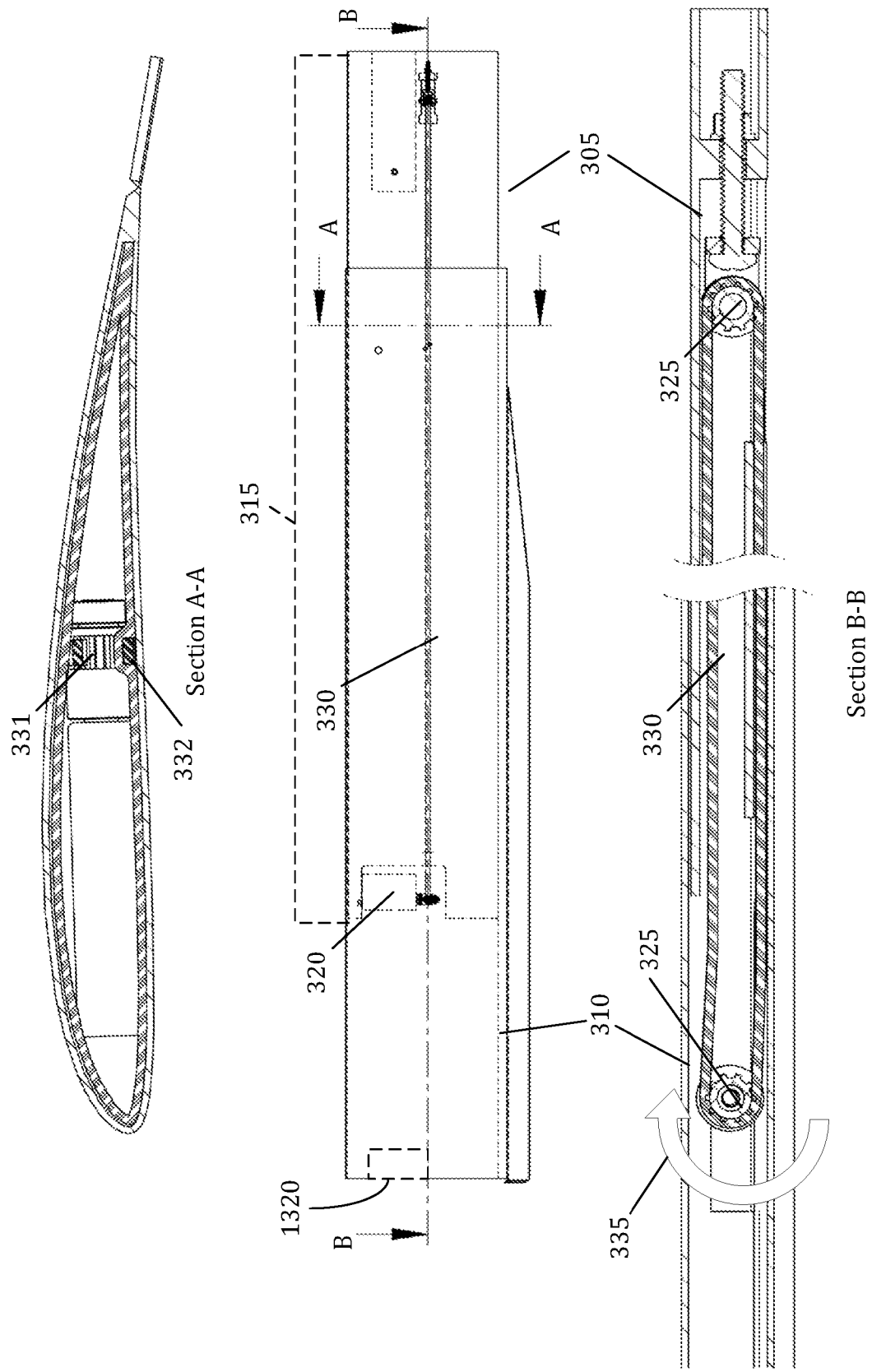
FIG. 3 illustrates an example of telescoping wings.

Still consistent with embodiments of the present disclosure, wings 110 may further be configured to telescope (i.e., expand in length) in the third configuration. Such telescoping wings may comprise a fixed inner section and one or more substantially hollow outer sections that slide along adjacent sections to provide a longer wingspan once deployed. FIG. 3 illustrates an example of telescoping wings 110 comprising a fixed inner section 305 that attaches to fuselage 106 and an outer section 310. In further embodiments, a plurality of nested outer wing sections may be implemented. In this way, wings 110 may be stored in a compact arrangement 102 and later extend (i.e., telescope) to provide additional lift during the expanded arrangement 105. As will be detailed below, a telescoping mechanism ("telescoping means") consistent with embodiments of the present disclosure may employ, for example, a belt system 315, a scissors mechanism, or a piston mechanism to extend and/or retract the wings.

The telescoping means consistent with embodiments of the present disclosure enable a maximized wing span while maintaining roll control throughout the transition between configurations. For example, as the inner section is fixed, the outer sections may comprise a substantially hollow interior so as to enable the fixed inner section to reside within the interior of the outer section. The outer section may then slide outwards (i.e., telescopes), away from fuselage 106, thereby exposing the fixed inner section as it telescopes. The trailing-edge mounted control surfaces (e.g., ailerons 120) are mounted to the outer section and are therefore exposed and operable throughout the deployment and telescoping process; in this way, the wingspan of the UAVDC can expand while continually maintaining controlled flight during the transition (e.g., regardless of the outer section position relative to the inner section position).

In some embodiments, inner section 305 connects to the fuselage 106, while outer section 310 may be telescoped outward from fuselage 106. Trailing-edge ailerons 120 may connect to outer section 310 to enable roll control. In this way, trailing-edge ailerons 120 may provide roll control even when wings 110 are not extended. Trailing-edge ailerons 120 may be connected by a hinge at a rear-most point of the wing in order to maximize an internal volume of the outer section 310, which, in turn, maximizes the overall span of the wing 110 in its third configuration. In various embodiments, other configurations of wing control surfaces, such as spoilers, may be implemented within the spirit and scope of the present disclosure.

By implementing hollow outer telescoping wing section 310 and trailing-edge hinged aileron 120, a plurality of improvements are introduced. A typical telescoping wing utilizes telescoping outer panels that are stored within the fixed inner panel, this precludes the use of ailerons mounted to the outer panels until the wing panels reach a telescoped state. Furthermore, conventional aileron implementations are configured within the wing surface itself, thereby reduce the amount of internal volume available in the wing. The reduced internal volume decreases the available depth of an interior wing section placement in a telescoping wing system, thereby leading to a smaller displacement in a telescoped configuration. In this way, conventional roll control surfaces may reduce the final length of a telescoped wing.

Attaching trailing-edge hinged ailerons 120 to the outer section 310 of the telescoping wing 110 enables the inner section 305 of telescoping wing 110 to be stowed further within the interior of outer section 310 while still providing the necessary roll control to maintain flight in the deployed arrangement, before the wings are telescoped. In turn, when wings 110 are telescoped, the displacement of the outer section 310 is increased by a range greater than that of other telescoping wing systems, thereby leading to the benefits of increased wingspan over a conventional aerial vehicle capable of compact configurations. Further still, extending outer section 310 of the telescoping wing 110 from the fuselage further enables the trailing-edge hinged ailerons 120 to provide increased roll control of the UAVDC.

Consistent with embodiments of the present disclosure, the control surfaces (e.g., trailing-edge hinged ailerons 120) may be operable in all of the UAVDC's configurations. That is, the control surfaces may be operable in the compact arrangement 102, the deployed arrangement 104, and in the expanded arrangement 105. Furthermore, the control surfaces may be operable during the transitionary phases between each of those arrangement.

For example, trailing-edge hinged ailerons 120 may be operable in between the first configuration (e.g., compact arrangement 102) and the deployed arrangement 104 (e.g., engaged in operation at approximately a 45-degree sweep) in order to provide post-launch stabilization for the UAVDC. Moreover, trailing-edge hinged ailerons 120 may be operable when the UAVDC is in the deployed arrangement 104 to provide flight control, as well as the transitionary stage between the deployed arrangement 104 and the expanded arrangement 105. Finally, trailing-edge hinged ailerons 120 may be operable in the expanded arrangement 105 to provide additional, more effective flight control.

Figure 4A:
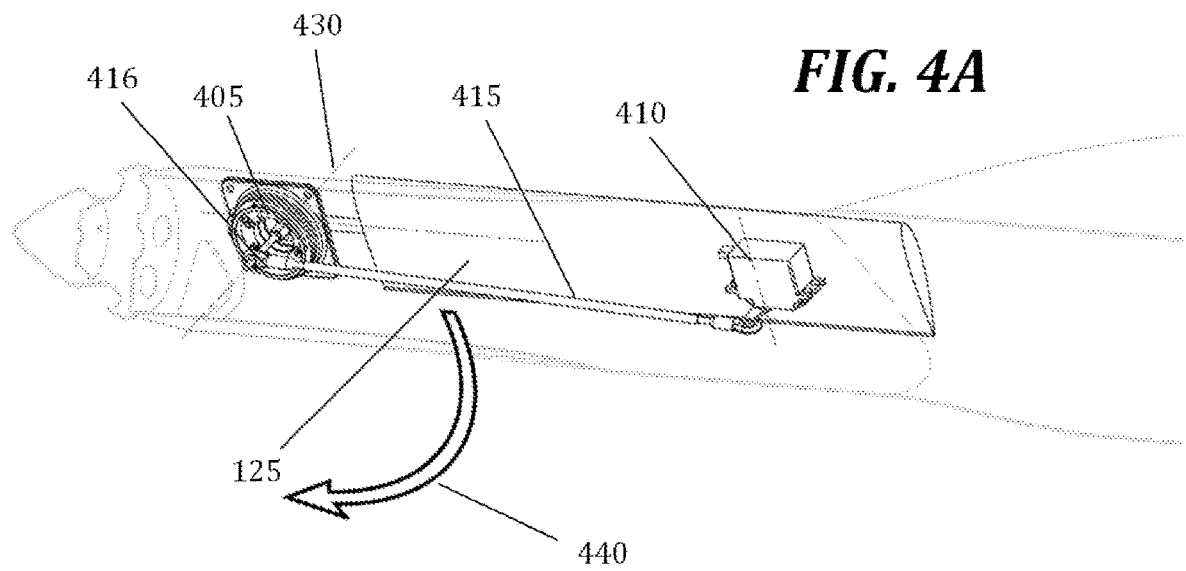
FIG. 4A illustrates an example of stabilizers in a first configuration.
Figure 4B:
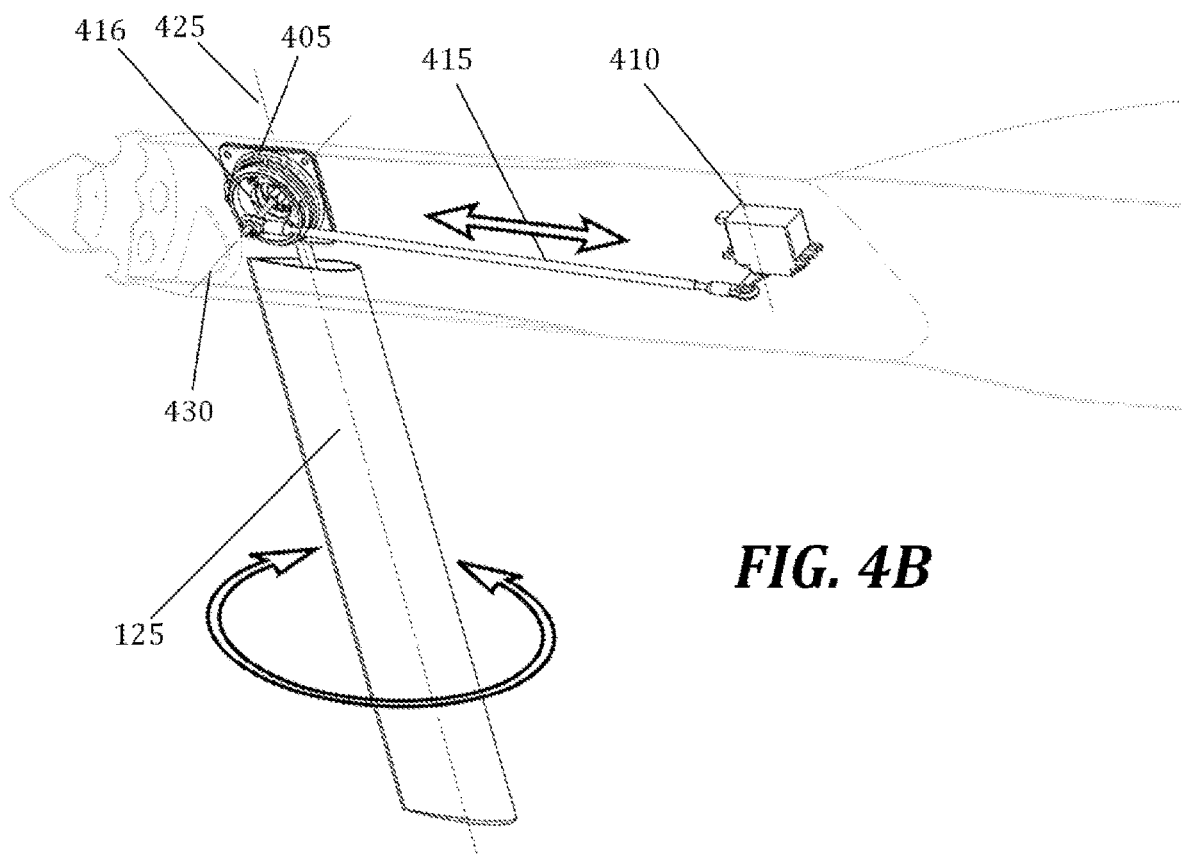
FIG. 4B illustrates an example of the stabilizers in a second configuration.
Figure 4E:
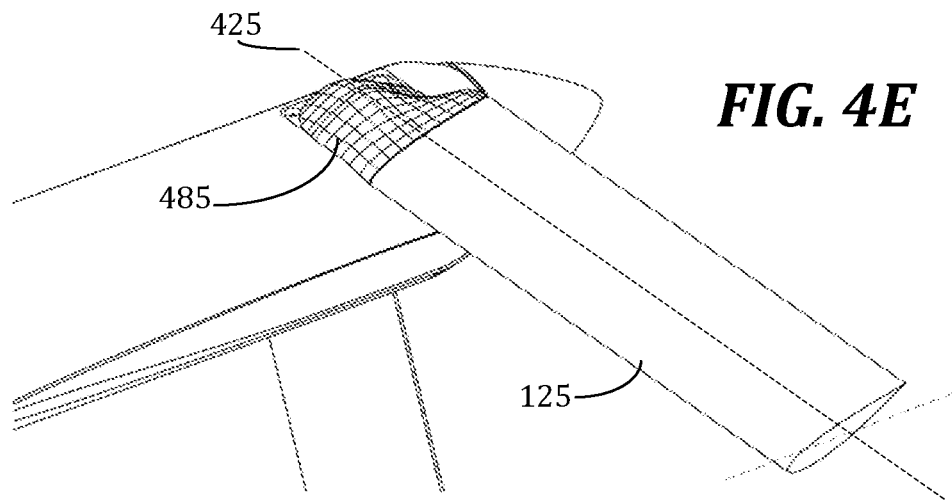
FIG. 4E illustrates an example of stabilizers in a first pivot angle.
Figure 4F:
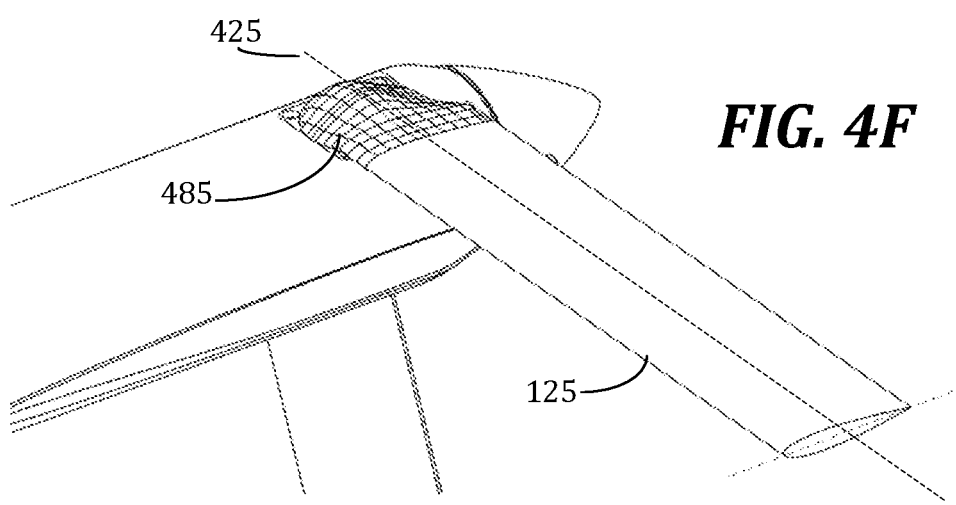
FIG. 4F illustrates an example of stabilizers in a second pivot angle.
Figure 4G:
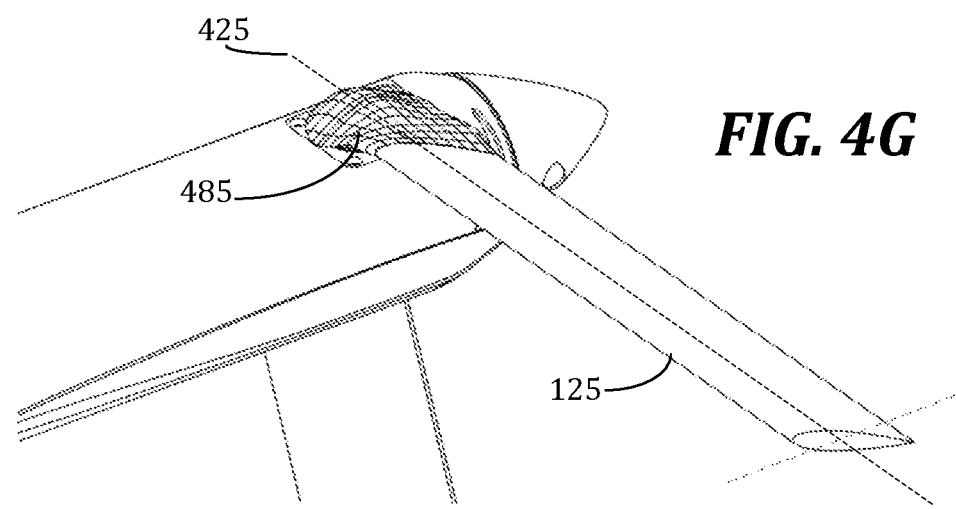
FIG. 4G illustrates an example of stabilizers in a third pivot angle.

One or more stabilizers 125 of the UAVDC may be deployed in the intermediary configurations, second configuration, and/or the third configuration. Stabilizers 125 may deploy from a first stabilizer configuration 450 to a second stabilizer configuration 455 by rotating about axis 430, as shown in FIGS. 4A-4D. Once in the second stabilizer configuration 455, stabilizer 125 can further serve as a control surface, providing flight control by pivoting about axis 425. As will be detailed below, deployment about axis 430 may be implemented via, for example, pre-loaded springs 405. In further embodiments, stabilizers 125 may be deployed upon interfacing with air resistance. For example, when stabilizers 125 interface with an airstream, a resulting drag force may cause stabilizers 125 to move into a deployed configuration. Servos 410 may actuate the stabilizers 125 about axis 425 once stabilizers 125 are deployed. FIGS. 4E-4G illustrate the stabilizer 125 in the deployed configuration, at various pivot angle about axis 425.

Deployable control surfaces, embodied in the present disclosure as stabilizers 125, are improved over conventional systems, for example, by enabling automatic deployment without requiring controlling components (e.g., actuators and linkages) to adjust. Further, by implementing a flexible fairing, the aerodynamic efficiencies may be improved. It should be understood that not all embodiments of the UAVDC may comprise each of the aforementioned components, while other embodiments of the UAVDC may comprise additional components, and yet other embodiments still may comprise various combinations of the embodiments described in the present disclosure.

Propeller 135 of the UAVDC may deploy upon interfacing with the air resistance. In further embodiments, springs and/or centripetal force from a rotation of propeller 135 may be implemented in deploying propeller 135. FIG. 5 illustrates an example of propeller 135 and a direction of deployment 505 for propeller blades 510.

Figure 6A:
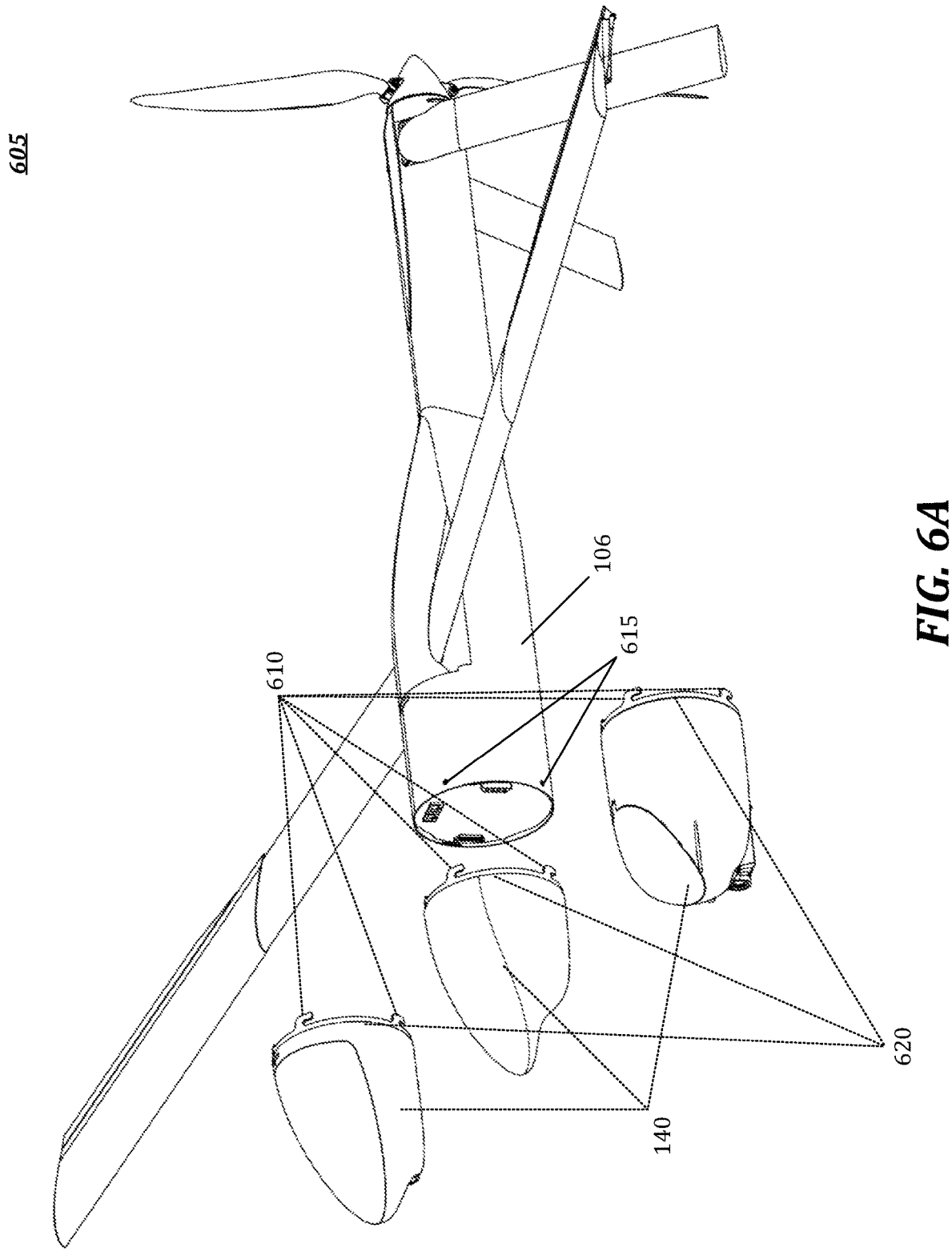
FIG. 6A illustrates an example of a modular payload.

A UAVDC consistent with embodiments of the present disclosure may be configured to receive a modular payload 140. In some embodiments, modular payload 140 may remain fixed in both the first and second configuration. By way of non-limiting example, modular payload 140 may be configured into the UAVDC, serving as a nose of fuselage 106. FIG. 6A illustrates an example of a plurality of modular payloads 140 configured to be attached to fuselage 106 in a fixed position 605. To facilitate modularity, modular payload 140 may comprise hooks 610 configured to hook around pins 615 in a twist-to-lock fashion. In this way, modular payload 140 may be inserted into fuselage 106. A ridge 620 may orient modular payload and provide a flush transition from modular payload 140 to fuselage 106. Further, pins 615 may comprise screw threads to tighten around a nut, thus securing hooks 610, and accordingly, modular payload 140, in place. In further embodiments, modular payload 140 may comprise protrusions that are configured to fit into slots embedded within fuselage 106. Modular payload 140 may be inserted into fuselage 106 along slots configured to receive the protrusions and turned to lock modular payload 140 to fuselage 106.

Figure 6B:
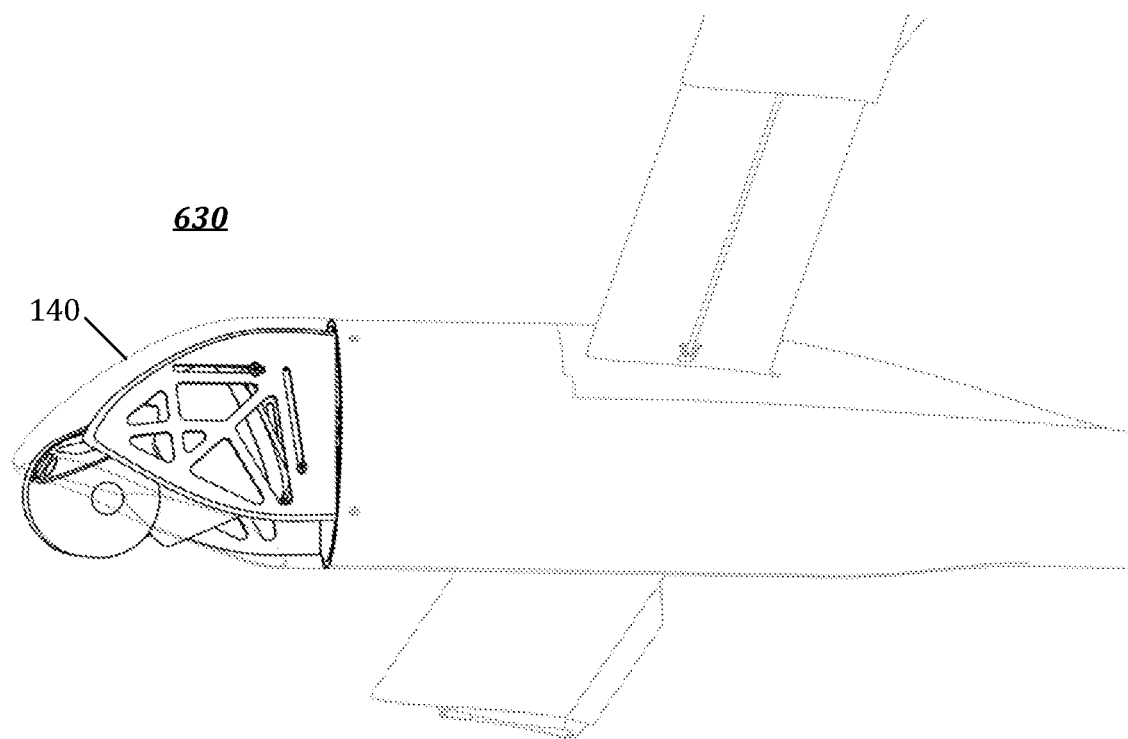
FIG. 6B illustrates an example of a modular payload with deployable components in a first configuration.
Figure 6C:
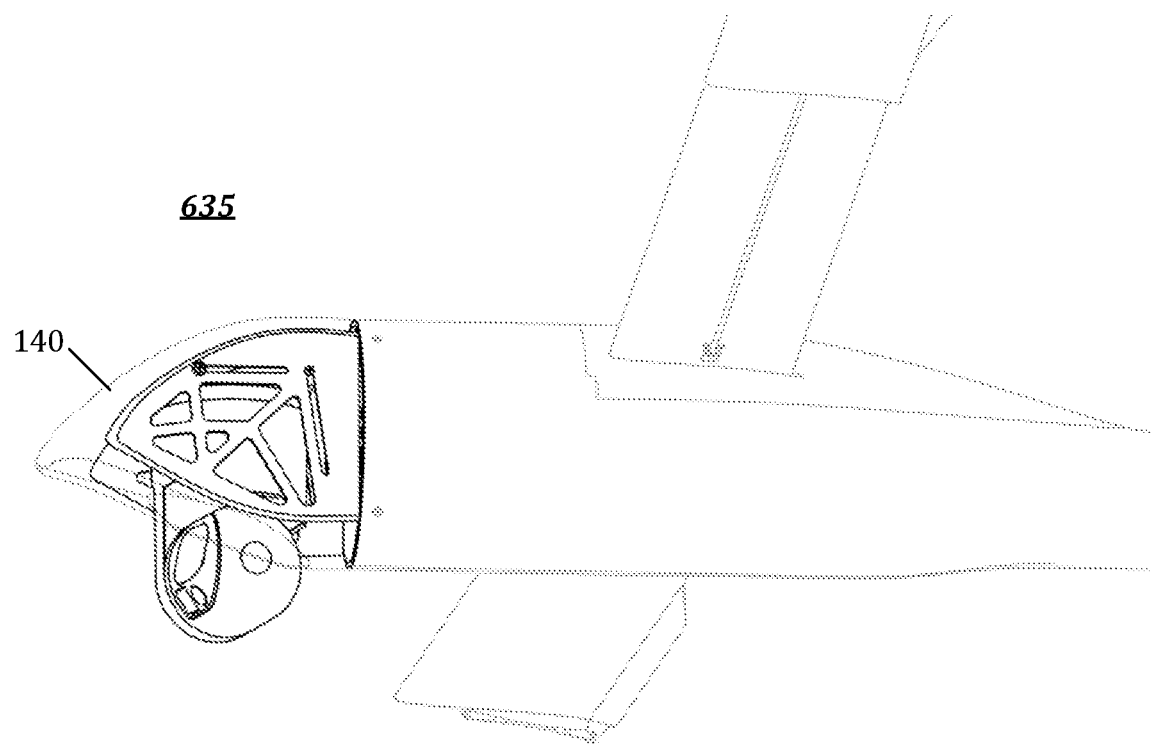
FIG. 6C illustrates an example of the modular payload with deployable components in a second configuration.

While modular payload 140 may be locked in a fixed position 605, it may comprise deployable components within, as shown in FIGS. 6B and 6C, illustrating modular payload in a first configuration 630 and a second configuration 635, respectively.

Figure 6D:
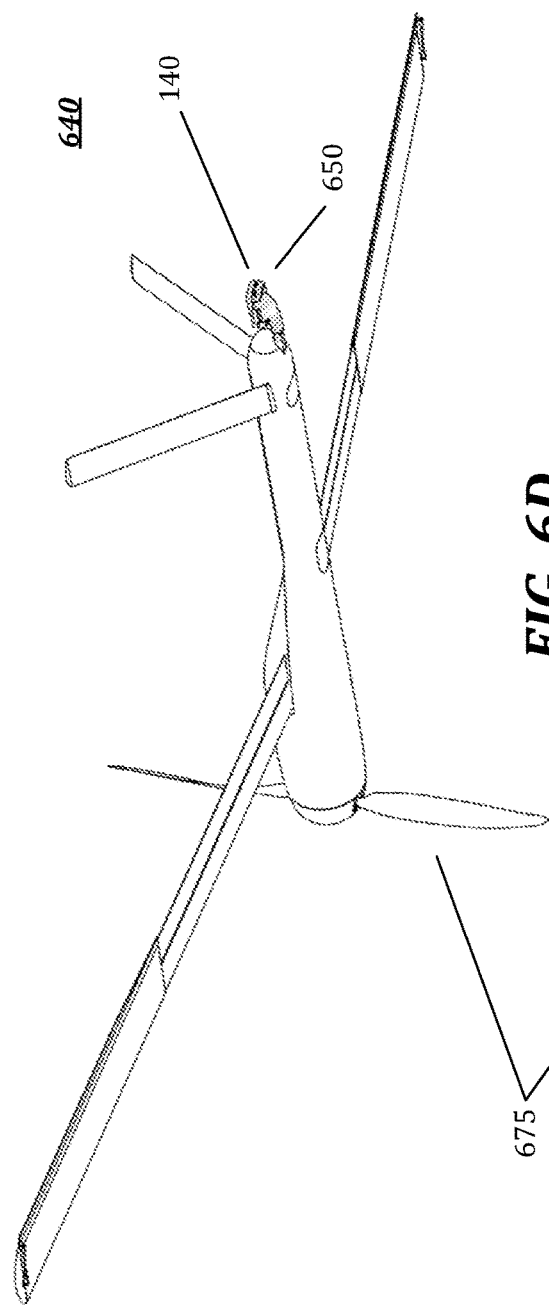
FIG. 6D illustrates an example of another modular payload in a compact configuration.
Figure 6E:
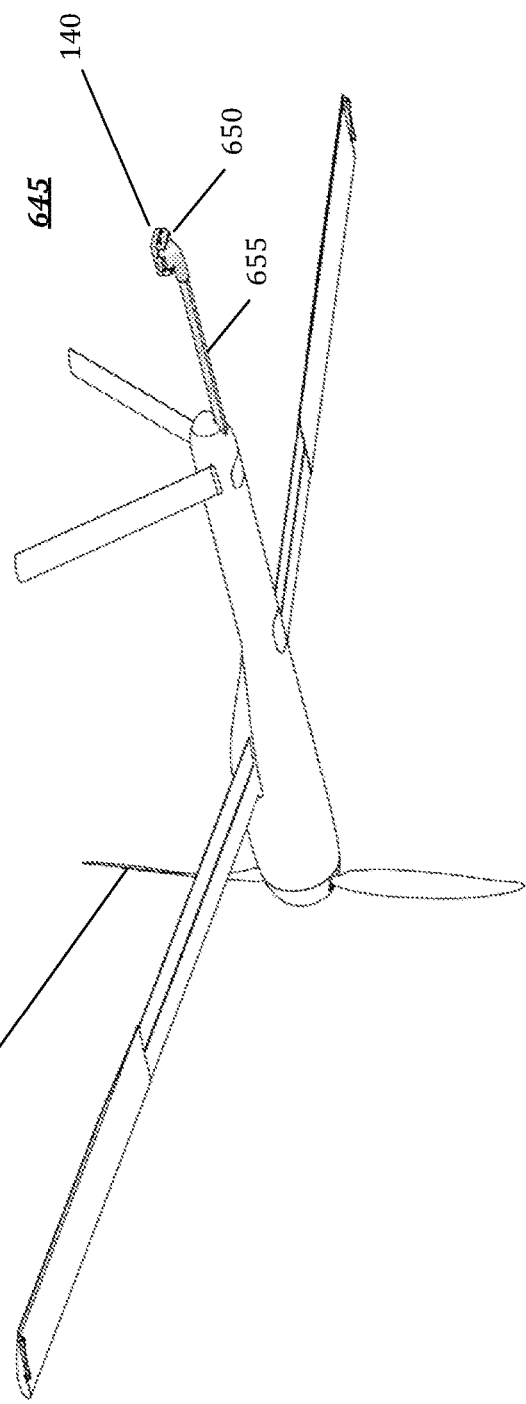
FIG. 6E illustrates an example of the modular payload in a deployed configuration.

In other embodiments, modular payload 140 may have at least two configurations for location with respect to fuselage 106. FIG. 6D illustrates another example of a modular payload 140 in a first position 640; FIG. 6E illustrates modular payload 140 in a second position 645. For example, modular payload 140 may be arranged in first position 640 when the UAVDC is in the first configuration ("compact configuration"), and deployed into a second position 645 while in the second configuration. By way of non-limiting example, the modular payload may be a sensing device 650 configured to a boom 655 telescoping out of the fuselage.

Embodiments of the present disclosure may provide improvements over conventional unmanned aerial vehicles including, but not limited to the following examples:
  Improved aerodynamic efficiency which increases flight endurance;
  Increased payload capacity;
  Launch and transition to flight without the assistance of external aerodynamic treatments such as a parachute or balloon; and
  Maximized mission capability (i.e., its modular payload and reconfigurable and highly efficient airframe enable the UAVDC to efficiently perform a wider array of missions such as, for example, but not limited to, Intelligence Surveillance Reconnaissance (ISR), Signals Intelligence (SIGINT), weather, geophysical, environmental, and the like.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. CONFIGURATION

FIG. 1C illustrates an UAVDC consistent with embodiments of the present disclosure. Embodiments of the present disclosure may comprise a fuselage 106, one or more antennas 705, power source 1310, wings 110 that may be configured to sweep and/or telescope, stabilizers 125, and payload 140. Further embodiments may comprise a propulsion mechanism, such as, for example, propeller 135.

Fuselage 106 may be comprised of, but not limited to, for example, carbon fiber. Further, fuselage 106 may be comprised of, but not limited to, for example, a composite material (e.g., fiberglass, Kevlar, Spectra). In various embodiments, plastics may be used, including, but not limited to 3D printed plastics. Fuselage 106 may take an aerodynamic configuration to facilitate speed and reduced air resistance.

Figure 7:
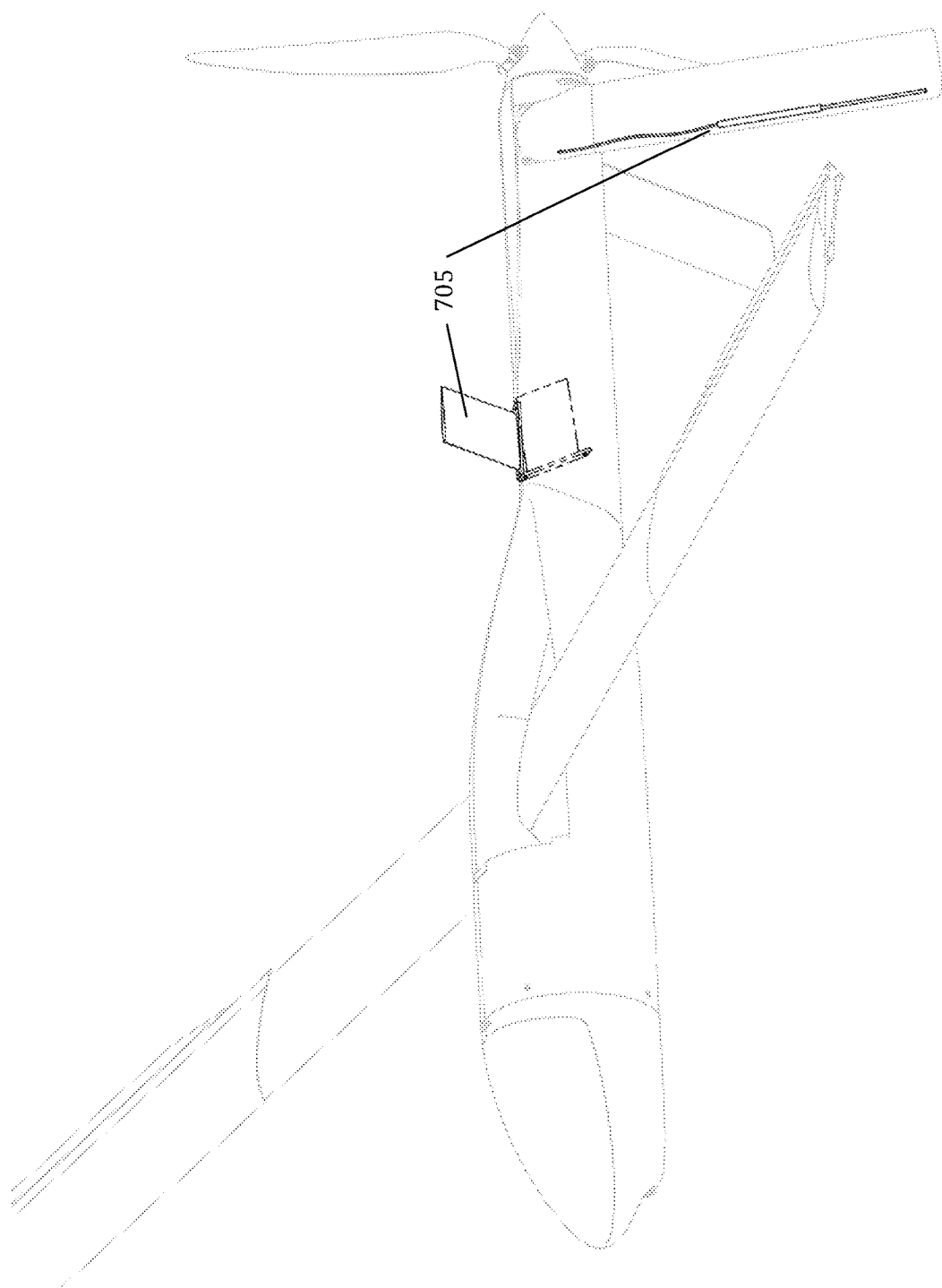
FIG. 7 illustrates potential positions for an antenna.

Referring now to FIG. 7, antenna 705 may be positioned in various portions of the UAVDC. For example, antenna 705 may be fixed, and, in some embodiments, may be conformal (i.e., built into the skin of fuselage 106). Alternatively, antenna 705 may be deployable. For example, antenna 705 may be configured to deploy out from the fuselage (e.g., via a spring) on a hinge. As another example, as illustrated in FIG. 7, antenna 705 may be built into at least one of stabilizers 125. In this way, when stabilizers 125 are deployed, antenna 705 may also be deployed. In further embodiments, and as illustrated in FIGS. 6D and 6E, modular payload 140 may be embodied as antenna 705. In this way, antenna 705 may be attached to boom 655 and configured to extend from fuselage 106. In yet further embodiments, a plurality of antennas may be integrated within the UAVDC.

Antenna 705 may be in operable communication with an on-board controller, as further detailed with reference to FIG. 16. In this way, antenna 705 may both send and receive data to and from a remote location (e.g., a UAVDC operator). For example, antenna 705 may be used to receive control signals from a remotely-located operator. The control signals may be processed and decrypted by the on-board controller, which, in turn, may operate the UAVDC accordingly. Furthermore, the antenna 705 may be used to communicate various data from the UAVDC to, for example, the remotely located operator.

Data may include, but not be limited to, for example, sensor data collected by various sensors on-board the UAVDC (e.g., sensors within modular payload 140). In yet further embodiments, the data may include telemetric data for the UAVDC, including, but not limited to, for example, global positioning data, accelerometer data, gyroscopic data, velocity data, and the like. In some embodiments, the aforementioned data may be collected, processed, and encrypted by the on-board controller prior to its communication.

Figure 8:
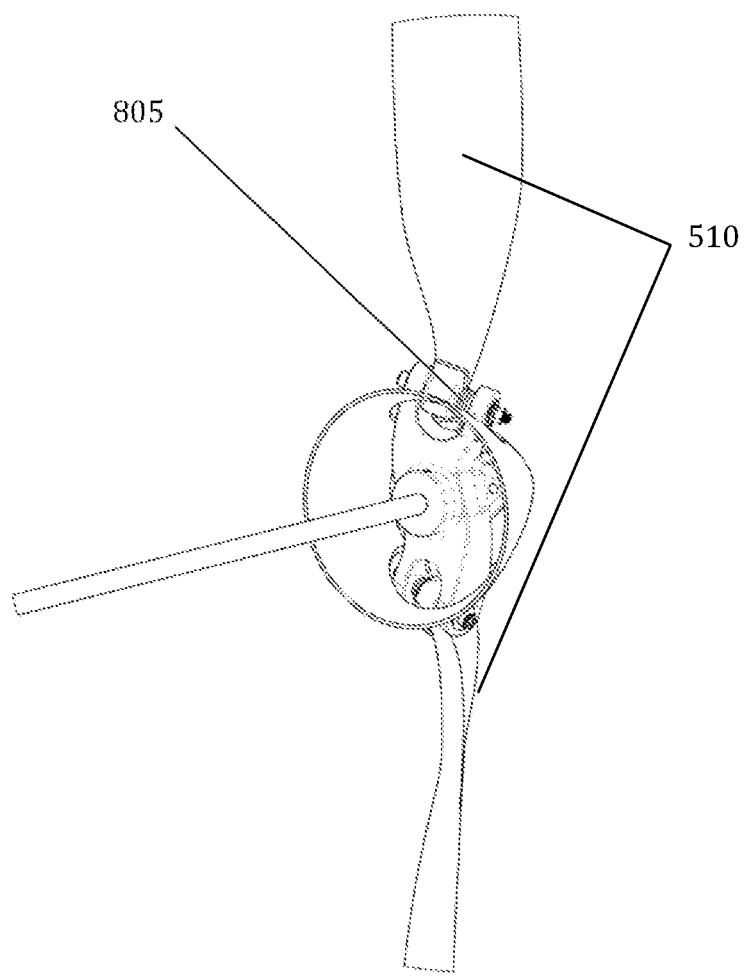
FIG. 8 illustrates a propeller and associated components.

It should be understood that the UAVDC may be configured with various propulsion mechanisms, and that propeller 135 illustrated in FIG. 8 is just one illustrated variation. Other propulsion mechanisms may include, but are not limited to, rockets, jet engines and compressed gas jets. Moreover, in some embodiments, no propulsion may be required at all, as the UAVDC may have characteristics of a glider. In such embodiments, the UAVDC may be launched from, for example, a tube or released from, for example, an airplane within gliding range of its mission target. The various properties of the UAVDC, as described in various embodiments herein, may provide the UAVDC with sufficient flight time (upon, for example, deployment as detailed below with reference to FIG. 14) to accomplish its mission without requiring additional propulsion.

Figure 9:
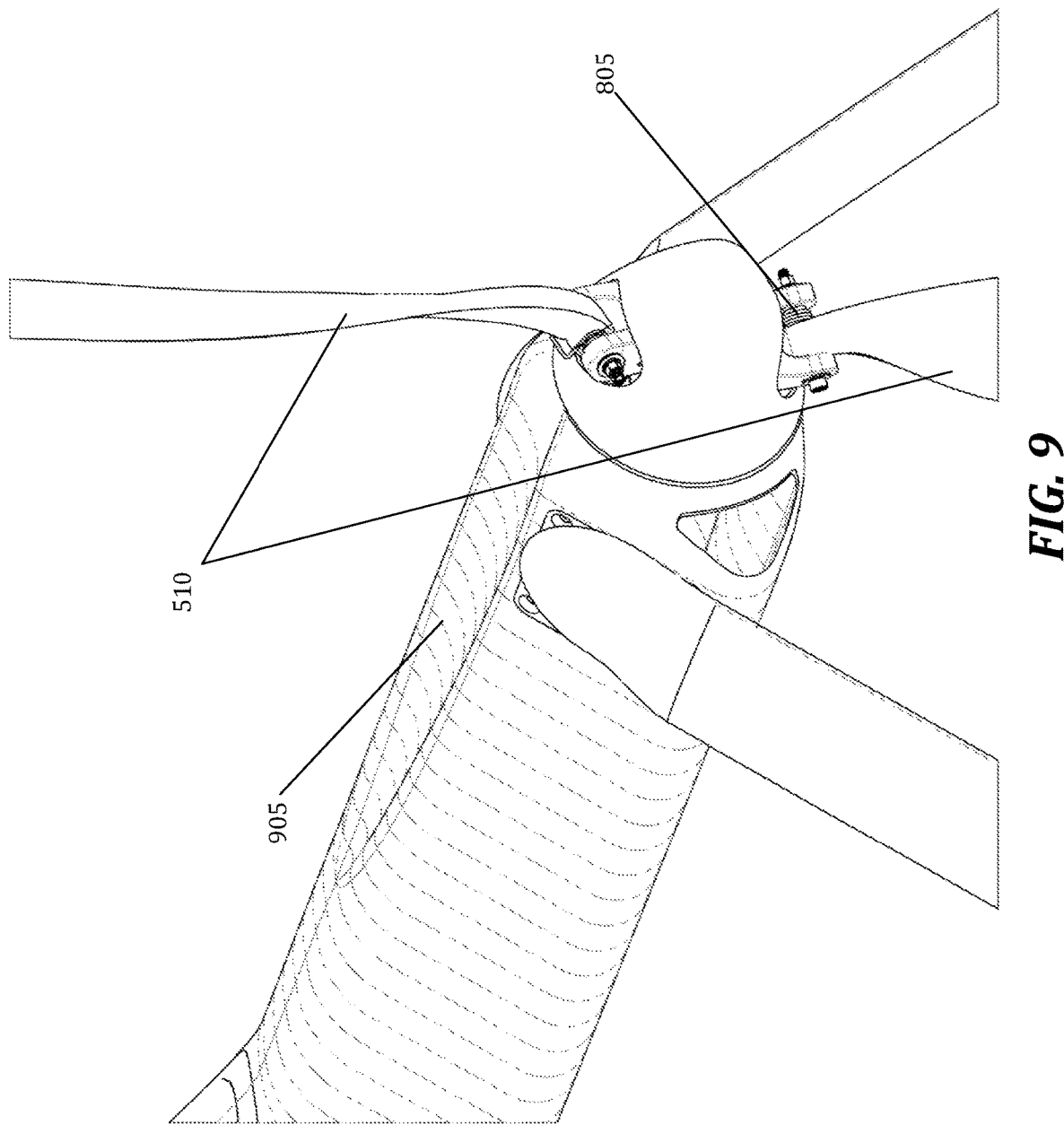
FIG. 9 illustrates grooves in the fuselage configured to receive propeller blades in a folded configuration.

Propeller 135 may comprise propeller blades 510 that fold against fuselage 106. While propeller 135 is shown as having two propeller blades 510, it should be understood that more or fewer propeller blades may be utilized. For example, only a single propeller blade may be used. As illustrated in FIG. 9, fuselage 106 may comprise grooves 905 configured to receive propeller blades 510 in a folded configuration. During flight, propeller 135 may be unfolded by means of, for example, air pressure (e.g., due to drag) against the propeller or centripetal force from rotation of propeller 135. In other embodiments, propeller 135 may be unfolded by using springs (e.g., torsion springs 805) to enable rapid deployment, thus preventing propeller blades 510 from hitting the stabilizers 125 before propeller 135 is completely unfolded.

Although many of the figures illustrate propeller 135 in a rear-mounted position, it should be understood that, in embodiments where a propulsion mechanism is provided, propeller 135 may be configured at different positions of the UAVDC. For example, in some embodiments, propeller 135 may mount to the front of the UAVDC instead of the rear. FIGS. 6D and 6E illustrate an embodiment of a UAVDC comprising a tractor propeller 675 mounting to the front of the UAVDC.

Moreover, the positioning of propeller 135 may be impacted by the deployment of wings 110. Referring to FIG. 10A, propeller blade 1005 is mounted to fuselage 106, trapped beneath wings 110. During a launch of the UAVDC in the first configuration, air drag or springs 805 may force propeller blade 1005 in the top position (e.g., mounted to the top of fuselage 106) towards its deployed state. Such deployment of propeller blade 1005, however, may be obstructed by wings 110 stowed immediately above, as illustrated in the first configuration.

The remaining propeller blade 1010 not obstructed by wings 110 may not be impeded from deployment, and therefore may deploy into the second configuration as designed. In order to prevent damage from the tendency of the remaining propeller blade 1010 to windmill while the propeller blade 1005 is still trapped, the hinge travel 1015 of the blades may be extended to allow blade 1010 to fold back to a position 1020 that aligns blade 1010 with the free stream as shown in FIG. 10B.

Referring back to FIG. 1A, the UAVDC may have a wing arrangement comprised of a single wing with two wing sections. The wing arrangement may be segmented in a left wing section and a right wing section to enable variable sweep at approximately a lateral plane of symmetry between the left wing section and the right wing section. In some embodiments, the wing sections may be a left wing and a right wing (e.g., wings 110). Still consistent with embodiments of the present disclosure, however, the wing arrangement may be a single wing comprised of the two wing sections.

The wing arrangement being configurable in a first arrangement (e.g., corresponding to the first configuration of the UAVDC), a second arrangement (e.g., corresponding to the second or third configuration of the UAVDC), and a third arrangement. In the first arrangement, the left wing section and the right wing section may be stowed against the fuselage at a first sweep deployment angle. In the second arrangement, the wing arrangement may be fully deployed for flight at a second sweep deployment angle. A third arrangement may comprise the wing sections at any wing deployment angle in between the first sweep deployment angle and the second sweep deployment angle.

To enable the sweep deployment angle, the UAVDC may comprise a sweeping gearbox configured to pivot the left wing section and the right wing section to enable the wing arrangement to sweep from the first arrangement to the second arrangement at any sweep deployment angle. The UAVDC may comprise an actuator coupled to the sweeping gearbox configured to actuate the sweeping of the wing arrangement at any sweep deployment angle.

Throughout the sweeping motion, fairing 130 may be configured to change from an open configuration to a closed configuration. Fairing 130 may begin in an open configuration by flexing to allow the first wing section and the second wing section to be stowed under the fairing in the first arrangement, and move to a closed configuration to provide aerodynamic and/or environmental advantages in the second arrangement.

The wings 110 may be stowed in a launch configuration as shown in first configuration 102. In some embodiments, the launch configuration of wings 110 may comprise a vertical offset. Wings 110 may be swept to a flight configuration by sweeping gearbox 205 (e.g., a sweeping means). For example, actuator 210 attached to sweeping gearbox 205 may comprise a worm gear 220 coupled to each wing and a worm 225 coupled to worm gears 220 and configured to spread the wings in sweeping motion 250. Sweeping gearbox 205 may sit on wing mount 215. Various other means may be used in sweeping wings 110, including, but not limited to, springs. In some embodiments, wings 110 may not need to be fully swept in order to enable flight. For example, the UAVDC may be capable of flight at an angle less than full sweep.

Figure 2D:
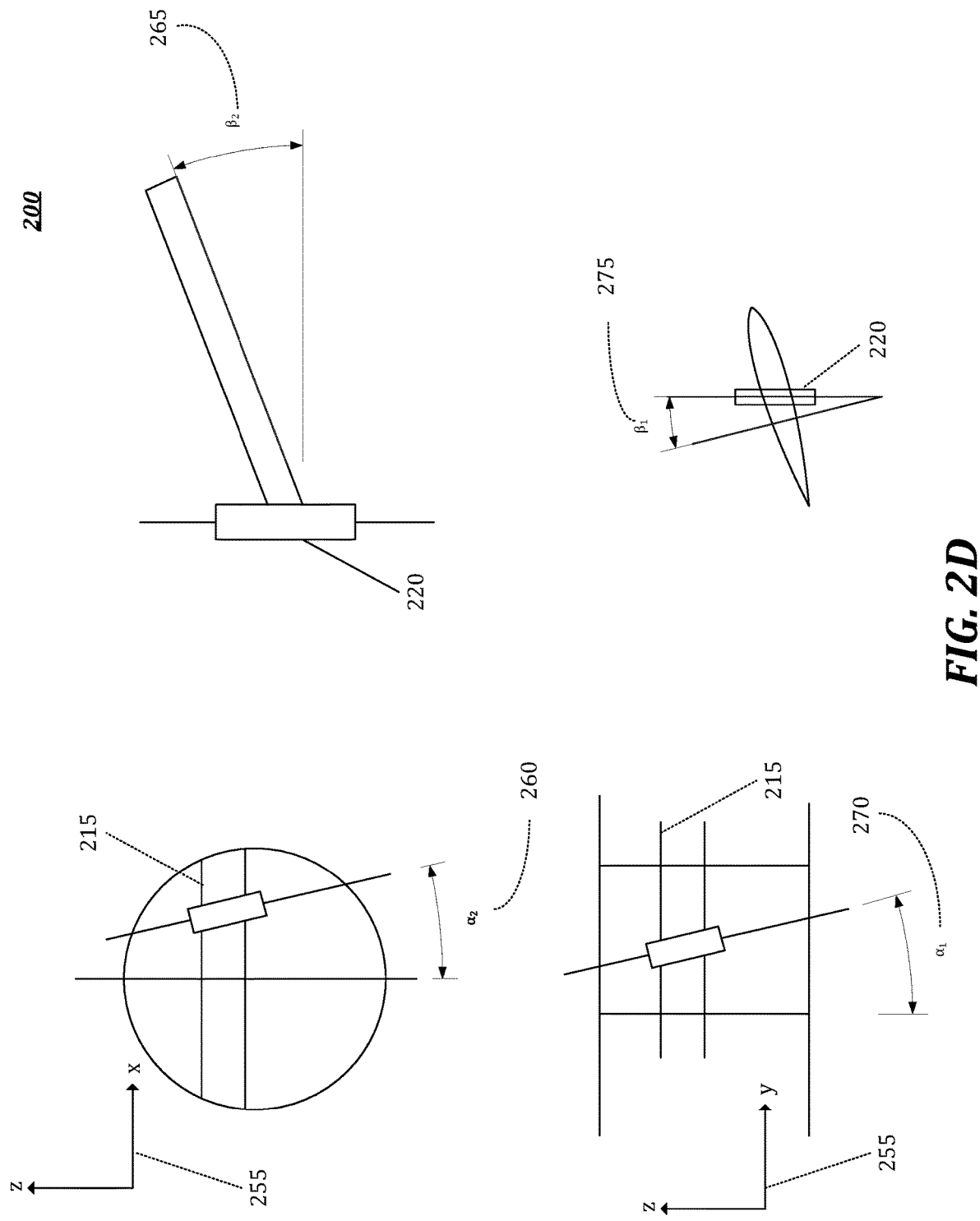
FIG. 2D illustrates a set of schematic drawings for enabling the sweeping gearbox to allow wings to have dihedral and incidence when deployed and to lay flat while stowed.

FIG. 2A illustrates a perspective cross-section view on an embodiment of the gearbox 205. Gearbox 205 may be configured such that wings 110 may be stored in the launch configuration with a first set of angles with respect to each other (e.g., flat with respect to each other) and with respect to the fuselage (e.g., flat with respect to the fuselage). FIG. 2B illustrates a full perspective of an embodiment of the gearbox 205. Gearbox 205 may be further be configured to cause wings 110 to be deployed with optimal incidence angles and dihedral angles in the swept configuration. This may be achieved by orienting each wing's axis of rotation as well as each wing's attachment to worm gear 220 (or "wing pivot"). FIG. 2C illustrates a larger view of an embodiment of the gearbox 205, attached to the wings 110. The wings 110 may be controlled by the actuation of the gearbox 205. As such, gearbox 205 may comprise two pivot axes around which the wings may sweep. FIG. 2D illustrates a schematic for illustrating geometry to enable a gearbox 205. For example, the axis of rotation may be oriented such that its angle in the Y-Z plane 270, as shown in reference to axes 255, may match an angle of attachment 265 to worm gear 220. Further the angle in the X-Z plane 260 may match an angle of attachment 275 to worm gear 220. With this configuration, wings 110 may be stowed flat with respect to each other and with respect to the fuselage, while deployed with optimal dihedral and incidence angles. The optimal dihedral angle may be the combination of the angle in the X-Z plane 260 and the angle of attachment 265; the optimal angle of incidence may be the combination of the angle in the X-Y plane and the angle of attachment 275. In this way, a single mechanism may both sweep wings 110 and orient wings 110 to desired dihedral angles and angles of incidence. The single mechanism for sweeping and orienting wings may reduce weight and complexity, thus increasing endurance and decreasing cost.

The UAVDC may comprise fairing 130 to reduce drag while enabling the outward sweeping motion 250 of wings 110. FIGS. 11A and 11B illustrate fairing 130 in a first configuration 1105 and a second configuration 1110, respectively. Fairing 130 may be made of a flexible material (e.g., fiberglass) such that it may bend out of the way as wings 110 sweep. In various embodiments, other materials may be used, including, but not limited to carbon fiber, Kevlar, and sheet metal. Fairing 130 may comprise wing hole cutouts 1115 to fit around wings 110's profile as wings 110 reach second configuration 1110.

As illustrated in FIG. 11A, fairing 130 in first configuration 1105 may be resting upon the sweeping wings 110 in compact arrangement 102 and undergoing tension from being held in a strained ("buckled") state. Slits 1120 may be implemented in fairing 130 to enable fairing 130 to flex adequately to accommodate sweeping wings 110 in compact arrangement 102. Upon the UAVDC entering second configuration (e.g., expanded arrangement 105), fairing 130 may flex as illustrated in FIG. 11B to close around the wing as wings 110 reach wing hole cutouts 1115. In second configuration 1110, fairing 130 may be in an unstrained state as it securely fits around wing 110 to minimize drag. If fairing 130 comprises a fibrous composite material, it may be desirable to use a fiber orientation to facilitate buckling and flexibility in the laminate (e.g., using +/−45 degree plies may exhibit greater flexibility and buckle easily in 0 and 90 degree directions).

Figure 11C:
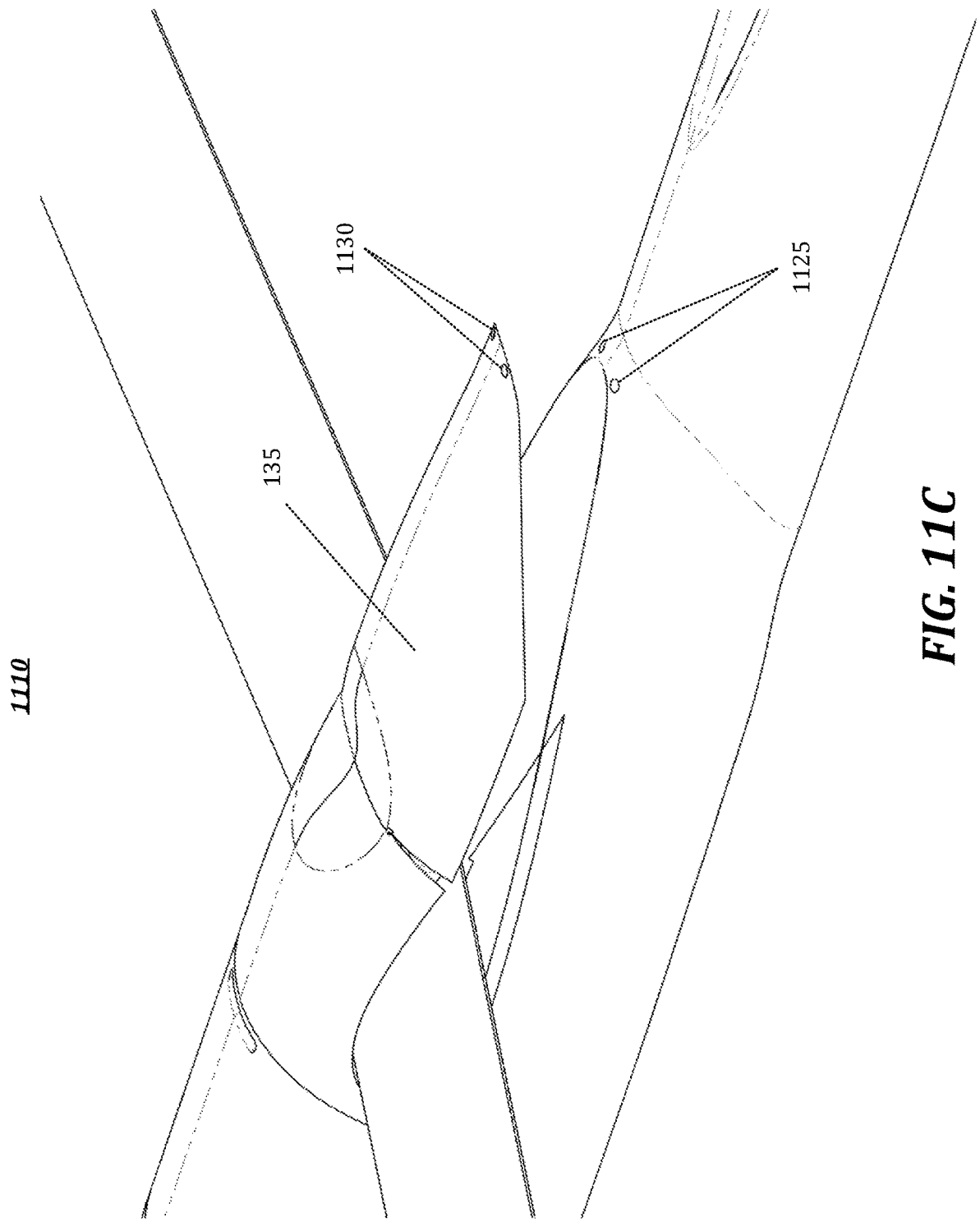
FIG. 11C illustrates the fairing comprising magnets.

In further embodiments, magnets 1125 may be employed to further lock fairing 130 around the swept wings 110, as shown in FIG. 11C. Magnets 1125 may be located on fuselage 106. Magnets of opposite polarity or a magnetic metal 1130 may be on fairing 130 to receive magnets 1125's magnetic attraction. In further embodiments, the location of the magnets 1125 and corresponding magnetic metal 1130 may be reversed.

As wings 110 are being swept, or, in some embodiments, after wings 110 have completely been swept, wings 110 may telescope. For example, inner section 305 may attach to fuselage 106 of the UAVDC. Inner section 305 may be stowed at least partially within outer section 310 during the compact first configuration. Outer section 310 may comprise a substantially hollow interior. An exterior surface of interior section 305 may be stowed against and interior surface of the exterior section 310. To reach the second configuration, outer section 310 may slide along inner section 305 to extend outwards from the fuselage 106. As outer section 310 slides along inner section 305, an increasing portion of inner section 305 may be exposed. The wingspan of wings 110 may be approximately the length of exterior section 310 and the exposed portion of interior section 305. Both inner section 305 and outer section 310 may employ an aerodynamic profile to provide lift during flight. Some embodiments may utilize belt system 315 for telescoping wings 110.

Belt system 315 may comprise belt pulleys 325, which may attach to the inner wing section 305 ("second section"). At least one pulley 325 may be driven by an actuator 320. In further embodiments, a plurality of pulleys 325 may be driven by a plurality of actuators 320. Belt 330 may loop around pulleys 325. Notches in belt 330 may enable actuator 320 to move belt 330. One of the straight lengths 331 of belt 330 may be contained within the inner wing section 305, while the other length 332 of belt 330 may be contained in a groove on the bottom of the inner wing section 305 ("second section") that is exposed to the outer wing section 310 ("first section") prior to the telescoping of wings 110.

To enable telescoping, belt 330 may be attached to at least a portion of outer wing section 310 along length 332. In this way, actuator 320's rotation not only causes a movement of belt 330 but also a displacement of outer wing section 310 due to its attachment to belt 330. Accordingly, actuation in direction 335 would cause section 310 to be extended outward from the fuselage 106, thereby increasing the wingspan of the UAVDC. As outer section 310 travels outward, inner section 305 is simultaneously withdrawn from the interior of outer section 310, increasing the wingspan of the UAVDC. Accordingly, as wings 110 are telescoped, length 332 may become exposed but the groove may prevent the belt 330 from protruding from the bottom of the exposed inner wing section 305.

Attaching outer section 310 to length 332 may be implemented by, for example, but not limited to, a clamp, screw or adhesive. In some embodiments, belt 330 may comprise a length of fiber-reinforced rubber material. By stripping rubber from each end of the belt to expose fibers, further attachment mechanisms for attaching belt 330 to outer section 310 may be available. For example, the exposed fibers may be tied to the outer wing section 310 (e.g., to holes in outer wing section 310). The tied fibers may further be secured, for example, with an adhesive. In this way, ends of belt 330 may be attached to create a connected loop without the use of a coupler clamping the ends, thereby eliminating bulky parts commonly used in the art.

Consistent with embodiments of the present disclosure, belt system 315 may provide a lighter and/or a more compact mechanism for telescoping over conventional telescoping systems. In some embodiments, the telescoping of the wings may be reversed by reversing direction 335 of actuator 320 to retract wings 110. In further embodiments consistent with the present disclosure, components of belt system 315 may be reversed, such that outer wing section 310 may be affixed to fuselage 106 and inner wing section 305 may be telescoped outward. In yet further embodiments, a similar belt system may be implemented for extending a boom from fuselage 106. For example, instead of attaching belt 330 to outer wing section 310, belt 330 may attach to the boom.

Wings 110 may comprise ailerons 120. In some embodiments, ailerons 120 may be attached via a hinge 1215 to the trailing edge of outer section 310. In this way, ailerons 120 may minimize interference with outer section 310's internal volume as compared to conventional ailerons. By optimizing outer section 310's internal volume, inner section 305 may have an optimized profile and an increased span that would otherwise be limited by the more commonly-used ailerons. For example, inner section 305 may, when stowed within the first compact configuration, overlap at least a portion of the length of the trailing edge aileron attachment to outer section 310. In this way, a ratio of the surface area between the inner section 305 and outer section 310 may be increased. Maximizing wing span can significantly increase airframe efficiency, flight endurance, and payload capacity. Hinge types that may enable such trailing edge ailerons 120 include, but are not limited to, a living hinge, or other flexure bearing.

Figure 12A:
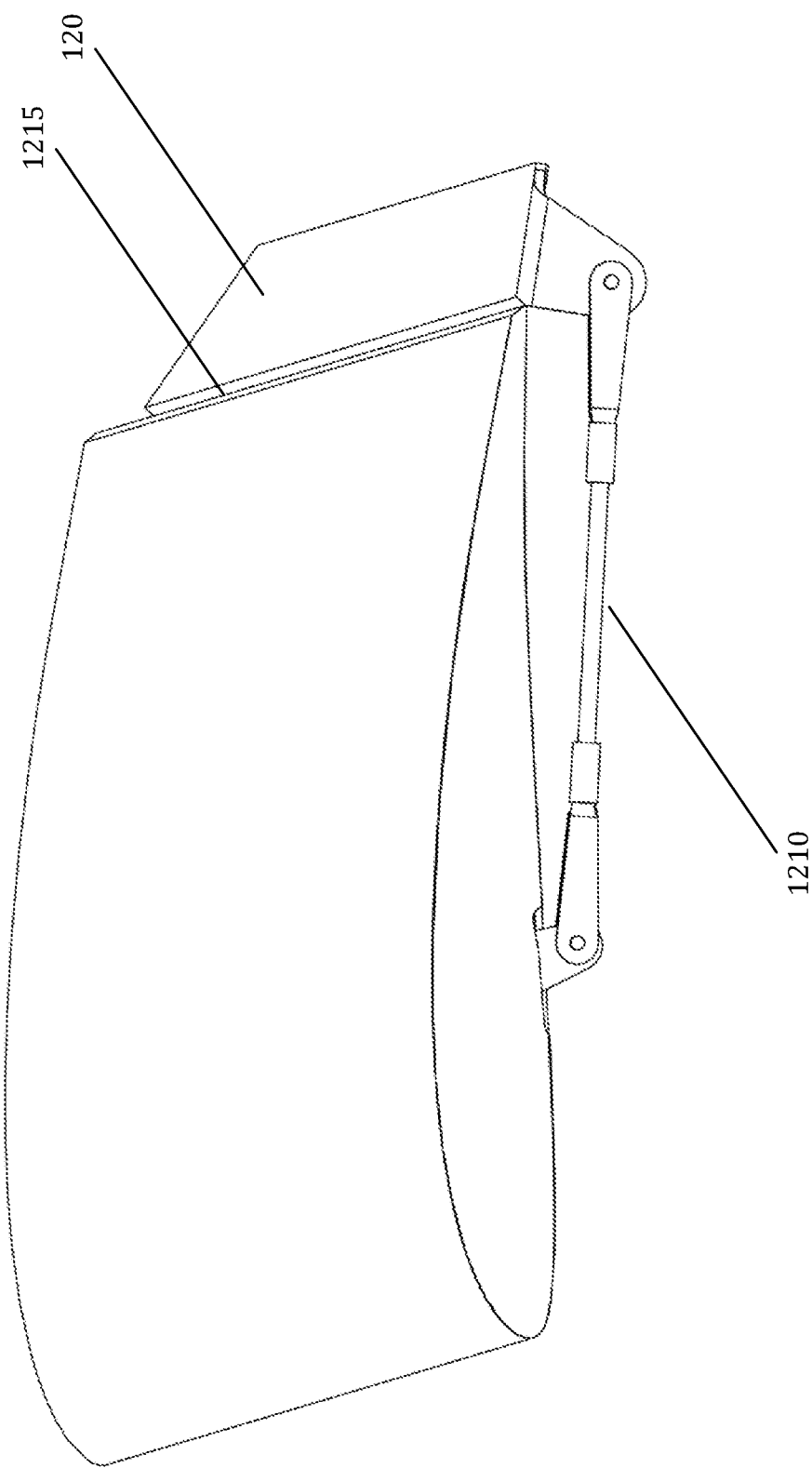
FIG. 12A illustrates components for controlling ailerons.
Figure 13:
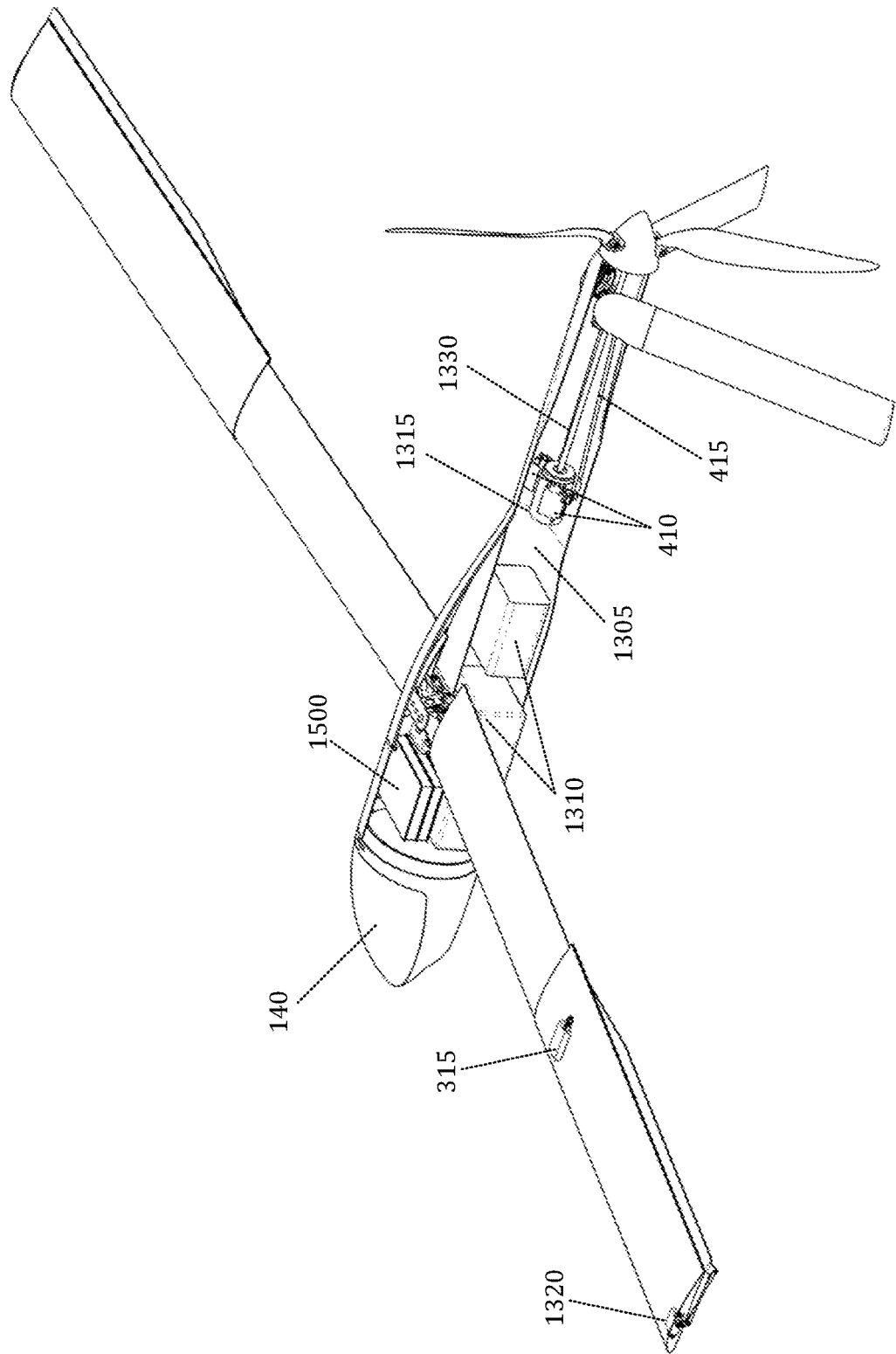
FIG. 13 illustrates one example of internal configuration of the UAVDC.

Further, by mounting ailerons 120 to the outer section 310 extending away from fuselage 106, ailerons 120 may enable roll control throughout the wing deployment phase. This means the UAVDC may be flown with positive roll control regardless of outer section 310's position relative to inner section 305, which can be beneficial during launch and flight recovery phases where transition to stable flight can be carried out with lower structural loads on the air frame when the wings are configured in their non-telescoped position. This may also be beneficial as the span may be reduced or increased in flight, to maximize aerodynamic efficiency without losing roll control. FIG. 12A shows a configuration of components for controlling the ailerons. Each aileron 120 may be positioned by a servo 1320, as illustrated in FIG. 13, through a linkage 1210. Each servo 1320 may, in some embodiments, be positioned within outer wing section 310. In further embodiments, ailerons 120 may be operated by other means, including, but not limited to, gears or shafts. Each servo 1320 may be controlled by controller 1600.

FIG. 12B illustrates possible configurations for ailerons 120, including, but not limited to, a tucked position 1230, which minimizes stowed volume, a partially folded position 1235, and a fully deployed position 1240. Servo 1320 may be operated through a control wire positioned within outer wing section 310 and inner wing section 305. The control wire may extend from fuselage 106 via inner wing section 305. An end of wing section 305 may comprise an opening through which the control wire may extend into the interior of outer wing section 310, connecting to servo 1320. In various embodiments, the wire may comprise sufficient length to accommodate the telescoping of the wings. While the wings are not telescoped, the control wire may be spooled or neatly folded within either of the wing sections.

FIGS. 4A-4D illustrate an embodiment of a deployable pivoting control surface embodied as a stabilizer 125. While this disclosure uses the term "stabilizers" in reference to deployable pivoting and/or pitching control surfaces, it should be understood that such controls surfaces may not be limited to stabilizers. For example, deployable pivoting control surfaces implementing the same components may be used in other ways, including, but not limited to, wings.

In some embodiments, stabilizers 125 may be moved into the flight configuration by other means, including, but not limited to, air drag. In further embodiments, stabilizers 125 may be spring-loaded such that they move into the flight configuration upon launch. For example, torsion springs 405 may move stabilizers 125 into the flight configuration. Stabilizers 125 may be used to provide flight control by servos 410 operating push rods 415 and control horns 416 which pivot the stabilizer about axis 425. For example, servos 410 may cause stabilizers 125 to rotate around axis 425 by pivoting within hinge 420. Further, stabilizers 125 may comprise fairings 485. Fairings 485 may be embodied as a flexible material (e.g., a rubber or elastomer) configured to go around shaft 445 for enabling a pitching motion while maintaining aerodynamic efficiency as shown in FIGS. 4E through 4G. As stated above, stabilizers 125 may comprise one or more antennas 705 such that deployment of stabilizers 125 may further deploy one or more antennas 705.

Stabilizers 125 may move into the flight configuration by pivoting around axis 430. In this way, axis 430 may be constant relative to fuselage 106 in transition from first configuration 450 to second configuration 455. Further, by aligning control horn 416's centerline with axis 430 during deployment, servos 410 need not move during transition 440 from first configuration 450 to second configuration 455, as further shown in FIGS. 4A and 4B.

Servos 410 may be configured to move push rods 415 coupled to control horns 416 on the at least one stabilizer for deflecting/rotating the at least one stabilizer about its spanwise axis. Control horns 416, in turn, may be configured to remain in a relatively fixed position as the at least one stabilizer deploys into flight configuration (the second configuration).

FIGS. 4E-4G illustrate a stabilizer fairing 485. Stabilizer fairing 485 may be used to cover the various components that enable the least one stabilizer to be deflected/rotated about its spanwise axis to provide positive flight control while in the second stabilizer configuration 455. Stabilizer fairing 485 may comprise a flexible material, such as, for example, rubber. As such, stabilizer fairing 485 may reduce drag on various components, including, but not limited to shaft 445, while flexing to enable the full range of motion of stabilizer 125.

A number of internal components may be mounted within an interior 1305 of fuselage 106. FIG. 13 illustrates one example of internal configuration of the UAVDC in which a power source 1310 may be positioned within the interior of fuselage 106. Power source 1310 may comprise, for example, a fuel tank or one or more batteries. Various components of the UAVDC may be connected to power source 1310, including, but not limited to, modular payload 140, controller 1600, sweeping gearbox actuator 210, control mechanisms for ailerons (e.g., servos 1320), servos 410 for stabilizers 125, a motor 1315 to drive the propeller 135, and antenna 705. Embodiments of the UAVDC comprising a propulsion device (e.g., propeller 135) may be powered by alternative power sources, such as, for example, an internal combustion engine. In such embodiments, a fuel source for the internal combustion engine (e.g., gas tank) may be positioned within interior 1305 of fuselage 106.

Internal components may further include, for example, but not be limited to, the following components, which will be further detailed with reference to section III below, sweeping gearbox 205 and actuator 210 employed to sweep wings 110; control mechanisms for ailerons 120 (e.g., servos 1320) for operating ailerons 120 and servos 410 for operating stabilizers 125); a motor 1315 for driving propeller 135; driveshaft 1330 for coupling motor 1315 to propeller 135 and an on-board controller 1600 for controlling the deployment, flight, and operation of the UAVDC. The illustrated configuration of internal components is just one possible configuration, and other embodiments are possible. The interior components may be distributed to balance the weight in an optimal way for flight.

III. OPERATION

Figure 14:
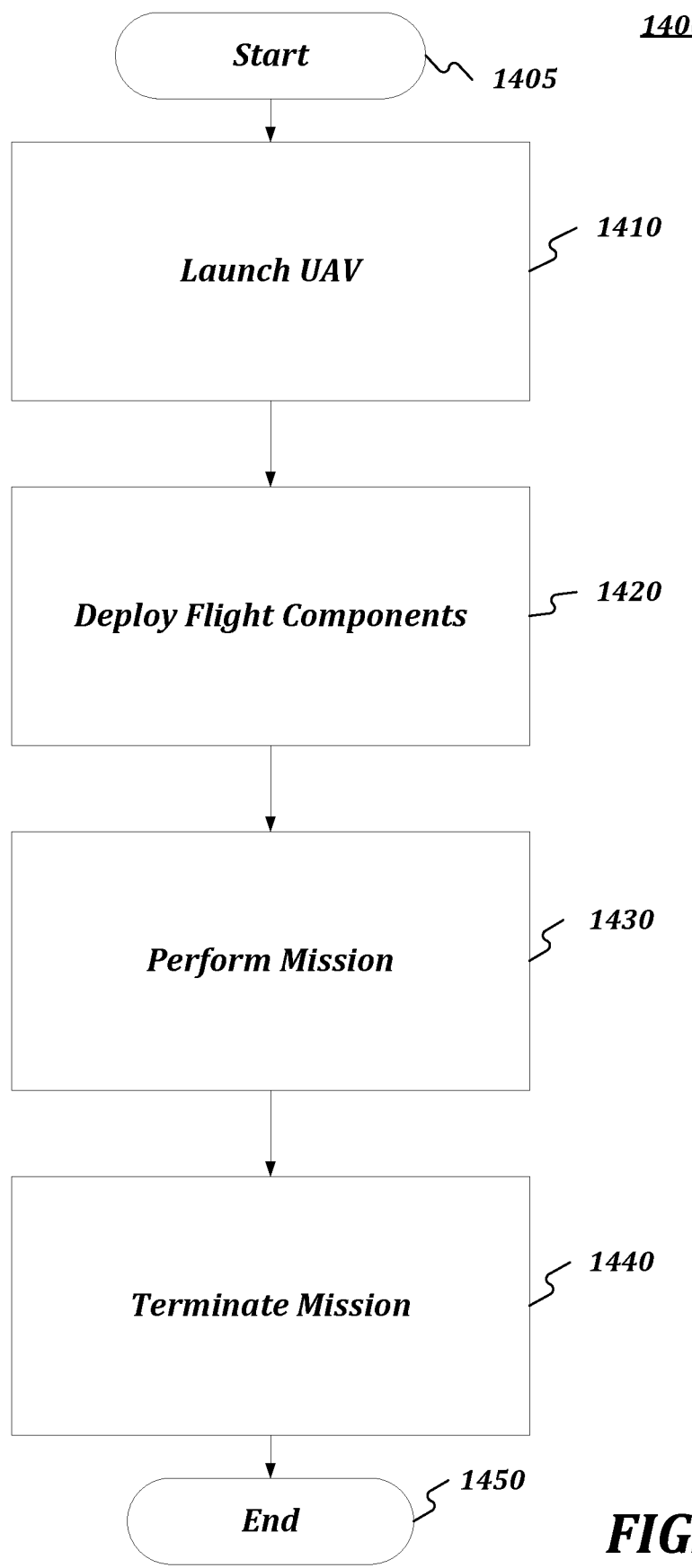
FIG. 14 illustrates a method for using the unmanned aerial vehicle with deployable components.

FIG. 14 is a flow chart setting forth the general stages involved in a method 1400 consistent with an embodiment of the disclosure for operating the UAVDC. Method 1400 may be implemented using, at least in part, a controller 1600 (e.g., on board computing device) as described in more detail below with respect to FIG. 16. Controller 1600 may comprise a controller 1600 for operating the deployable components as well as well as performing other mission details, including, but not limited to, flight control, payload operation, and communication. As such, controller 1600 may be in operative configuration and communication with, for example, but not be limited to, modular payload 140, sweeping gearbox actuator 210, control mechanisms for ailerons 120 (e.g., servos 1320), servos 410 for stabilizers 125, a motor 1315 to drive the propeller 135, power source 1310, inertial measurement unit, global positioning system, various telemetry sensors, and antenna 705, as well as all other units. As will be detailed with reference to FIG. 16, controller 1600 may comprise a remote communication module to enable remotely operation as described above with reference to antenna 705. In other embodiments, controller 1600 may be completely self-operating upon configuration. In this way, the UAVDC may be self-piloting.

Furthermore, although stages are disclosed with reference to controller 1600, it should be understood that a plurality of other components may enable the operation of method 1400, including, but not limited to, other computing components, mechanical components, environment properties (e.g., air resistance), remote operators, and the like.

Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1400 may begin at starting block 1405 and proceed to stage 1410, where the UAVDC may be launched. For example, the UAVDC may be fired from a tube launched from a craft or dropped from a carrier aerial vehicle. The compact arrangement 102 of the UAVDC's first configuration (as specified, for example, with reference to FIG. 1A) may enable the UAVDC to be tube-launched as, for example, a missile. In some embodiments, once dropped from a carrier aerial vehicle, the UAVDC may be aerodynamically designed (as illustrated) and with such a weight distribution that it may self-orient from a tumbling drop into a dive.

From stage 1410, where the UAVDC is launched, method 1400 may proceed to stage 1420 where the flight components may be deployed. The deployment of flight components, though disclosed in a particular order for illustrative purposes, may occur in other arrangements.

Upon launch, the stabilizers 125 and propeller 135 may deploy. In applicable embodiments, springs 405 and springs 805, may deploy stabilizers 125 and propeller blades 510, respectively. In other embodiments, the air resistance at launch and the stowed arrangement of stabilizers 125 (e.g., first stabilizer configuration 450) and propeller blades 510 create a force in a vector of expansion, thereby causing stabilizers 125 and propeller blades 510 to deploy in a deployed arrangement (e.g., second stabilizer configuration 455).

Controller 1600 (e.g., on-board computing-device) may automatically engage actuators and the wing deployment mechanisms instantly or after a set amount of time has passed since the launch. In other embodiments, engagement may occur upon certain reading from on-board sensors (e.g., including, but not limited to, sensors deployed in modular payload 140). For example, wing deployment and extension may be dependent on certain in-flight factors such as, for example, velocity, acceleration, and leveling of the UAVDC. Controller 1600 may be configured to trigger deployment of various components upon the satisfaction of certain conditions. Such conditions may be defined prior to deployment. In some embodiments, the conditions may be pre-set or pre-defined by an operator. Still consistent with the various embodiments herein, the conditions may be dynamically determined based on various factors, including, for example, but not limited to, environmental and launch conditions.

Actuator 210 may drive sweeping gearbox 205 to sweep wings 110. In some embodiments, the UAVDC may be capable of controlling sustained flight once wings 110 sweep out 45 degrees. As wings 110 reach full sweep, wings 110 may move within wing hole cutouts 1115 of fairing 130, which has opened due to the strain of the sweeping motion 250, and relocked with the aid of magnets positioned within the fuselage. Accordingly, fairing 130 may automatically snap shut around the profile of wings 110 to improve aerodynamics. Magnets 1125 may further lock fairing 130 around wings 110.

As wings 110 begin sweeping, or after wings 110 are fully swept, wings 110 may begin telescoping. For example, belt system 315 may pull outer section 310 along inner section 305 to telescope wings 110. The wing sweep angles and telescoped positions may further be dynamically adjusted in flight.

Further, in embodiments where deployable, modular payload 140 may deploy from its first arrangement to its second arrangement. For example, modular payload 140 may comprise a plurality of sensing devices better situated for performance at a deployed position (e.g., an extended boom). Such deployment may occur upon the post-launch stabilization segment of the UAVDC's flight.

From stage 1420, where the flight components are deployed and UAVDC flight is stabilized, method 1400 may proceed to stage 1430, where the UAVDC may be used to perform a mission. During all stages of flight, the UAVDC may be in operable communication with an operator via antenna 705. The operator may receive various readings from the various components of the UAVDC.

In some embodiments, the operator may control the operation of the UAVDC during the mission. For example, the operator may be able to control the flight components, including, but not limited to, the wing deployment mechanisms (e.g., sweeping gearbox 205, actuator 210, and belt system 315), propeller 135, stabilizers 125, ailerons 120, and further deployable components (e.g., telescoping boom 710 for antenna 705, and boom 655 for antenna 650). In other embodiments, on-board controller 1600 may be pre-configured with mission control data.

Embodiments of the UAVDC may be used for a plurality of missions including, but not limited to, data capture, payload deployment, and providing a telecommunications relay. In addition to communicating for flight control, embodiments of the UAVDC may be controlled in data capture and transmission. In further embodiments, the UAVDC may enable the operator to release modular payload 140.

From stage 1430, where the UAVDC is used to perform a mission, method 1400 may proceed to stage 1440, where the mission is terminated. For example, the mission may be terminated by flying the UAVDC to a recapture location where it may be recovered. Further, the UAVDC may terminate a mission by crash landing. For example, the UAVDC may be flown into rocks or a hard surface in order to destroy functional components. In further embodiments, the UAVDC may be equipped with an explosive device such that it may be self-destructed upon mission completion. After stage 1440, method 1400 may end at stage 1450.

Additional embodiments relating to the delayed deployment of UAVDC components may be further provided. The UAVDC may transition from the compact arrangement 102 to the deployed and/or expanded arrangement 105 following launch of the UAVDC such that the UAVDC achieves safe separation from the mechanism used to launch the UAVDC (hereinafter referred to as the "launcher"). In some embodiments, the UAVDC may be configured to deploy at least one of: the wings 110, the stabilizers 125, and the foldable propeller 135 in response to at least one condition after the launch of the UAVDC. An example of such pre-condition may include, but not be limited to, an altitude measurement or a speed measurement relative to the UAVDC. In certain embodiments of the present disclosure, the UAVDC may be configured to measure the speed of the UAVDC and time since launch of the UAVDC to approximate the distance that the UAVDC has travelled subsequent to a launch event. In yet further embodiments of the present disclosure, the UAVDC may utilize other sensors associated with the UAVDC to determine when to deploy components of the UAVDC.

In response to a launch of the UAVDC, the wings 110 may be deployed at a separate point in time from the stabilizers 125. In some embodiments, the stabilizers 125 may be deployed after a first interval corresponding to a time delay after launch, a detection of at least one condition, or the detection of an altitude threshold. In further embodiments, the stabilizers 125 may immediately deploy after launch. Deployment of the stabilizers 125 may generate drag that may slow the airspeed of the UAVDC. The deployment of the stabilizers may reduce airspeed of the UAVDC such that components of the UAVDC deployed after the stabilizers 125 may experience less drag. As a non-limiting illustration, the wings 110 may deploy after a second interval. The second interval may correlate, for example, to a second time period after launch corresponding to a safe separation or detection of a second altitude that corresponds to a stage separation. Accordingly, components of the UAVDC may have their deployment delayed after launch. This may help to prevent damage to the UAVDC.

Still, in further embodiments, the telescoping wings 110 may delay deployment to a third interval such that the third interval corresponds to a sensor reading from the UAVDC. The sensor reading may be configured to indicate a safe deployment of the wings 110 from the deployed arrangement 104 to the expanded arrangement 105. In some embodiments of the present disclosure, transitioning the wings 110 from the deployed configuration to the extended arrangement may depend on factors such as, but not limited to, airspeed, pitch and yaw of the UAVDC, and the altitude of the UAVDC. In further embodiments, a controller 1600 with a CPU, may analyze the altitude of the UAVDC relative to the target, the distance of the UAVDC from the target, and the arrival time of the UAVDC to the target. The controller 1600 may utilize data collected by the sensors on the UAVDC to configure the deployment of the wings from the stored arrangement to the deployed arrangement. The controller 1600 may also analyze, for example, target information to determine when to transition the wings 110 from the deployed configuration to the extended configuration.

In yet further embodiments, the UAVDC may also be configured to deploy additional components of the UAVDC. For example, various sensor readings may be used to determine and configure the deployment of the propulsion system and/or expansion of the wings 110 from the deployed configuration to the extended configuration. In certain embodiments, the UAVDC may be configured to deploy components as determined by the airspeed of the UAVDC. As a non-limiting illustration, the UAVDC may delay extension of the wings 110 until the UAVDC reaches an airspeed of around seventy five knots or less. Additionally or alternatively, the UAVDC may delay extension of the wings 110 until the UAVDC is travelling in a straight and level path. Certain environmental factors may increase or decrease the delayed deployment for components of the UAVDC. Accordingly, the airspeed or other characteristics of the UAVDCs flight may impact the rate of deployment for components of the UAVDC. As a non-limiting illustration, telescoping of the wings 110 from the deployed configuration to the extended configuration.

The UAVDC may utilize the sweeping gearbox 205 to control the rate of deployment of the wings 110. The sweeping gearbox 205 may be configured for a fast deployment or a slow deployment. The sweeping gearbox 205 configured for the slow deployment may be utilized in, for example, air-launch of the UAVDC. Here, the gearbox 205 may transition the wings 110 from the compact arrangement 102 to the deployed arrangement 104 over a span of several seconds. Accordingly, the gearbox 205 may be configured to transition the wings 110 from the compact arrangement 102 to the deployed arrangement 104 at a rate preventing the wings 110 from damage caused by the forces of the release.

Other embodiments of the UAVDC may be configured for the fast deployment of the wings 110. The fast deployment gearbox 205 may be used in, for example, ground or tube launched applications. Here, the UAVDC may need to deploy quickly such that the deployed components of the UAVDC can begin generating lift shortly after launch to avoid crashing. In certain embodiments utilizing the fast sweeping gearbox 205, the UAVDC may be configured to transition 440 the wings 110 from a compact position to a deployed position in, by way of non-limiting example, a maximum of one second. FIG. 2A illustrates an embodiment of the gearbox.

Embodiments of the present disclosure may also utilize other actuating means for deploying components of the aerial UAVDC from the compact arrangement 102 to the deployed arrangement 104. The UAVDC may utilize any actuating means, in addition or instead of a sweeping gearbox 205 to transition the wings 110 from the compact arrangement 102 to the deployed arrangement 104. Accordingly, the actuating means may be configured to transition the wings 110 from the compact arrangement 102 to the deployed arrangement 104 with enough force to overcome environmental factors and forces associated with launch and deployment of the configurable components.

The actuating means may be controlled by computer-readable instructions (e.g., a firmware and/or software) such that the UAVDC is programmed to deploy the components of the UAVDC in accordance to the computer-readable instructions. The UAVDC may also utilize a controller to configure deployment characteristics of the deployable components. For example, the controller may be configured using software to define deployment characteristics of the deployable components. Accordingly, the software may be programmed such that a launching platform may be selected (e.g. ground, amphibious, aerial, or sub-surface type platform) and the UAVDC may transition the deployable components based on the configuration of the controller.

For example, in some embodiments of the present disclosure, the UAVDC may utilize an altitude and/or a speed measurement captured by the UAVDC to determine the proper time to deploy components of the UAVDC such as the stabilizers 125 and the expandable wings 110. For example, the controller may be configured before launch of the aerial vehicle to correspond to the relevant launching platform. The selection of the launching platform may configure the controller to monitor measurements from the UAVDC to configure the deployment of the UAVDC. The UAVDC may also determine the rate of deployment required for the components being deployed such as the stabilizers and the expandable wings based on the selection of the deployment characteristics. The determined rate of deployment for the components that may be based on the selection of the deployment characteristics may be associated with at least one measurement captured by the UAVDC. The UAVDC may also be programmed to reach a target location. In such embodiments, the UAVDC may compare and analyze, for example, but not limited to, captured data to characteristics of the target such as the target altitude, the target distance, and the time to reach the target. The UAVDC may then determine deployment parameters based on the target information.

In certain embodiments of the present disclosure, the deployable components may comprise a payload 140. The configuration of the payload 140 within the UAVDC may impact the weight distribution of the UAVDC. In such embodiments, the UAVDC may take into account the instant weight distribution of the UAVDC when determining to deploy the components of the UAVDC. The UAVDC may also control the angle that the wings 110 deploy in response to the configuration of the payload 140. In the absence of a payload 140, the UAVDC may retain the ability to control the that the wings 110 deploy. As an embodiment of the present disclosure, the wings 110 may be configured to decrease their angle of deployment before deployment of the payload 140.

In certain embodiments of the present disclosure, the component configured for delayed deployment 505 may comprise the propeller. In certain embodiments, the propellers may be deployed before engagement of the propulsion UAVDC and the propeller begins to generate thrust. In certain embodiments, the propeller may be delayed from deployment 505 until other components of the UAVDC such as the wings 110 and/or stabilizers 125 cannot be damaged upon engagement of the propeller.

Figure 15:
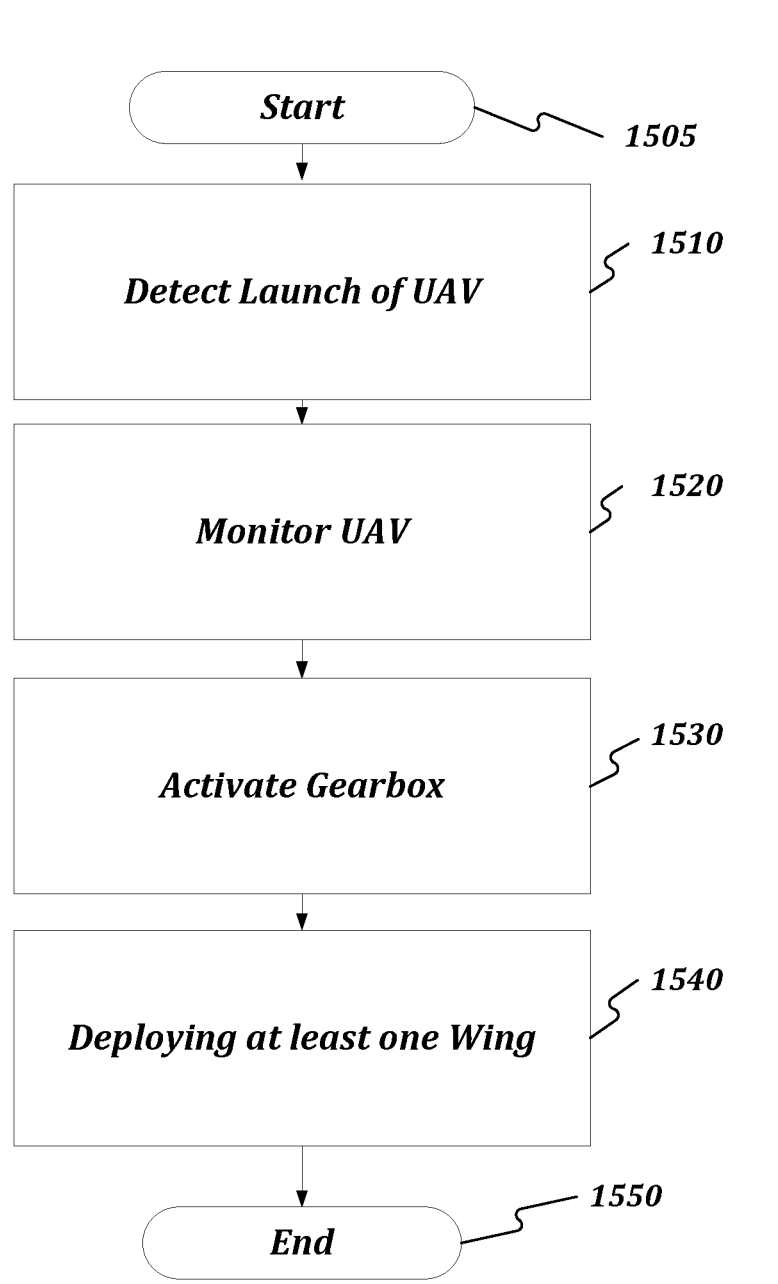
FIG. 15 illustrates an additional method for using the unmanned aerial vehicle with deployable components.

FIG. 15 is a flow chart setting forth the general stages involved in a method 1500 consistent with various embodiments of the disclosure for operating the UAVDC. Method 1500 may be implemented using, at least in part, a controller (e.g., on board computing device) as described in more detail below with respect to FIG. 16. Controller 1600 may be configured to operate the deployable components. In yet further embodiments, controller 1600 may be configured to perform other mission details, including, but not limited to, flight control, payload operation, and communication. As such, controller 1600 may be in operative configuration and communication with, for example, but not be limited to, modular payload 140, sweeping gearbox actuator 210, control mechanisms for ailerons 120 (e.g., servos 1320), servos 410 for stabilizers 125, a motor 1315 to drive the propeller 135, power source 1310, inertial measurement unit, global positioning system, various telemetry sensors, and antenna 705, as well as all other units. As will be detailed with reference to FIG. 16, controller 1600 may comprise a remote communication module to enable remote operation as described above with reference to antenna 705. In other embodiments, controller 1600 may be completely self-operating upon configuration. In this way, the UAVDC may be self-piloting.

Furthermore, although stages are disclosed with reference to controller 1600, it should be understood that a plurality of other components may enable the operation of method 1500, including, but not limited to, other computing components, mechanical components, environment properties (e.g., air resistance), remote operators, and the like.

Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1500 may begin at starting block 1505 and proceed to stage 1510, where the launch of the UAVDC is detected. The stage of detecting a launch of the UAVDC may comprise determining whether the launch type was, for example, a ground launch or an aerial launch. In various embodiments, the UAVDC detect the launch of the aerial vehicle from deployment as a tube launched system or dropped from an aerial vehicle. The compact arrangement 102 may be associated with the first arrangement of the (as specified, for example, with reference to FIG. 1A) may enable the UAVDC to be tube-launched. In some embodiments, once dropped from a carrier aerial vehicle, the UAVDC may be aerodynamically designed (as illustrated) and with such a weight distribution that it may self-orient. Accordingly, the UAVDC may detect the launch of the aerial vehicle from its deployment.

In various embodiments, the launch type of the aerial vehicle may be detected by the controller 1600. Controller 1600 may be configured to, for example, detect that the UAVDC is separated from the launcher. The controller may determine the detection of a launch. In some embodiments, the controller 1600 may utilize at least one sensor associated with the UAVDC facilitate such detection. In yet further embodiments, the launch of the aerial vehicle may be detected by an indication from the launcher. Further still, the launch of the aerial vehicle may be detected on-board the UAVDC.

From stage 1510 where launch of the UAVDC is detected, method 1500 may proceed to stage 1520 where the UAVDC is monitored for at least one condition. The controller 1600 may monitor for the at least one condition. The condition may be associated with the UAVDC. The condition may be associated with environmental factors associated with the UAVDC. The condition may be associated with the launch of the UAVDC. The condition may be detected while monitoring for the condition. The condition may be associated with a sensor reading. The condition may be associated with a physical event. The condition may be associated with a physical event that could correspond to a sensor reading.

In various embodiments, the condition may be associated with a passage of time. In various embodiments of the present disclosure, the UAVDC may transition from a compact configuration to a deployed configuration in response to a passage of time after the launch of the UAVDC. The condition may be associated with an environmental condition. The condition may be associated with an environmental condition (e.g. air resistance, air temperature, air speed, humidity, air pressure, precipitation, terrain, etc.). The condition may be associated with the sensors sub-module. The condition may be associated with a measurement associated with the sensor sub-module. The measurement from the condition may be associated with information sent from the sensor sub-module to the controller. The controller may be configured to detect an event corresponding to the at least one condition based on information received from the sensor sub-module. In various embodiments of the present disclosure, the UAVDC may transition from the compact configuration to the deployed configuration based upon the air resistance experienced by the UAVDC. The controller may be configured to receive data associated with an environmental condition. The controller may be configured such that detection of the environmental condition associated with the condition may initiate the transition of the at least one wing. Detection of the environmental factor associated with the at least one condition may initiate the deployment of the at least one wing from the compact arrangement to the deployed arrangement. In a non-limiting example, the controller may receive an indication corresponding to the air speed of the UAVDC. The controller may monitor for an indication corresponding to the airspeed associated with the condition. The controller may initiate the deployment of the at least one wing when the indication of the condition is detected by the controller.

From stage 1520 where the UAVDC is monitored for at least one condition, method 1500 may proceed to stage 1530 where the gearbox is activated. The gearbox may be activated in response to detection of the at least one condition. The gearbox may be activated through an indication from the UAVDC. The gearbox may be activated by an indication from the controller 1600. The gearbox may be activated through an indication from the controller corresponding to the detection of at least one condition. The controller may send the indication for activation based on a reading from the sensor sub-module.

In various embodiments, the gearbox may be activated from the controller associated with the detection of at least one condition associated with the controller. The condition may be associated with a passage of time following the UAVDC's launch. The gearbox may transition the at least one wing from a compact arrangement to a deployed arrangement when the predetermined time has passed, thereby satisfying the condition. In various embodiments, the condition could be linked to environmental factors such as air resistance, air temperature, air speed, humidity, air pressure, or terrain conditions. The condition may also be correlated with data from the sensors sub-module. The sensor sub-module's measurements may serve as the criteria for fulfilling the condition. This data from the sensor sub-module may be conveyed to the controller. The controller may identify events that correspond to one or more conditions based on the information received from the sensor sub-module. In various embodiments, the sensor sub-module may send environmental measurements to the controller. The controller may monitor the received data from the sensor sub-module for the at least one condition.

From stage 1530 where the gearbox is activated, method 1500 may proceed to stage 1540 where at least one wing is deployed. In this way, the deployment of the at least one wing may correspond to the at least one condition. The at least one wing may be deployed by the gearbox. The at least one wing may transition from a first configuration to a second configuration during deployment of the at least one wing. The first configuration may correspond to a compact arrangement. Deploying the at least one wing may comprise securing the wings in the deployed arrangement.

The rate of deployment may correspond to the rate of deployment of the at least one wing can be configured. The rate of deployment of the at least one wing may be configured based on parameters of the gearbox. In yet further embodiments, the rate of deployment of the at least one wing may be associated with the controller 1600.

Still consistent with the various embodiments here, the rate of deployment of the at least one wing may be associated with the at least one condition. In various embodiments, the at least one wing may be deployed more quickly from a ground launch than an aerial launch. Accordingly, in various embodiments, the condition may impact the rate of deployment of the at least one wing. After stage 1540, method 1500 may end at stage at 1550.

IV. ON-BOARD SYSTEM ARCHITECTURE

The UAVDC may comprise, but not be limited to, an on-board computing module. The computing module may be in operative configuration and communication with, for example, but not be limited to, modular payload 140, sweeping gearbox actuator 210, control mechanisms for ailerons 120 (e.g., servos 1320), servos 410 for stabilizers 125, a motor 1315 to drive the propeller 135, power source 1310, global positioning system, various telemetry sensors, and antenna 705. Further, the computing device may be in operative communication with another computing device consistent with the description herein, and may comprise, but not be limited to, a desktop computer, laptop, a tablet, or mobile telecommunications device. Such remote devices may be used to control and/or configure on-board computing module (e.g., deployment conditions, mission controls, and the like).

Moreover, the UAVDC may be in operative communication with a centralized server, such as, for example, a cloud computing service. Although operation has been described to be performed, in part, by a controller 1600, it should be understood that, in some embodiments, different operations may be performed by different networked elements in operative communication with controller 1600.

Embodiments of the present disclosure may comprise a system having a memory storage and a processing unit. The processing unit may be coupled to the memory storage, wherein the processing unit is configured to perform the stages of method 1400.

Figure 16:
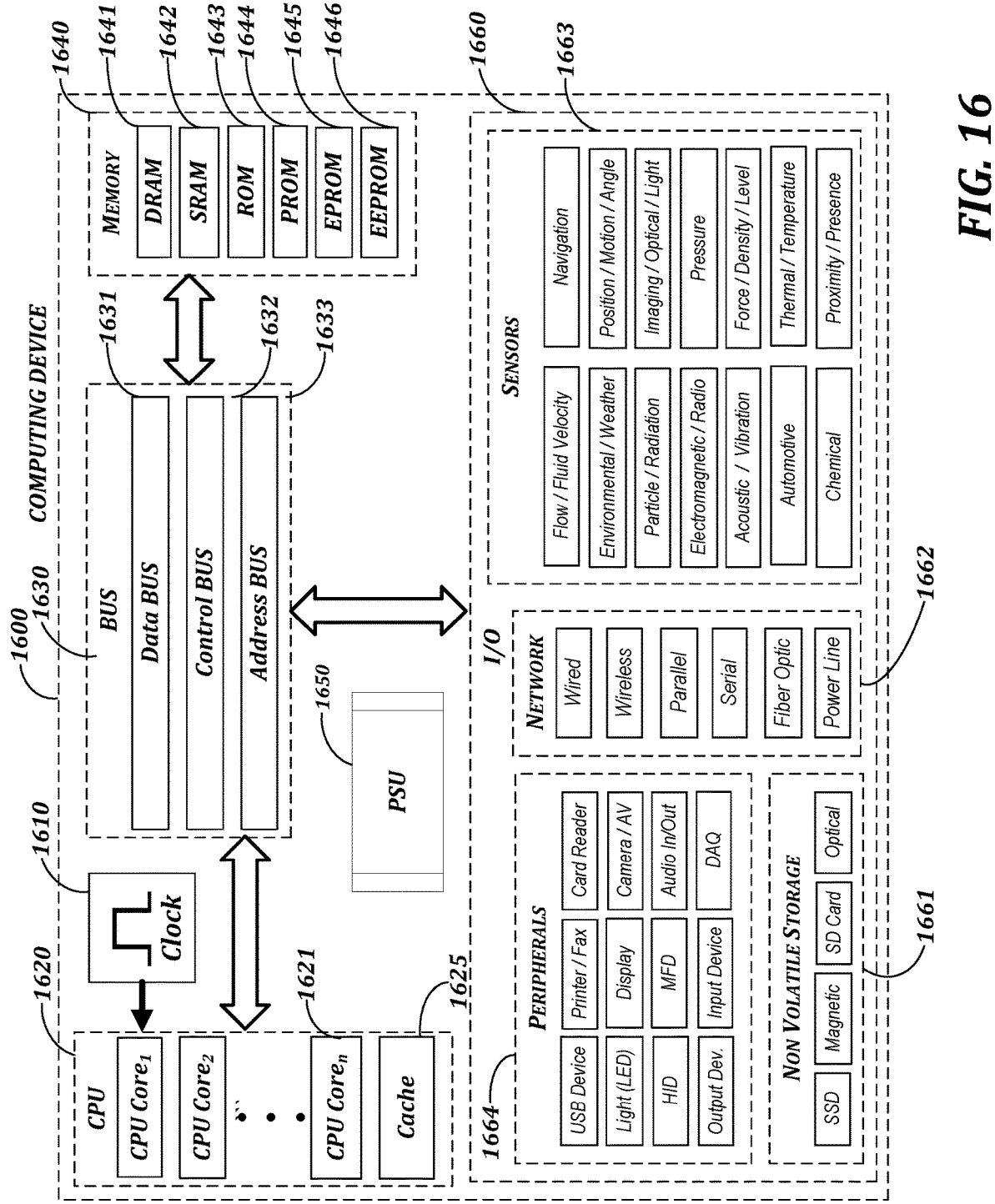
FIG. 16 is a block diagram of a system including a computing device for enabling operation of the apparatus.

FIG. 16 is a block diagram of a system including controller 1600. Consistent with an embodiment of the disclosure, the aforementioned memory storage and processing unit may be implemented in a computing device, such as controller 1600 of FIG. 16. Any suitable combination of hardware, software, or firmware may be used to implement the memory storage and processing unit. For example, the memory storage and processing unit may be implemented with controller 1600 or any of other UAVDC devices and components 1618, in combination with controller 1600. Other UAVDC devices and components 1618 may comprise, for example, but not be limited to, modular payload 140, sweeping gearbox actuator 210, control mechanisms for ailerons 120 (e.g., servos 1320), servos 410 for stabilizers 125, a motor 1315 to drive the propeller 135, power source 1310, global positioning system, various telemetry sensors, and antenna 705. The aforementioned system, device, and processors are examples and other systems, devices, and processors may comprise the aforementioned memory storage and processing unit, consistent with embodiments of the disclosure.

With reference to FIG. 16, a system consistent with an embodiment of the disclosure may include a computing device, such as controller 1600. In some configurations, the controller 1600 may include at least one clock module 1610, at least one CPU 1620, at least one bus 1630, and at least one memory unit 1640, at least one PSU 1650, and at least one I/O 1660 module, wherein I/O module may be comprised of, but not limited to a non-volatile storage sub-module 1661, a communication sub-module 1662, a sensors sub-module 1663, and a peripherals sub-module 1664.

In a system consistent with an embodiment of the disclosure, the controller 1600 may include the clock module 1610, known to a person having ordinary skill in the art as a clock generator, which produces clock signals. Clock signals may oscillate between a high state and a low state at a controllable rate, and may be used to synchronize or coordinate actions of digital circuits. Most integrated circuits (ICs) of sufficient complexity use a clock signal in order to synchronize different parts of the circuit, cycling at a rate slower than the worst-case internal propagation delays. One well-known example of the aforementioned integrated circuit is the CPU 1620, the central component of modern computers, which relies on a clock signal. The clock 1610 can comprise a plurality of embodiments, such as, but not limited to, a single-phase clock which transmits all clock signals on effectively 1 wire, a two-phase clock which distributes clock signals on two wires, each with non-overlapping pulses, and a four-phase clock which distributes clock signals on 4 wires.

Many computing devices 1600 may use a "clock multiplier" which multiplies a lower frequency external clock to the appropriate clock rate of the CPU 1620. This allows the CPU 1620 to operate at a much higher frequency than the rest of the controller 1600, which affords performance gains in situations where the CPU 1620 does not need to wait on an external factor (like memory 1640 or input/output 1660). Some embodiments of the clock 1610 may include dynamic frequency change, where, the time between clock edges can vary widely from one edge to the next and back again.

In a system consistent with an embodiment of the disclosure, the controller 1600 may include the CPU 1620 comprising at least one CPU Core 1621. In other embodiments, the CPU 1620 may include a plurality of identical CPU cores 1621, such as, but not limited to, homogeneous multi-core systems. It is also possible for the plurality of CPU cores 1621 to comprise different CPU cores 1621, such as, but not limited to, heterogeneous multi-core systems, big.LITTLE systems and some AMD accelerated processing units (APU). The CPU 1620 reads and executes program instructions which may be used across many application domains, for example, but not limited to, general purpose computing, embedded computing, network computing, digital signal processing (DSP), and graphics processing (GPU). The CPU 1620 may run multiple instructions on separate CPU cores 1621 simultaneously. The CPU 1620 may be integrated into at least one of a single integrated circuit die, and multiple dies in a single chip package. The single integrated circuit die and/or the multiple dies in a single chip package may contain a plurality of other elements of the controller 1600, for example, but not limited to, the clock 1610, the bus 1630, the memory 1640, and I/O 1660.

The CPU 1620 may contain cache 1622 such as but not limited to a level 1 cache, a level 2 cache, a level 3 cache, or combinations thereof. The cache 1622 may or may not be shared amongst a plurality of CPU cores 1621. The cache 1622 sharing may comprise at least one of message passing and inter-core communication methods used for the at least one CPU Core 1621 to communicate with the cache 1622. The inter-core communication methods may comprise, but not be limited to, bus, ring, two-dimensional mesh, and crossbar. The aforementioned CPU 1620 may employ symmetric multiprocessing (SMP) design.

The one or more CPU cores 1621 may comprise soft microprocessor cores on a single field programmable gate array (FPGA), such as semiconductor intellectual property cores (IP Core). The architectures of the one or more CPU cores 1621 may be based on at least one of, but not limited to, Complex Instruction Set Computing (CISC), Zero Instruction Set Computing (ZISC), and Reduced Instruction Set Computing (RISC). At least one performance-enhancing method may be employed by one or more of the CPU cores 1621, for example, but not limited to Instruction-level parallelism (ILP) such as, but not limited to, superscalar pipelining, and Thread-level parallelism (TLP).

Consistent with the embodiments of the present disclosure, the aforementioned controller 1600 may employ a communication system that transfers data between components inside the controller 1600, and/or the plurality of computing devices 1600. The aforementioned communication system will be known to a person having ordinary skill in the art as a bus 1630. The bus 1630 may embody internal and/or external hardware and software components, for example, but not limited to a wire, an optical fiber, various communication protocols, and/or any physical arrangement that provides the same logical function as a parallel electrical bus. The bus 1630 may comprise at least one of a parallel bus, wherein the parallel bus carries data words in parallel on multiple wires; and a serial bus, wherein the serial bus carries data in bit-wise serial form. The bus 1630 may embody a plurality of topologies, for example, but not limited to, a multidrop/electrical parallel topology, a daisy chain topology, and connected by switched hubs, such as a USB bus. The bus 1630 may comprise a plurality of embodiments, for example, but not limited to:

Internal data bus (data bus) 1531/Memory bus
Control bus 1632
Address bus 1633
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned controller 1600 may employ hardware integrated circuits that store information for immediate use in the controller 1600, known to persons having ordinary skill in the art as primary storage or memory 1640. The memory 1640 operates at high speed, distinguishing it from the non-volatile storage sub-module 1661, which may be referred to as secondary or tertiary storage, which provides relatively slower-access to information but offers higher storage capacity. The data contained in memory 1640, may be transferred to secondary storage via techniques such as, but not limited to, virtual memory and swap. The memory 1640 may be associated with addressable semiconductor memory, such as integrated circuits consisting of silicon-based transistors, that may be used as primary storage or for other purposes in the controller 1600. The memory 1640 may comprise a plurality of embodiments, such as, but not limited to volatile memory, non-volatile memory, and semi-volatile memory. It should be understood by a person having ordinary skill in the art that the following are non-limiting examples of the aforementioned memory:

Volatile memory, which requires power to maintain stored information, for example, but not limited to, Dynamic Random-Access Memory (DRAM) 1641, Static Random-Access Memory (SRAM) 1642, CPU Cache memory 1625, Advanced Random-Access Memory (A-RAM), and other types of primary storage such as Random-Access Memory (RAM).

Non-volatile memory, which can retain stored information even after power is removed, for example, but not limited to, Read-Only Memory (ROM) 1643, Programmable ROM (PROM) 1644, Erasable PROM (EPROM) 1645, Electrically Erasable PROM (EEPROM) 1646 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory may have limited non-volatile duration after power is removed but may lose data after said duration has passed. Semi-volatile memory provides high performance, durability, and other valuable characteristics typically associated with volatile memory, while providing some benefits of true non-volatile memory. The semi-volatile memory may comprise volatile and non-volatile memory, and/or volatile memory with a battery to provide power after power is removed. The semi-volatile memory may comprise, but is not limited to, spin-transfer torque RAM (STT-RAM).

Consistent with the embodiments of the present disclosure, the aforementioned controller 1600 may employ a communication system between an information processing system, such as the controller 1600, and the outside world, for example, but not limited to, human, environment, and another controller 1600. The aforementioned communication system may be known to a person having ordinary skill in the art as an Input/Output (I/O) module 1660. The I/O module 1660 regulates a plurality of inputs and outputs with regard to the controller 1600, wherein the inputs are a plurality of signals and data received by the controller 1600, and the outputs are the plurality of signals and data sent from the controller 1600. The I/O module 1660 interfaces with a plurality of hardware, such as, but not limited to, non-volatile storage 1661, communication devices 1662, sensors 1663, and peripherals 1664. The plurality of hardware is used by at least one of, but not limited to, humans, the environment, and another controller 1600 to communicate with the present controller 1600. The I/O module 1660 may comprise a plurality of forms, for example, but not limited to channel I/O, port mapped I/O, asynchronous I/O, and Direct Memory Access (DMA).

Consistent with the embodiments of the present disclosure, the aforementioned controller 1600 may employ a non-volatile storage sub-module 1661, which may be referred to by a person having ordinary skill in the art as one of secondary storage, external memory, tertiary storage, off-line storage, and auxiliary storage. The non-volatile storage sub-module 1661 may not be accessed directly by the CPU 1620 without using an intermediate area in the memory 1640. The non-volatile storage sub-module 1661 may not lose data when power is removed and may be orders of magnitude less costly than storage used in memory 1640. Further, the non-volatile storage sub-module 1661 may have a slower speed and higher latency than in other areas of the controller 1600. The non-volatile storage sub-module 1661 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (1661) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the controller 1600 may employ a communication sub-module 1662 as a subset of the I/O module 1660, which may be referred to by a person having ordinary skill in the art as at least one of, but not limited to, a computer network, a data network, and a network. The network may allow computing devices 1600 to exchange data using connections, which may also be known to a person having ordinary skill in the art as data links, which may include data links between network nodes. The nodes may comprise networked computer devices 1600 that may be configured to originate, route, and/or terminate data. The nodes may be identified by network addresses and may include a plurality of hosts consistent with the embodiments of a controller 1600. Examples of computing devices that may include a communication sub-module 1662 include, but are not limited to, personal computers, phones, servers, drones, and networking devices such as, but not limited to, hubs, switches, routers, modems, and firewalls.

Two nodes can be considered networked together when one controller 1600 can exchange information with the other controller 1600, regardless of any direct connection between the two computing devices 1600. The communication sub-module 1662 supports a plurality of applications and services, such as, but not limited to World Wide Web (WWW), digital video and audio, shared use of application and storage computing devices 1600, printers/scanners/fax machines, email/online chat/instant messaging, remote control, distributed computing, etc. The network may comprise one or more transmission mediums, such as, but not limited to conductive wire, fiber optics, and wireless signals. The network may comprise one or more communications protocols to organize network traffic, wherein application-specific communications protocols may be layered, and may be known to a person having ordinary skill in the art as being improved for carrying a specific type of payload, when compared with other more general communications protocols. The plurality of communications protocols may comprise, but are not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], Integrated Digital Enhanced Network [IDEN], Long Term Evolution [LTE], LTE-Advanced [LTE-A], and fifth generation [5G] communication protocols).

The communication sub-module 1662 may comprise a plurality of size, topology, traffic control mechanisms and organizational intent policies. The communication sub-module 1662 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMAX and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus networks such as Ethernet, star networks such as Wi-Fi, ring networks, mesh networks, fully connected networks, and tree networks. The network can be characterized by its physical capacity or its organizational purpose. Use of the network, including user authorization and access rights, may differ according to the layout of the network. The characterization may include, but is not limited to a nanoscale network, a Personal Area Network (PAN), a Local Area Network (LAN), a Home Area Network (HAN), a Storage Area Network (SAN), a Campus Area Network (CAN), a backbone network, a Metropolitan Area Network (MAN), a Wide Area Network (WAN), an enterprise private network, a Virtual Private Network (VPN), and a Global Area Network (GAN).

Consistent with the embodiments of the present disclosure, the aforementioned controller 1600 may employ a sensors sub-module 1663 as a subset of the I/O 1660. The sensors sub-module 1663 comprises at least one of the device, module, or subsystem whose purpose is to detect events or changes in its environment and send the information to the controller 1600. Sensors may be sensitive to the property they are configured to measure, may not be sensitive to any property not measured but be encountered in its application, and may not significantly influence the measured property. The sensors sub-module 1663 may comprise a plurality of digital devices and analog devices, wherein if an analog device is used, an Analog to Digital (A-to-D) converter must be employed to interface the said device with the controller 1600. The sensors may be subject to a plurality of deviations that limit sensor accuracy. The sensors sub-module 1663 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensors such as a guitar pickup, seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, moisture alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, airspeed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as but not limited to, accelerometer, displacement sensor, flex sensor, free-fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED configured as a light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned controller 1600 may employ a peripherals sub-module 1664 as a subset of the I/O 1660. The peripheral sub-module 1664 comprises ancillary devices uses to put information into and get information out of the controller 1600. There are 3 categories of devices comprising the peripheral sub-module 1664, which exist based on their relationship with the controller 1600, input devices, output devices, and input/output devices. Input devices send at least one of data and instructions to the controller 1600. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to the position of a mouse.

The number of degrees of freedom involved, such as, but not limited to, two-dimensional mice and three-dimensional mice used for Computer-Aided Design (CAD) applications.

Output devices provide output from the controller 1600. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 1664:

Input Devices

Human Interface Devices (HID), such as, but not limited to, pointing device (e.g., mouse, touchpad, joystick, touchscreen, game controller/gamepad, remote, light pen, light gun, infrared remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the controller 1600. The information can be stored in a multitude of formats depending on the user's requirement. Examples of types of video input devices include, but are not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device to capture produced sound. Audio input devices allow a user to send audio signals to the controller 1600 for at least one of processing, recording, and carrying out commands. Devices such as microphones allow users to speak to the computer to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the controller 1600. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices may convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers, and plotters.

Audio and Video (AV) devices, such as, but not limited to, speakers, headphones, amplifiers, and lights, which include lamps, strobes, DJ lighting, stage lighting, architectural lighting, special effect lighting, and lasers.

Other devices such as Digital to Analog Converter (DAC).

Input/Output Devices may further comprise, but not be limited to, touchscreens, networking devices (e.g., devices disclosed in network sub-module 1662), data storage devices (non-volatile storage 1661), facsimile (FAX), and graphics/sound cards.

All rights, including copyrights in the code included herein, are vested in and the property of the Applicant. The Applicant retains and reserves all rights in the code included herein, and grants permission to reproduce the material only in connection with the reproduction of the granted patent and for no other purpose.

V. ASPECTS

The following discloses various Aspects of the present disclosure. The various Aspects are not to be construed as patent claims unless the language of the Aspect appears as a patent claim. The Aspects describe various non-limiting embodiments of the present disclosure.

Aspect 1. An unmanned aerial vehicle (UAV) comprising: a fuselage; at least one wing having an inner wing section stowed in an interior of an outer wing section; at least one stabilizer, wherein the at least one wing and at least one stabilizer are configurable in at least the following arrangements: a compact arrangement comprising: the at least one wing stowed against the fuselage, and the at least one stabilizer stowed against the fuselage, a deployed arrangement comprising: the at least one wing deployed from the fuselage, and the least one stabilizer deployed from the fuselage, and an expanded arrangement comprising: the at least one wing is telescoped to increase a wingspan of the deployed arrangement; and at least one control surface hinged to the outer wing section of the at least one wing, wherein the at least one control surface is enabled to actuate when the UAV is transitioning from the compact arrangement to the deployed arrangement in order to stabilize the UAV for subsequent transition to the expanded arrangement.

Aspect 2. The UAV of the preceding aspects, further comprising: a sweeping means for deploying the at least one wing from the compact arrangement to the deployed arrangement.

Aspect 3. The UAV of the preceding aspects, further comprising: a telescoping means for expanding the wingspan of the at least one wing from the deployed arrangement to the expanded arrangement.

Aspect 4. The UAV of the preceding aspects, wherein the at least one stabilizer is configured to deploy from the compact arrangement to the deployed arrangement by a spring configured to force the at least one stabilizer into the deployed position.

Aspect 5. The UAV of the preceding aspects, further comprising: a propulsion means.

Aspect 6. The UAV of the preceding aspects, wherein the propulsion means comprises at least one blade.

Aspect 7. The UAV of the preceding aspects, wherein the at least one blade is: stowed against the fuselage in the compact arrangement, and deployed from the fuselage in the deployed arrangement and the expanded arrangement.

Aspect 8. The UAV of the preceding aspects, further comprising: a modular payload fuselage section.

Aspect 9. The UAV of the preceding aspects, further comprising: a deployable payload comprising: a first configuration in the compact arrangement and a second configuration in at least one of the following: the deployed arrangement and the expanded arrangement.

Aspect 10. The UAV of the preceding aspects, wherein the compact arrangement enables the UAV to be stored in at least one of the following: a tube, a weapons bay, and a wing attachment.

Aspect 11. The UAV of the preceding aspects, wherein the deployed arrangement is configured to stabilize the UAV into a controlled flight.

Aspect 12. The UAV of the preceding aspects, wherein the deployed arrangement being configured to stabilize the UAV into the controlled flight comprises the at least one wing and the at least one stabilizer being configured to deploy into the deployed arrangement after a release from at least one of the following: the tube, the weapons bay, and the wing attachment.

Aspect 13. The UAV of the preceding aspects, wherein the expanded arrangement is configured to increase an efficiency of the controlled flight.

Aspect 14. The UAV of the preceding aspects, wherein the expanded arrangement being configured to increase the efficiency of the controlled flight comprises the at least one wing being configured to telescope upon having stabilized into the controlled flight.

Aspect 15. An unmanned air-vehicle with deployable components (UAVDC) comprising: a fuselage; a wing arrangement segmented in a left wing section and a right wing section to enable variable sweep at approximately a lateral plane of symmetry between the left wing section and the right wing section, the wing arrangement being configurable in a first arrangement, a second arrangement, and third arrangement, wherein the first arrangement comprises the left wing section and the right wing section stowed against the fuselage at a first sweep deployment angle, wherein the second arrangement comprises the wing arrangement fully deployed for flight at a second sweep deployment angle, and wherein the third arrangement comprises the wing arrangement deployed in any sweep deployment angle between the first sweep deployment angle and the second sweep deployment angle; and a sweeping means configured to pivot the left wing section and the right wing section to enable the wing arrangement to sweep from the first arrangement to the second arrangement at any sweep deployment angle, said sweeping means being covered by a flexible fairing positioned relatively at a base of the left wing section and the right wing section.

Aspect 16. The UAVDC of the preceding aspects, wherein the wing arrangement is further configured to telescope to increase the wingspan of the second arrangement.

Aspect 17. The UAVDC of the preceding aspects, wherein the left wing section and the right wing section are stacked against the fuselage, in the first arrangement, with the left wing section vertically offset from the right wing section.

Aspect 18. The UAVDC of the preceding aspects, wherein said fairing comprises at least one slit and at least one cutout, the fairing being configured to: open by flexing to allow the left wing section and the right wing section to be stowed under the fairing in the first arrangement, and close to provide aerodynamic advantage in the second arrangement.

Aspect 19. The UAVDC of the preceding aspects, wherein the cutouts of the fairing are configured to accommodate a profile of the base of the left wing section and the right wing section in the second wing arrangement.

Aspect 20. The UAVDC of the preceding aspects, wherein the fairing creates a first amount of tension in an open configuration corresponding to the first arrangement of the left wing section and the right wing section, wherein the first amount of tension causes the fairing to close when the left wing section and the right wing section reach the second arrangement.

Aspect 21. The UAVDC of the preceding aspects, further comprising magnets configured to secure the fairing in to the fuselage in a closed configuration corresponding to the second arrangement of the left wing section and the right wing section.

Aspect 22. The UAVDC of the preceding aspects, wherein the fairing is configured in an orientation to facilitate buckling and flexibility in a composite laminate by using +/−45 degree composite plies.

Aspect 23. The UAVDC of the preceding aspects, further comprising: at least one stabilizer configured to deploy from a first stabilizer configuration stowed against the fuselage at a first deployment angle to a second stabilizer configuration deployed for flight at a second deployment angle, wherein the at least one stabilizer can be deflected/rotated about its spanwise axis to provide positive flight control while in the second stabilizer configuration.

Aspect 24. The UAVDC of the preceding aspects, further comprising at least one spring, wherein the at least one spring is configured to force the at least one stabilizer from the first stabilizer configuration to the second stabilizer configuration.

Aspect 25. The UAVDC of the preceding aspects, further comprising: a servo configured to move a control horn coupled to the at least one stabilizer for rotating the at least one stabilizer about its spanwise axis, and wherein the control horn is configured to remain in a relatively fixed position as the at least one stabilizer deploys from the first stabilizer configuration to the second stabilizer configuration.

Aspect 26. The UAVDC of the preceding aspects, further comprising a propeller, wherein the propeller comprises at least one blade configured to fold into a first propeller arrangement and expand in a second propeller arrangement.

Aspect 27. The UAVDC of the preceding aspects, wherein the fuselage comprises at least one groove configured to receive at least one blade of the propeller in the first propeller arrangement.

Aspect 28. The UAVDC of the preceding aspects, wherein the propeller is configured to unfold to the second propeller arrangement by means of at least one of the following: propeller blade springs, aerodynamic forces, or a centripetal force from a rotation of the propeller.

Aspect 29. The UAVDC of the preceding aspects, wherein the at least one blade is configured to unfold in the second propeller arrangement such that the at least one blade is within a free stream of air when the UAVDC is in flight.

Aspect 30. The UAVDC of the preceding aspects, further comprising a modular payload fuselage section.

Aspect 31. The UAVDC of the preceding aspects, wherein a payload comprises at least one protrusion configured to travel within at least one slot within the fuselage.

Aspect 32. The UAVDC of the preceding aspects, wherein the payload is configured to attach to a boom, wherein the boom is configured to travel from a first payload arrangement to a second payload arrangement.

Aspect 33. The UAVDC of the preceding aspects, further comprising a controller configured to trigger the deployment of the payload from the first payload arrangement to the second payload arrangement.

Aspect 34 A telescoping wing system for an aerial vehicle comprising: an inner section configured to be stowed within an interior of an outer section in a first configuration; and a telescoping mechanism configured to, after satisfaction of a condition, extend the outer section along a length of the inner section to increase a wingspan in a second configuration.

Aspect 35. The system of the preceding aspects, wherein the condition comprises a set amount of time having passed after a detected launch.

Aspect 36. The system of the preceding aspects, further comprising a control surface attached to a trailing-edge of the outer section, wherein the control surface attaches to the outer section via a hinge mounted on an external surface of the trailing-edge.

Aspect 37. The system of the preceding aspects, wherein the inner section is attached to a fuselage of the aerial vehicle.

Aspect 38. The system of the preceding aspects, wherein at least a portion of an increased wingspan of the aerial vehicle is comprised of approximately a length of the outer section and a length of an exposed portion of the inner section.

Aspect 39. The system of the preceding aspects, wherein the length of the exposed portion of the inner section increases as the outer section is displaced by at least a portion of the length between a first end of the inner section and a second end of the inner section.

Aspect 40. The system of the preceding aspects, wherein displacement of the outer section along the length of the exposed portion of the inner section extends the wingspan of the aerial vehicle by approximately the length of the exposed portion of the inner section to form the increased wingspan.

Aspect 41. The system of the preceding aspects, wherein the inner section and the outer section are configured, in the first configuration, to be stowed against a fuselage of the aerial vehicle.

Aspect 42. The system of the preceding aspects, wherein the inner section and the outer section are configured, in the first configuration, to be deployed at an angle relative to the fuselage of the aerial vehicle.

Aspect 43. The system of the preceding aspects, wherein the inner section and the outer section are configured to transition from the first configuration to the second configuration at the angle into the second configuration.

Aspect 44. The system of the preceding aspects, wherein the condition comprises a set distance after a detected launch.

Aspect 45. The system of the preceding aspects, wherein the telescoping wing system is configured to dynamically adjust wing sweep angle after satisfaction of the condition.

Aspect 46. The system of the preceding aspects, wherein the outer section is dynamically adjustable after the wingspan is in the second configuration.

Aspect 47. The system of the preceding aspects, wherein the telescoping mechanism is configured for a telescoping boom.

Aspect 48. The system of the preceding aspects, wherein the telescoping boom comprises an antenna.

Aspect 49. The system of the preceding aspects, wherein the telescoping mechanism comprises a belt system.

Aspect 50. The system of the preceding aspects, wherein the outer section comprises at least one flight control mechanism.

Aspect 51. The system of the preceding aspects, wherein the at least one flight control mechanism provides increased roll control after extending the outer section.

Aspect 52. The system of the preceding aspects, wherein the at least one flight control mechanism maintains roll control as the outer section extends along the inner section.

Aspect 53. The system of the preceding aspects, wherein the outer section extends to an intermediate position between the first configuration and the second configuration to decrease drag generated by the telescoping wing system.

Aspect 54. The system of the preceding aspects, the method comprising: detecting, after a launch of the UAV, at least one condition associated with deploying wings of the UAV, the UAV having wings stowed against a fuselage of the UAV in a first arrangement; and deploying, upon detecting the at least one condition, the wings of the UAV into a second arrangement, wherein deploying the wings of the UAV further comprises: activating, in response to detecting the at least one condition associated with the UAV, a gearbox configured to transition the wings from the first arrangement to the second arrangement.

Aspect 55. The system of the preceding aspects, wherein the at least one condition comprises at least one of the following: velocity, acceleration, and leveling associated with the UAV upon determining that UAV has launched.

Aspect 56. The system of the preceding aspects, further comprising adjusting a wing sweep angle after satisfying the at least one condition after deploying the wings of the UAV to the second arrangement.

Aspect 57. The system of the preceding aspects, further comprising extending an outer section of each of the wings after the wings have been deployed into the second arrangement.

Aspect 58. The system of the preceding aspects, further comprising deploying at least one additional flight component of the UAV after satisfying the at least one condition.

Aspect 59. The system of the preceding aspects, wherein deploying the at least one additional flight component further comprises deploying a telescoping boom independently from the wings of the UAV.

Aspect 60. The system of the preceding aspects, wherein deploying the telescoping boom further comprises deploying an antenna.

Aspect 61. The system of the preceding aspects, wherein deploying the at least one additional flight component further comprises deploying at least one stabilizer.

Aspect 62. The system of the preceding aspects, further comprising detecting that the UAV has launched as a tube-integrated unmanned system.

Aspect 63. The system of the preceding aspects, further comprising detecting that the UAV has launched from an aircraft.

Aspect 64. The system of the preceding aspects, further comprising maintaining roll control of the UAV while deploying the wings of the UAV.

Aspect 65. The system of the preceding aspects, wherein deploying the wings of the UAV comprises deploying the wings of the UAV when it is determined that the UAV has traveled a certain distance after launching.

Aspect 66. The system of the preceding aspects, wherein deploying the wings of the UAV further comprises adjusting wingspan of the UAV in a third arrangement after the wings transition to the second arrangement.

Aspect 67. The system of the preceding aspects, wherein deploying the wings comprises deploying the wings in: the first arrangement comprising a left wing section and a right wing section stowed against a fuselage of the UAV; the second arrangement comprising the left wing section and the right wing section deployed for flight at a sweep deployment angle; and the third arrangement comprising the left wing section and the right wing section telescopically expanded.

Aspect 68. The system of the preceding aspects, further comprises activating a belt system for transitioning of the UAV from the second arrangement to the third arrangement.

Aspect 69. The system of the preceding aspects, wherein adjusting the wingspan of the UAV further comprises extending and retracting an outer section of each of the wings and exposing an inner section of each of the wings.

Aspect 70. The system of the preceding aspects, further comprising transitioning the wings from the second arrangement to the third arrangement after an additional condition has been met.

Aspect 71. The system of the preceding aspects, further comprising actuating at least one control surface on the UAV while adjusting the wingspan in the third arrangement.

Aspect 72. The system of the preceding aspects, further comprising maintaining roll control of the UAV in the expanded arrangement by actuating the at least one control surface on the wings of the UAV.

Aspect 73. The system of the preceding aspects, further comprising maintaining roll control of the UAV in the expanded arrangement by actuating the at least one stabilizer.

VI. CLAIMS

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system for deploying an aerial vehicle, the system comprising:
    a sweeping gearbox configured to:
        deploy at least one wing from a compact arrangement to a deployed arrangement; and
    a controller configured to:
        detect a launch,
        monitor for at least one condition,
        detect an event corresponding to the at least one condition, and
        activate the sweeping gearbox upon the detection of the event,
        wherein an activation of the sweeping gearbox is configured to cause a deployment of the at least one wing upon detection of the at least one condition.

2. The system of claim 1, wherein the condition comprises at least one of:
    velocity, acceleration, time, and leveling.

3. The system of claim 1, wherein the sweeping gearbox is configured to adjust a sweep angle of the at least one wing in response to detection of the at least one condition.

4. The system of claim 1, further comprising an outer section of the at least one wing that extends outward in response to the deployment of the at least one wing.

5. The system of claim 4, wherein the outer section of the at least one wing further comprises a control surface.

6. The system of claim 1, wherein the sweeping gearbox further comprises at least one of:
    a first configuration corresponding to a first launch condition, wherein the first launch condition corresponds to an aerial launch, and
    a second configuration wherein the second configuration of the sweeping gearbox corresponds to a second launch condition, wherein the second launch condition corresponds to a ground launch.

7. The system of claim 6, wherein the sweeping gearbox is configured to modulate a rate of transition of the at least one wing based on the configuration of the sweeping gearbox.

8. The system of claim 7, wherein the sweeping gearbox is configured to modulate the rate of deployment associated with the controller.

9. The system of claim 1, wherein the launch is from a tube-integrated system.

10. The system of claim 1, wherein the at least one condition is associated with a distance after the detection of the launch by the controller.

11. The system of claim 1, wherein the controller is further configured to operate the aerial vehicle so as to perform a mission after the deployment of the at least one wing by the sweeping gearbox.

12. The system of claim 1, wherein the sweeping gearbox is further configured based on a type of launch of the aerial vehicle.

13. The system of claim 12, wherein a rate of transition of the at least one wing is in accordance to the configuration of the sweeping gearbox.

14. The system of claim 1, wherein the controller is further configured to activate the sweeping gearbox with an executable instruction.

15. The system of claim 1, wherein the sweeping gearbox is configured to secure the at least one wing in response to the deployment.

16. A method for deploying an aerial vehicle, the method comprising:
    deploying at least one wing from a compact arrangement against the aerial vehicle to a deployed arrangement using a sweeping gearbox;
    determining that the aerial vehicle is launched;
    monitoring the aerial vehicle for at least one condition;
    activating the sweeping gearbox upon a determination of an occurrence of the at least one condition; and
    deploying the at least one wing in response to the activation of the sweeping gearbox.

17. The method of claim 16, wherein the condition comprises at least one of: velocity, acceleration, time, and leveling.

18. The method of claim 16, further comprising adjusting sweep angle of the at least one wing.

19. The method of claim 16, further comprising extending an outer section of the at least one wing in response to the deploying of the at least one wing.

20. The method of claim 19, wherein the outer section of the at least one wing further comprises a control surface.

21. The method of claim 16, further comprising activating the sweeping gearbox into:
    a first configuration corresponding to a first launch condition associated with an aerial launch, and
    a second configuration corresponding to a second launch condition, associated with a ground launch.

22. The method of claim 21, further comprising modulating a rate of deployment of the at least one wing based on the configuration of the sweeping gearbox.

23. The method of claim 22, further comprising modulating the rate of deployment of the at least one wing based on the at least one condition.

24. The method of claim 16, further comprising detecting the launch associated with a tube-integrated system.

25. The method of claim 16, wherein monitoring for the condition is based on a distance after detecting the launch.

26. The method of claim 16, further comprising configuring the sweeping gearbox based on the launch of the aerial vehicle to overcome forces associated with the launch.

27. The method of claim 26, further comprising performing a mission and terminating the mission based on the configuration of a controller.

28. The method of claim 16, wherein activating the sweeping gearbox upon detection of the condition comprises sending an executable instruction to the sweeping gearbox.

29. The method of claim 26, wherein transition of the at least one wing is in accordance to the configuration of the sweeping gearbox.

30. The method of claim 16, further comprising securing the at least one wing in the deployed arrangement in response to the deployment.

\* \* \* \* \*